US011546790B2

(12) United States Patent
Jung et al.

(10) Patent No.: US 11,546,790 B2
(45) Date of Patent: Jan. 3, 2023

(54) METHOD AND APPARATUS FOR SUPPORTING CARRIER AGGREGATION IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 16/789,601

(22) Filed: Feb. 13, 2020

(65) Prior Publication Data

US 2020/0260311 A1 Aug. 13, 2020

(30) Foreign Application Priority Data

Feb. 13, 2019 (KR) .................. 10-2019-0016840

(51) Int. Cl.
*H04W 24/10* (2009.01)
*H04W 76/27* (2018.01)
*H04W 76/30* (2018.01)
*H04W 56/00* (2009.01)
*H04L 5/00* (2006.01)
*H04B 7/06* (2006.01)

(52) U.S. Cl.
CPC .......... *H04W 24/10* (2013.01); *H04B 7/0617* (2013.01); *H04L 5/0094* (2013.01); *H04W 56/001* (2013.01); *H04W 76/27* (2018.02); *H04W 76/30* (2018.02)

(58) Field of Classification Search
None
See application file for complete search history.

(56) References Cited

U.S. PATENT DOCUMENTS

| 9,838,897 B2 | 12/2017 | Jung et al. |
| 2013/0045735 A1* | 2/2013 | Kim ................. H04W 36/0094 455/422.1 |
| 2013/0178224 A1 | 7/2013 | Chang et al. |
| 2014/0099940 A1 | 4/2014 | Kim et al. |
| 2014/0269574 A1 | 9/2014 | Kim et al. |

(Continued)

FOREIGN PATENT DOCUMENTS

| KR | 10-1616253 B1 | 4/2016 |
| KR | 10-1705678 B1 | 2/2017 |
| KR | 10-2019-0116885 A | 10/2019 |

OTHER PUBLICATIONS

3GPP, "3GPP TS 36.331 V15.3.0", Release 15, Sep. 27, 2018, pp. 1-918 (Year: 2018).*

(Continued)

*Primary Examiner* — Steve R Young

(57) ABSTRACT

An idle mode measurement method performed by a user equipment (UE) includes receiving measurement configuration information in a radio resource control (RRC) idle mode; performing measurement in the RRC idle mode, based on the measurement configuration information; receiving a UEInformationRequest message for requesting a result of the measurement in the RRC idle mode; and transmitting a UEInformationResponse message including the result of the measurement in the RRC idle mode.

18 Claims, 20 Drawing Sheets

(56) References Cited

U.S. PATENT DOCUMENTS

| | | | |
|---|---|---|---|
| 2016/0142961 A1 | 5/2016 | Schmidt et al. | |
| 2017/0359747 A1 | 12/2017 | Lunden et al. | |
| 2019/0037425 A1 | 1/2019 | Hong et al. | |
| 2019/0313333 A1 | 10/2019 | Kim et al. | |
| 2020/0053608 A1* | 2/2020 | Tao | H04W 36/0094 |
| 2021/0392537 A1* | 12/2021 | Da Silva | H04W 76/38 |
| 2022/0116809 A1* | 4/2022 | Cheng | H04W 76/30 |
| 2022/0132348 A1* | 4/2022 | Orsino | H04W 76/28 |
| 2022/0150739 A1* | 5/2022 | Da Silva | H04W 24/10 |

OTHER PUBLICATIONS

International Search Report and Written Opinion of the International Searching Authority in connection with International Application No. PCT/KR2020/001769 dated May 19, 2020, 12 pages.

3GPP TS 36.331 V15.3.0 (Sep. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Sep. 2018, 918 pages.

Supplementary European Search Report dated Feb. 8, 2022, in connection with European Application No. 20756681.1, 12 pages.

* cited by examiner

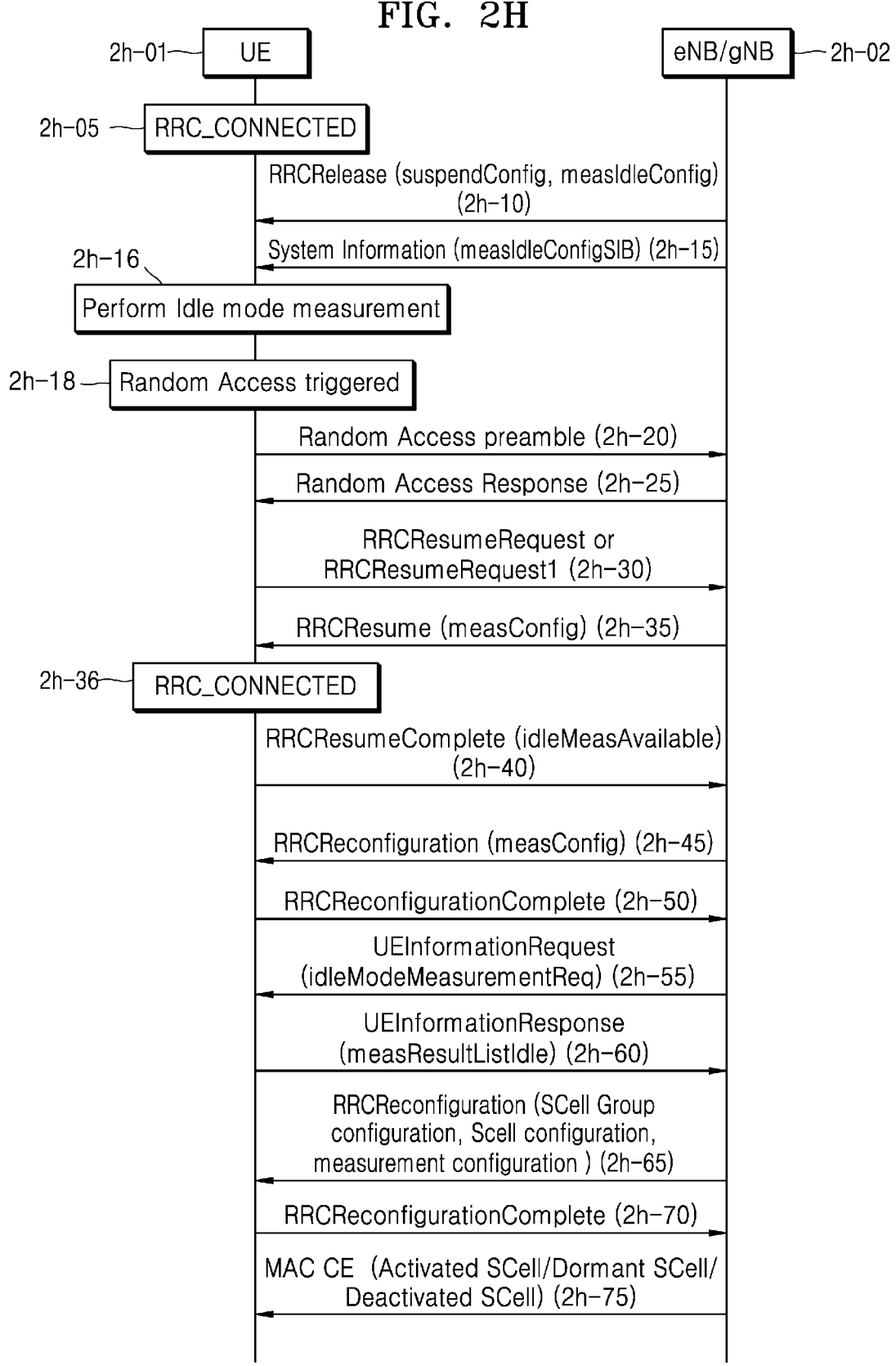

METHOD AND APPARATUS FOR SUPPORTING CARRIER AGGREGATION IN WIRELESS COMMUNICATION SYSTEM

CROSS-REFERENCE TO RELATED APPLICATION

This application is based on and claims priority under 35 U.S.C. § 119 to Korean Patent Application No. 10-2019-0016840, filed on Feb. 13, 2019, in the Korean Intellectual Property Office, the disclosure of which is incorporated by reference herein in its entirety.

BACKGROUND

1. Field

The disclosure relates to wireless communication systems, and more particularly, to a method and apparatus for supporting carrier aggregation.

2. Description of the Related Art

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called Beyond 4G network communication systems or Post LTE systems. In order to achieve a high data transmission rate, consideration is given to implementing 5G communication systems in millimeter wave (mmW) frequency bands (e.g., 60 GHz bands). In order to reduce propagation path loss and increase a propagation distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-centered network via which people generate and consume information to an Internet of Things (IoT) network via which distributed components, such as things, transmit or receive information to or from each other and process the information. Internet of Everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected things and creating a new value in people's lives may be provided. IoT is applicable to various fields, such as smart home, smart building, smart city, smart car or connected car, smart grid, health care, smart home appliances, and advanced medical care, via convergence and combination of existing information technology (IT) with various industries.

Accordingly, various attempts are made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because mobile communication systems may provide various services due to the development of the above mobile communication systems, methods of effectively providing the services are required.

SUMMARY

Provided is a method and apparatus capable of effectively supporting carrier aggregation in a mobile communication system.

Additional aspects will be set forth in part in the description which follows and, in part, will be apparent from the description, or may be learned by practice of the presented embodiments of the disclosure.

According to an embodiment of the disclosure, an idle mode measurement method performed by a user equipment (UE) includes receiving measurement configuration information in a radio resource control (RRC) idle mode; performing measurement in the RRC idle mode, based on the measurement configuration information; receiving a UEInformationRequest message for requesting a result of the measurement in the RRC idle mode; and transmitting a UEInformationResponse message including the result of the measurement in the RRC idle mode.

The result of the measurement may include a measurement result of a serving sell and a result of measurement with respect to each of one or more frequency carriers, and the result of the measurement with respect to each of one or more frequency carriers may include a measurement result of one or more cells.

The receiving of the measurement configuration information in the RRC idle mode may include receiving measurement configuration information included in an RRCConnectionRelease message or system information.

The system information may include at least one of an indicator (reportQuantities) indicating whether the UE reports the result of the measurement in the RRC idle mode measurement with reference signal received power (RSRP), reference signal received quality (RSRQ), or both the RSRP and the RSRQ, an indicator (reportQuantityRsIndexes) indicating whether the UE reports a measurement result for each reference signal (RS) index in the RRC idle mode with the RSRP or the RSRQ or with both of the RSRP and the RSRQ, an indicator (maxNrofRS-IndexesToReport) indicating how many measurement results at maximum from among the measurement results for the RS indexes in the RRC idle mode the UE reports, or an indicator (includeBeamMeasurements) indicating whether to include a beam measurement result.

The system information may include at least one of information (nrofSS-BlocksToAverage) about the number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

The system information may include at least one of frequency information (measIdleCarrierList) about frequencies that are to be measured in the RRC idle mode by the UE, information (measIdleDuration) about a duration while the UE performs measurement, cell list information (measCellList) of a list of cells that are to be measured in the RRC idle mode by the UE, or information (quantityThreshold) about a threshold based on which the UE determines whether to report the result of the measurement in the RRC idle mode.

The idle mode measurement method may include transmitting an RRCResumeRequest message; and
receiving an RRCConnectionReject message, wherein, when the RRCConnectionReject message includes waitTime, the UE continuously performs measurement in the RRC idle mode until a timer operating according to the information (measIdleDuration) expires.

According to another embodiment of the disclosure, an idle mode measurement supporting method performed by a base station includes receiving measurement configuration information in an RRC idle mode through an RRCConnectionRelease message or system information; receiving a UEInformationRequest message for requesting a result of measurement in the RRC idle mode; and receiving a UEInformationResponse message including the result of the measurement in the RRC idle mode.

The system information may include at least one of an indicator (reportQuantities) indicating whether the UE reports the result of the measurement in the RRC idle mode measurement with reference signal received power (RSRP), reference signal received quality (RSRQ), or both the RSRP and the RSRQ, an indicator (reportQuantityRsIndexes) indicating whether the UE reports a measurement result for each reference signal (RS) index in the RRC idle mode with the RSRP or the RSRQ or with both of the RSRP and the RSRQ, an indicator (maxNrofRS-IndexesToReport) indicating how many measurement results at maximum from among the measurement results for the RS indexes in the RRC idle mode the UE reports, or an indicator (includeBeamMeasurements) indicating whether to include a beam measurement result.

The system information may include at least one of information (nrofSS-BlocksToAverage) about the number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

According to another embodiment of the disclosure, a UE for performing measurement in an RRC idle mode includes a transceiver; and a processor coupled to the transceiver and configured to receive measurement configuration information, to perform measurement, based on the measurement configuration information, to receive a UEInformationRequest message for requesting a result of the measurement, and to transmit a UEInformationResponse message including the result of the measurement.

The result of the measurement may include a measurement result of a serving sell and a result of measurement with respect to each of one or more frequency carriers, and the result of the measurement with respect to each of one or more frequency carriers may include a measurement result of one or more cells.

The processor may be further configured to receive measurement configuration information included in an RRCConnectionRelease message or system information.

The system information may include at least one of an indicator (reportQuantities) indicating whether the UE reports the result of the measurement in the RRC idle mode measurement with reference signal received power (RSRP), reference signal received quality (RSRQ), or both the RSRP and the RSRQ, an indicator (reportQuantityRsIndexes) indicating whether the UE reports a measurement result for each reference signal (RS) index in the RRC idle mode with the RSRP or the RSRQ or with both of the RSRP and the RSRQ, an indicator (maxNrofRS-IndexesToReport) indicating how many measurement results at maximum from among the measurement results for the RS indexes in the RRC idle mode the UE reports, or an indicator (includeBeamMeasurements) indicating whether to include a beam measurement result.

The system information may include at least one of information (nrofSS-BlocksToAverage) about the number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

The system information may include at least one of frequency information (measIdleCarrierList) about frequencies that are to be measured in the RRC idle mode by the UE, information (measIdleDuration) about a duration while the UE performs measurement, cell list information (measCellList) of a list of cells that are to be measured in the RRC idle mode by the UE, or information (quantityThreshold) about a threshold based on which the UE determines whether to report the result of the measurement in the RRC idle mode.

The processor may be further configured to transmit an RRCResumeRequest message and receive an RRCConnectionReject message, and, when the RRCConnectionReject message includes waitTime, the UE may continuously perform measurement in the RRC idle mode until a timer operating according to the information (measIdleDuration) expires.

According to another embodiment of the disclosure, a base station for supporting idle mode measurement includes a transceiver; and a processor coupled to the transceiver and configured to transmit measurement configuration information in an RRC idle mode through an RRCConnectionRelease message or system information, to transmit a UEInformationRequest message for requesting a result of measurement in the RRC idle mode, and to receive a UEInformationResponse message including the result of the measurement in the RRC idle mode.

The system information may include at least one of an indicator (reportQuantities) indicating whether the UE reports the result of the measurement in the RRC idle mode measurement with reference signal received power (RSRP), reference signal received quality (RSRQ), or both the RSRP and the RSRQ, an indicator (reportQuantityRsIndexes) indicating whether the UE reports a measurement result for each reference signal (RS) index in the RRC idle mode with the RSRP or the RSRQ or with both of the RSRP and the RSRQ, an indicator (maxNrofRS-IndexesToReport) indicating how many measurement results at maximum from among the measurement results for the RS indexes in the RRC idle mode the UE reports, or an indicator (includeBeamMeasurements) indicating whether to include a beam measurement result.

The system information may include at least one of information (nrofSS-BlocksToAverage) about the number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2H illustrates a diagram for describing a procedure in which a UE supporting idle mode measurement switches from an RRC connected mode to an RRC inactive mode, and a method in which a base station provides idle mode measurement configuration information to the UE, according to an embodiment of the disclosure;

DETAILED DESCRIPTION

Figure 1A:
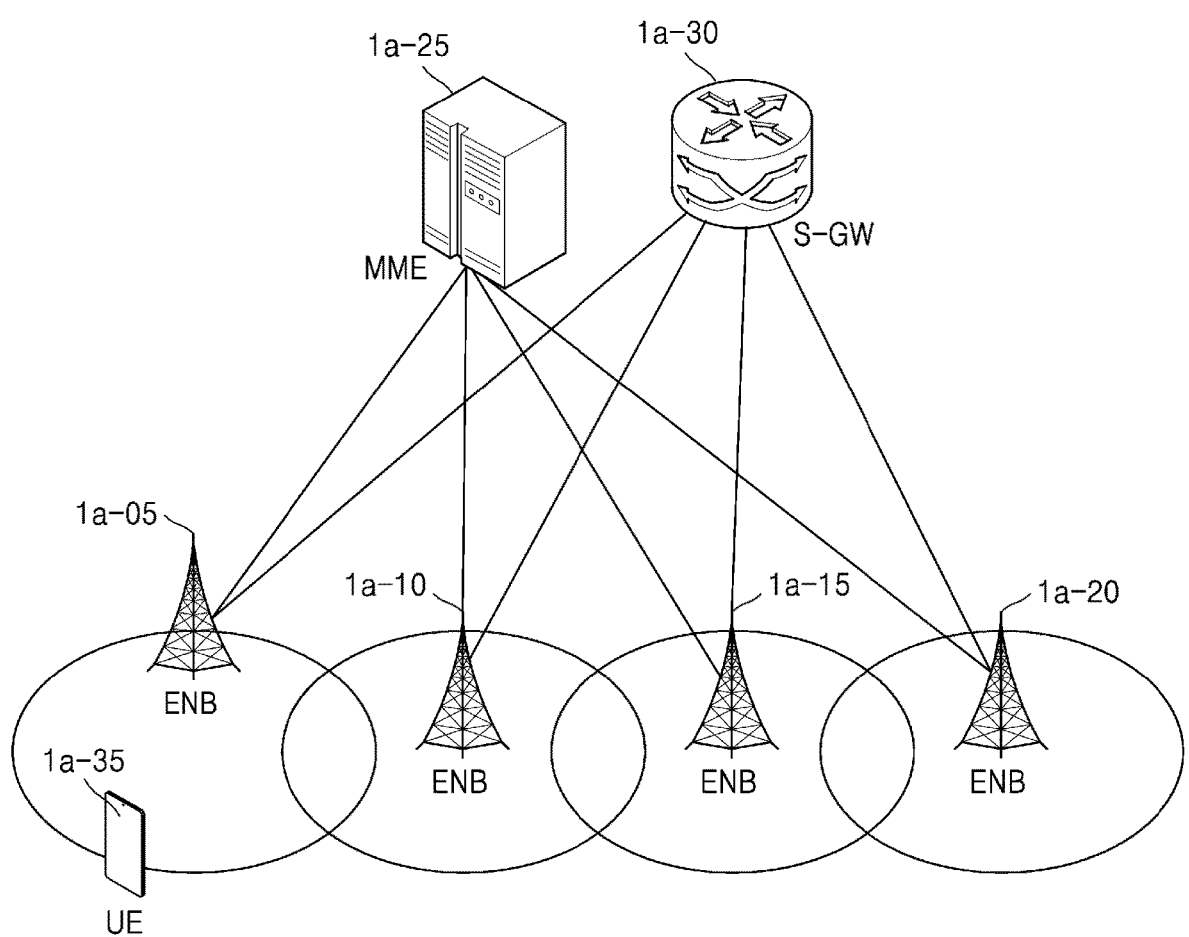
FIG. 1A illustrates a diagram of a structure of a Long Term Evolution (LTE) system according to an embodiment of the disclosure.

FIGS. 1A through 2J, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer may also be referred to as an entity.

Operation principles of the disclosure will now be described more fully with reference to the accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or '~er(or)' used herein denotes a software element or a hardware element such as a field-programmable gate array (FPGA) or an application-specific integrated circuit (ASIC), and performs a certain function. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card. According to an embodiment of the disclosure, the 'unit' or '~er(or)' may include one or more processors.

While describing the disclosure, detailed description of related well-known functions or configurations may be omitted when it is deemed that they may unnecessarily obscure the essence of the disclosure. Embodiments of the disclosure will now be described more fully with reference to the accompanying drawings, in which exemplary embodiments are shown.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in the 3rd Generation Partnership Project Long Term Evolution (3GPP LTE) standard. However, the disclosure is not limited to the terms and names but may also be identically applied to systems that comply with other standards. In the disclosure, eNB may be used interchangeably with gNB for convenience of explanation. In other words, a base station described as an eNB may also indicate a gNB.

Hereinafter, a base station is a subject that performs resource allocation of a terminal, and may be at least one of gNode B, eNode B, Node B, base station (BS), a radio access unit, a base station controller, or a node on a network. Examples of a terminal may include a user equipment (UE), a mobile station (MS), a cellular phone, a smartphone, a computer, and a multimedia system capable of performing a communication function. Of course, embodiments of the disclosure are not limited thereto.

In particular, the disclosure may be applied to the 3GPP New Radio (NR) ($5^{th}$ mobile communications standard). The disclosure is applicable to intelligent services based on the 5G communication technology and the Internet of Things (IoT) related technology (e.g., smart home, smart building, smart city, smart car or connected car, health care, digital education, retail business, and security- and safety-related service). In the disclosure, eNB may be used interchangeably with gNB for convenience of explanation. In other words, a base station described as an eNB may also indicate a gNB. Furthermore, the term 'terminal' may refer to a mobile phone, NB-IoT devices, sensors, and other wireless communication devices.

A wireless communication system has evolved from an initial one that provides a voice-oriented service to a broadband wireless communication system that provides a high-speed and high-quality packet data service, like the communication standards, such as 3GPP high speed packet access (HSPA), LTE or Evolved Universal Terrestrial Radio Access (E-UTRA), LTE-Advanced (LTE-A), LTE-Pro, 3GPP2 high rate packet data (HRPD), Ultra Mobile Broadband (UMB), the Institute of Electrical and Electronics Engineers (IEEE) 802.16e, etc.

In an LTE system as a representative example of a broadband wireless communication system, orthogonal frequency division multiplexing (OFDM) is employed in a downlink (DL) and single carrier frequency division multiple access (SC-FDMA) is employed in an uplink (UL). The UL means a radio link through which a UE transmits data or a control signal to a base station (eNodeB or BS), and the DL means a radio link through which the base station transmits data or a control signal to the UE. The above-described multiple access scheme separates data or control information for each user by allocating and operating time-frequency resources on which the data or the control information is carried for each user, so that the time-frequency resources do not overlap each other, that is, so that orthogonality is realized.

A 5G communication system, that is, a post-LTE communication system, needs to freely reflect various requirements from a user and a service provider, such that a service satisfying the various requirements at the same time has to be supported. Services taken into consideration for the 5G communication system may include enhanced mobile broadband (eMBB) communication, massive machine type communication (mMTC), ultra reliability low latency communication (URLLC), etc.

According to an embodiment, the eMBB may aim to provide a further enhanced data transmission speed than a data transmission speed supported by existing LTE, LTE-A, or LTE-Pro. For example, in the 5G communication system, with respect to one BS, the eMBB needs to provide a peak data rate of 20 Gbps in the DL and a peak data rate of 10 Gbps in the UL. Furthermore, the 5G communication system should be able to provide an increased user-perceived data rate while providing the peak data rate. In order to satisfy such a requirement, various transmission and reception technologies including a further enhanced MIMO transmission technology must be improved. Moreover, the LTE system transmits a signal using a 20 MHz maximum transmission bandwidth in the 2 GHz band, whereas the 5G communication system transmits a signal using a frequency bandwidth wider than 20 MHz in a frequency band of 3 to 6 GHz or more, thus satisfying the data rates required for the 5G communication system.

In the 5G communication system, mMTC is taken into consideration in order to support application services, such as IoT. Access by many UEs within a single cell, coverage improvement of a UE, an increased battery time, a reduction in the cost of a UE are required in order for mMTC to efficiently provide for the IoT. The IoT is attached to various sensors and various devices to provide a communication function, and thus should be able to support many UEs (e.g., 1,000,000 UEs/km2) within a cell. Furthermore, a UE supporting mMTC requires wider coverage compared to other services provided by the 5G communication system because there is a high possibility that the UE may be located in a shadow area not covered by a cell, such as the underground of a building. A UE supporting mMTC needs to be a cheap UE, and requires a very long battery life time, such as 10 to 15 years, because it is difficult to frequently replace the battery of the UE.

Last, URLLC is a mission-critical cellular-based wireless communication service, and may be used for services used for remote control of robots or machinery, industrial automation, unmanned aerial vehicles, remote health care, emergency alert, etc. Accordingly, communication provided by URLLC should be very low latency and very high reliability. For example, services supporting URLLC may require air interface latency to be less than 0.5 millisecond and also a packet error rate of $10^{-5}$ or less. Accordingly, for services supporting URLLC, the 5G system needs to provide a transmission time interval (TTI) less than that of other services, and also requires the design for allocating resources in a wide frequency band in order to secure reliability of a communication link.

Three services of the above-described 5G system, that is, eMBB, URLLC, and mMTC, may be multiplexed and transmitted in one system. In order to satisfy different requirements of the services, different transmission and reception schemes and parameters may be used between the services. However, the above-described mMTC, URLLC, and eMBB are merely examples of different service types, and a service type to which the disclosure is applied is not limited to the foregoing examples.

Although embodiments of the disclosure are hereinafter described with respect to an LTE, LTE-Advanced (LTE-A), LTE Pro, or 5G (or NR as next-generation mobile communication) system, the embodiments of the disclosure may be applied to other communication systems having similar technical backgrounds and channel configurations. Furthermore, it should be understood by those skilled in the art that the embodiments of the disclosure are applicable to other communication systems though modifications not departing from the scope of the disclosure.

FIG. 1A illustrates a diagram of a structure of an LTE system according to an embodiment of the disclosure.

Referring to FIG. 1A, a radio access network (RAN) of the LTE system includes evolved node Bs (hereinafter, referred to as eNBs, node Bs (NBs) or base stations) 1a-05, 1a-10, 1a-15, and 1a-20, a mobility management entity (MME) 1a-25, and a serving-gateway (S-GW) 1a-30. A user equipment (UE) 1a-35 (also referred to as a terminal) may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing NB of a universal mobile telecommunication system (UMTS). The eNB 1a-05, 1a-10, 1a-15, or 1a-20 may be connected to the UE 1a-35 through a radio channel and may perform complex functions compared to the existing NB. In the LTE system, all user traffic including a real-time service such as voice over internet protocol (VoIP) may be provided via a shared channel. Accordingly, an entity that schedules UEs 1a-35 by gathering state information such as buffer states, available transmit power states, and channel states of the UEs 1a-35 may be necessary, and the eNB 1a-05, 1a-10, 1a-15, or 1a-20 may operate as the entity.

A single eNB may generally control multiple cells. For example, the LTE system may use radio access technology such as orthogonal frequency division multiplexing (OFDM) at a bandwidth of 20 MHz to achieve a data rate of 100 Mbps. Also, the eNB 1a-05, 1a-10, 1a-15, or 1a-20 may use an adaptive modulation and coding (AMC) scheme to determine a modulation scheme and a channel coding rate in accordance with a channel state of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the eNBs 1a-05, 1a-10, 1a-15, and 1a-20.

Figure 1B:
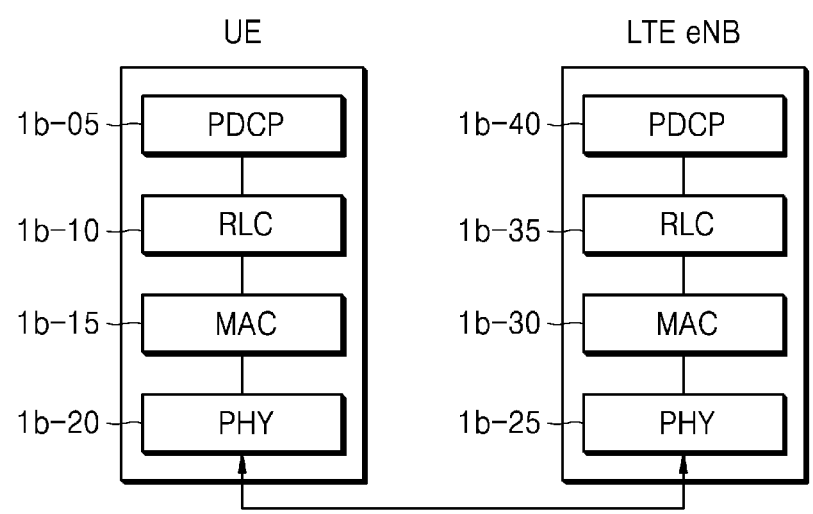
FIG. 1B illustrates a diagram of a radio protocol architecture in an LTE system, according to an embodiment of the disclosure.

FIG. 1B illustrates a diagram of a radio protocol architecture in an LTE system, according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 may be summarized as below. Embodiments of the disclosure are not limited to the following functions.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 may be summarized as below. Embodiments of the disclosure are not limited to the following functions.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below. Embodiments of the disclosure are not limited to the following functions.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical (PHY) layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer. Embodiments of the disclosure are not limited thereto.

Figure 1C:
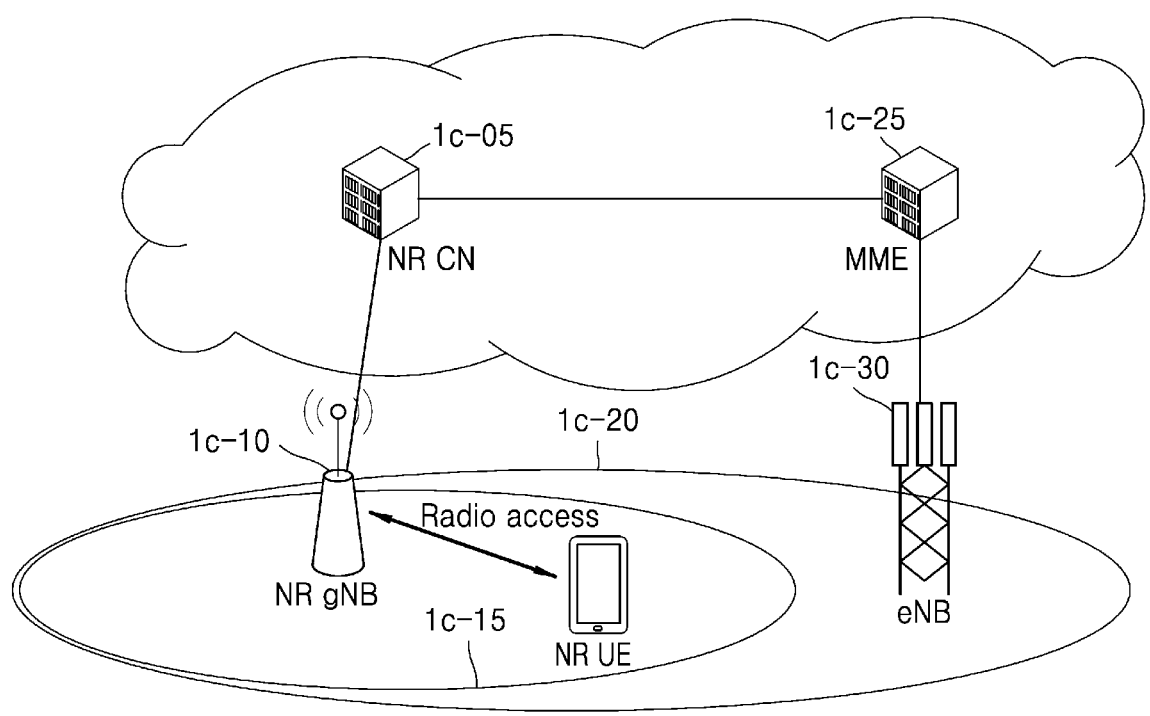
FIG. 1C illustrates a diagram of a structure of a next-generation mobile communication system, according to an embodiment of the disclosure.

FIG. 1C illustrates a diagram of a structure of a next-generation mobile communication system, according to an embodiment of the disclosure.

Referring to FIG. 1C, a RAN of the next-generation mobile communication system (e.g., a new radio (NR) or 5G system) may include a new radio node B (hereinafter, referred to as a NR gNB or an NR base station) 1c-10 and a new radio core network (NR CN) 1c-05. A new radio user equipment (NR UE) or UE 1c-15 may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an existing NB. In the next-generation mobile communication system, all user traffic may be provided via a shared channel. Accordingly, an entity that schedules UEs by gathering state information such as buffer states, available transmit power states, and channel states of the UEs may be necessary, and the NR gNB 1c-10 may operate as the entity. A single NR gNB may generally control multiple cells. In the next-generation mobile communication system, a bandwidth greater than a current maximum bandwidth may be used to achieve an ultrahigh data rate compared to a current LTE system. OFDM may be used as radio access technology, and beamforming technology may be additionally used. According to an embodiment, the NR gNB 1c-10 may use an AMC scheme to determine a modulation scheme and a channel coding rate in accordance with a channel state of the UE.

The NR CN 1c-05 may perform functions such as mobility support, bearer setup, and quality of service (QoS) setup. The NR CN 1c-05 is an entity for performing a mobility management function and various control functions for the UE may be connected to multiple NR gNBs 1c-10. The next-generation mobile communication system may cooperate with the existing LTE system, and the NR CN 1c-05 may be connected to an MME 1c-25 through a network interface. The MME 1c-25 may be connected to an eNB 1c-30 being an existing base station.

Figure 1D:
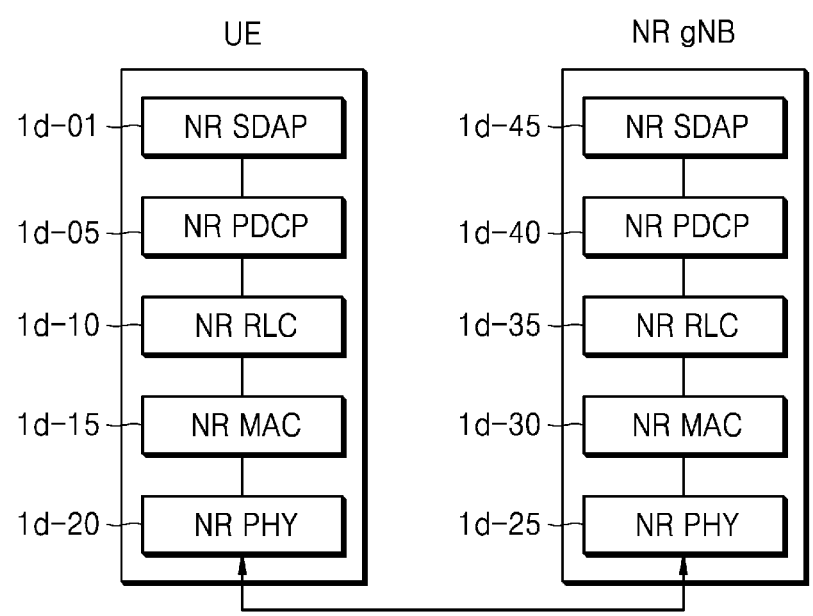
FIG. 1D illustrates a diagram of a radio protocol architecture of a next-generation mobile communication system, according to an embodiment of the disclosure.

FIG. 1D illustrates a diagram of a radio protocol architecture of a next-generation mobile communication system, according to an embodiment of the disclosure.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and an NR gNB.

According to an embodiment, main functions of the NR SDAP layer 1d-01 or 1d-45 may include some of the following functions. Embodiments of the disclosure are not limited to the following functions.
  Transfer of user plane data
  Mapping between a QoS flow and a DRB for both DL and UL
  Marking QoS flow ID in both DL and UL packets
  Reflective QoS flow to DRB mapping for the UL SDAP PDUs With respect to an SDAP layer, the UE may receive, via a radio resource control (RRC) message, settings on whether to use a header of the SDAP layer or use a function of the SDAP layer for each PDCP layer, each bearer, or each logical channel. When an SDAP header is configured, the UE may instruct a non-access stratum (NAS) reflective QoS 1-bit indicator and an access stratum (AS) reflective QoS 1-bit indicator of the SDAP header to update or reconfigure mapping information regarding the data bearer and the QoS flow of uplink (UL) and downlink (DL). The SDAP header may include QoS flow ID indicating QoS. According to an embodiment, QoS information may be used as data processing priority information, scheduling information, etc. for supporting a smooth service.

According to an embodiment, main functions of the NR PDCP layer 1d-05 or 1d-40 may include some of the following functions. Embodiments of the disclosure are not limited to the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink According to an embodiment, a reordering function of the NR PDCP layer 1d-05 or 1d-40 may denote a function of reordering PDCP PDUs received from a lower layer, based on a PDCP sequence number (SN). The reordering function of the NR PDCP layer 1d-05 or 1d-40 may include at least one of a function of delivering the reordered data to an upper layer in order, a function of immediately delivering the reordered data without considering an order, a function of recording missing PDCP PDUs by reordering the PDCP PDUs, a function of reporting a status of the missing PDCP PDUs to a transmitter, or a function of requesting to retransmit the missing PDCP PDUs.

According to an embodiment, main functions of the NR RLC layer 1d-10 or 1d-35 may include some of the following functions. Embodiments of the disclosure are not limited to the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment According to an embodiment, in-sequence delivery of the NR RLC layer 1d-10 or 1d-35) may denote a function of delivering RLC SDUs received from a lower layer, to an upper layer in order. When an RLC SDU is segmented into multiple RLC SDUs and received, the in-sequence delivery of the NR RLC layer 1d-10 or 1d-35 may include a function of reassembling the multiple RLC SDUs and delivering the RLC SDUs.

The in-sequence delivery of the NR RLC layer 1d-10 or 1d-35 may include at least one of a function of reordering received RLC PDUs on an RLC SN or PDCP SN basis, a function of recording missing RLC PDUs by reordering the RLC PDUs, a function of reporting a status of the missing RLC PDUs to a transmitter, or a function of requesting to retransmit the missing RLC PDUs.

According to an embodiment, the in-sequence delivery of the NR RLC layer 1d-10 or 1d-35 may include a function of delivering only RLC SDUs previous to a missing RLC SDU, to the upper layer in order, when the missing RLC SDU exists. According to an embodiment, the in-sequence delivery of the NR RLC layer 1d-10 or 1d-35 may include a function of delivering all RLC SDUs received before a timer is started, to the upper layer in order, when a certain timer is expired although a missing RLC SDU exists. The in-sequence delivery of the NR RLC layer 1d-10 or 1d-35 may include a function of delivering all RLC SDUs received up to a current time, to the upper layer in order, when a certain timer is expired although a missing RLC SDU exists. Embodiments of the disclosure are not limited thereto.

According to an embodiment, the NR RLC layer 1d-10 or 1d-35 may process the RLC PDUs in order of reception regardless of sequence numbers and deliver the RLC PDUs to the NR PDCP layer 1d-05 or 1d-40 (out-of sequence delivery).

According to an embodiment, when the NR RLC layer 1d-10 or 1d-35 receives segments, the NR RLC layer 1d-10 or 1d-35 may reconfigure the segments received later or stored in a buffer, into a whole RLC PDU and deliver the whole RLC PDU to the NR PDCP layer 1d-05 or 1d-40.

According to an embodiment, the NR RLC layer 1*d*-10 or 1*d*-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

According to an embodiment, out-of-sequence delivery of the NR RLC layer 1*d*-10 or 1*d*-35 may denote a function of delivering RLC SDUs received from a lower layer, immediately to an upper layer out of an order. The out-of-sequence delivery of the NR RLC layer 1*d*-10 or 1*d*-35 may include a function of reassembling multiple RLC SDUs segmented from an RLC SDU and delivering the RLC SDU when the segmented RLC SDUs are received. The out-of-sequence delivery of the NR RLC layer 1*d*-10 or 1*d*-35 may include a function of storing RLC SNs or PDCP SNs of received RLC PDUs and recording missing RLC PDUs by ordering the RLC PDUs.

According to an embodiment, the NR MAC layer 1*d*-15 or 1*d*-30 may be connected to multiple NR RLC layers 1*d*-10 or 1*d*-35 configured for a single UE, and main functions of the NR MAC layer 1*d*-15 or 1*d*-30 may include some of the following functions. Embodiments of the disclosure are not limited to the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to an embodiment, the NR PHY layer 1*d*-20 or 1*d*-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, embodiments of the disclosure are not limited thereto.

Figure 1E:
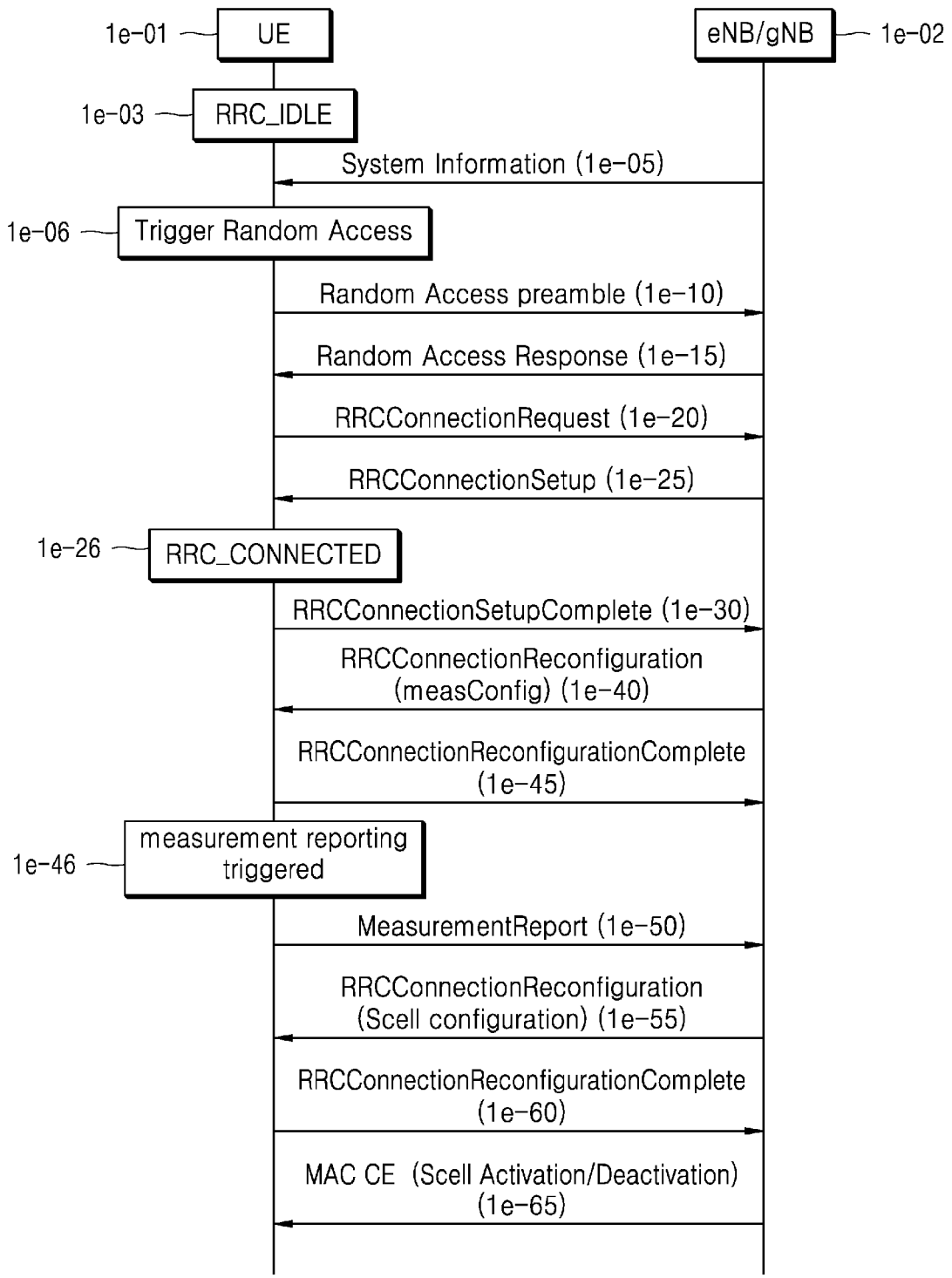
FIG. 1E illustrates a diagram for describing a procedure in which a user equipment (UE) not supporting idle mode measurement switches from a radio resource control (RRC) idle mode to an RRC connected mode, and a procedure in which a base station configures carrier aggregation (CA) for the UE, according to an embodiment of the disclosure.

FIG. 1E illustrates a diagram for describing a procedure in which a UE not supporting an idle mode measurement establishes an RRC connection with an eNB/gNB and switches an RRC idle mode to an RRC connected mode, and a procedure in which the eNB/gNB configures carrier aggregation (hereinafter, CA) in the UE, according to an embodiment of the disclosure.

The UE according to an embodiment of the disclosure may perform a cell selection procedure and/or a cell reselection procedure via frequency measurement in order to search for a cell to be camped on or a serving cell in the RRC idle mode. However, the UE does not report, to the eNB/gNB, results of measuring one or more frequencies in the RRC idle mode, separately. In other words, after the UE transits from the RRC idle mode to the RRC connected mode, the UE may measure one or more frequencies, based on measurement configuration information (hereinafter, measConfig) set in an RRCConnectionReconfiguration message, and, when a set condition is satisfied, may transmit a MeasurementReport message to the eNB/gNB.

Referring to FIG. 1E, a UE 1*e*-01 may be in the RRC idle mode for a certain reason (operation 1*e*-03). The UE 1*e*-01 in the RRC idle mode may receive system information by searching for and camping on a suitable cell, via a cell selection procedure and/or a cell reselection procedure (operation 1*e*-05).

The UE 1*e*-01 may trigger a random access in order to establish an RRC connection with an eNB/gNB 1*e*-02 (1*e*-06). When the random access is triggered, the UE 1*e*-01 may select a PRACH occasion and transmit a Random Access Preamble to the eNB/gNB 1*e*-02 (operation 1*e*-10). In response to the Random Access Preamble, the eNB/gNB 1*e*-02 may transmit a Random Access Response (RAR) message to the UE 1*e*-01 (operation 1*e*-15). The UE 1*e*-01 in the RRC idle mode may establish an inverse direction transmission synchronization with the eNB/gNB 1*e*-02 through operations 1*e*-10 and 1*e*-15.

The UE 1*e*-01 in the RRC idle mode that has established an inverse direction transmission synchronization may perform an RRC connection establishment procedure with the eNB/gNB 1*e*-02. First, the UE 1*e*-01 may transmit a RRCConnectionRequest message to the eNB/gNB 1*e*-02 (operation 1*e*-20). The RRCConnectionRequest message may include an identity of the UE 1*e*-01, an establishment cause for establishing an RCC connection, or the like. In response to the RRCConnectionRequest message, the eNB/gNB 1*e*-02 may transmit an RRCConnectionSetup message to the UE 1*e*-01 (operation 1*e*-25). The RRCConnectionSetup message may include radio resource setup information (RadioResourceConfigDedicated, radioBearerConfig, or masterCellGroup). In response to the RRCConnectionSetup message, the UE 1*e*-01 may set the radio resource setup information and may switch the RRC idle mode to the RRC connected mode (operation 1*e*-26). RRC connection establishment may be accompanied by connection of signaling radio bearer1 (SRB1). Accordingly, an RRC message or an RRC message including a NAS message or an initial NAS message that is a control message between a UE and a BS may be transmitted and received via SRB1. The UE 1*e*-01 in the RRC connected mode may transmit a RRCConnectionSetupComplete message to the eNB/gNB 1*e*-02 through SRB1 (operation 1*e*-30). The RRCConnectionSetupComplete message may include a service request message transmitted by the UE 1*e*-01 to request an access mobility management function (AMF) or MME for bearer configuration for a certain service.

When the RRC connection establishment procedure is successfully performed, the eNB/gNB 1*e*-02 may perform an RRC connection reconfiguration procedure with the UE 1*e*-01. First, the eNB/gNB 1*e*-02 may transmit an RRCConnectionReconfiguration message to the UE 1*e*-01 (operation 1*e*-40). The RRCConnectionReconfiguration message may include at least one of configuration information about a data radio bearer (DRB) to process user data, configuration information about SRB1 and/or SRB2 via which a control message may be transmitted and received, or measurement configuration information (measConfig). In response to the RRCConnectionReconfiguration message, the UE 1*e*-01 may apply the information included in the RRCConnectionReconfiguration message, and then may transmit an RRCConnectionReconfigurationComplete message to the eNB/gNB 1*e*-02 (operation 1*e*-45).

When the RRCConnectionReconfiguration message includes the measConfig in operation 1*e*-40, the UE 1*e*-01 in the RRC connected mode may perform measurement by applying the measConfig. When measurement reporting is triggered (operation 1*e*-46), the UE 1*e*-01 may transmit a MeasurementReport message to the eNB/gNB 1*e*-02 (operation 1*e*-50).

When the eNB/gNB 1*e*-02 successfully receives the MeasurementReport message, the eNB/gNB 1*e*-02 may perform an RRC connection reconfiguration procedure to configure CA for the UE 1*e*-01 in the RRC connected mode. CA according to an embodiment of the disclosure means more transmitting and receiving data between a UE and a BS through an additional carrier or secondary cells or serving cells (SCells). First, the eNB/gNB 1e-02 may transmit an RRCConnectionReconfiguration message to the UE 1e-01 (operation 1e-55). The RRCConnectionReconfiguration message may include configuration information (Scell configuration) about at least one SCell. For example, the Scell configuration may include a list of SCells to be added or modified (sCellToAddModList) and/or a list of configured SCells to be released (sCellToReleaseList), each of which is an information element (IE). When the UE 1e-01 successfully receives the RRCConnectionReconfiguration message, the UE 1e-01 may apply the Scell configuration and then transmit an RRCConnectionReconfigurationComplete message to the eNB/gNB 1e-02 (operation 1e-60). The eNB/gNB 1e-02 may apply a CA by indicating a state (activated or deactivated state) of each SCell configured in the UE 1e-01 by using a MAC control element (MAC CE) (operation 1e-65).

Figure 1F:
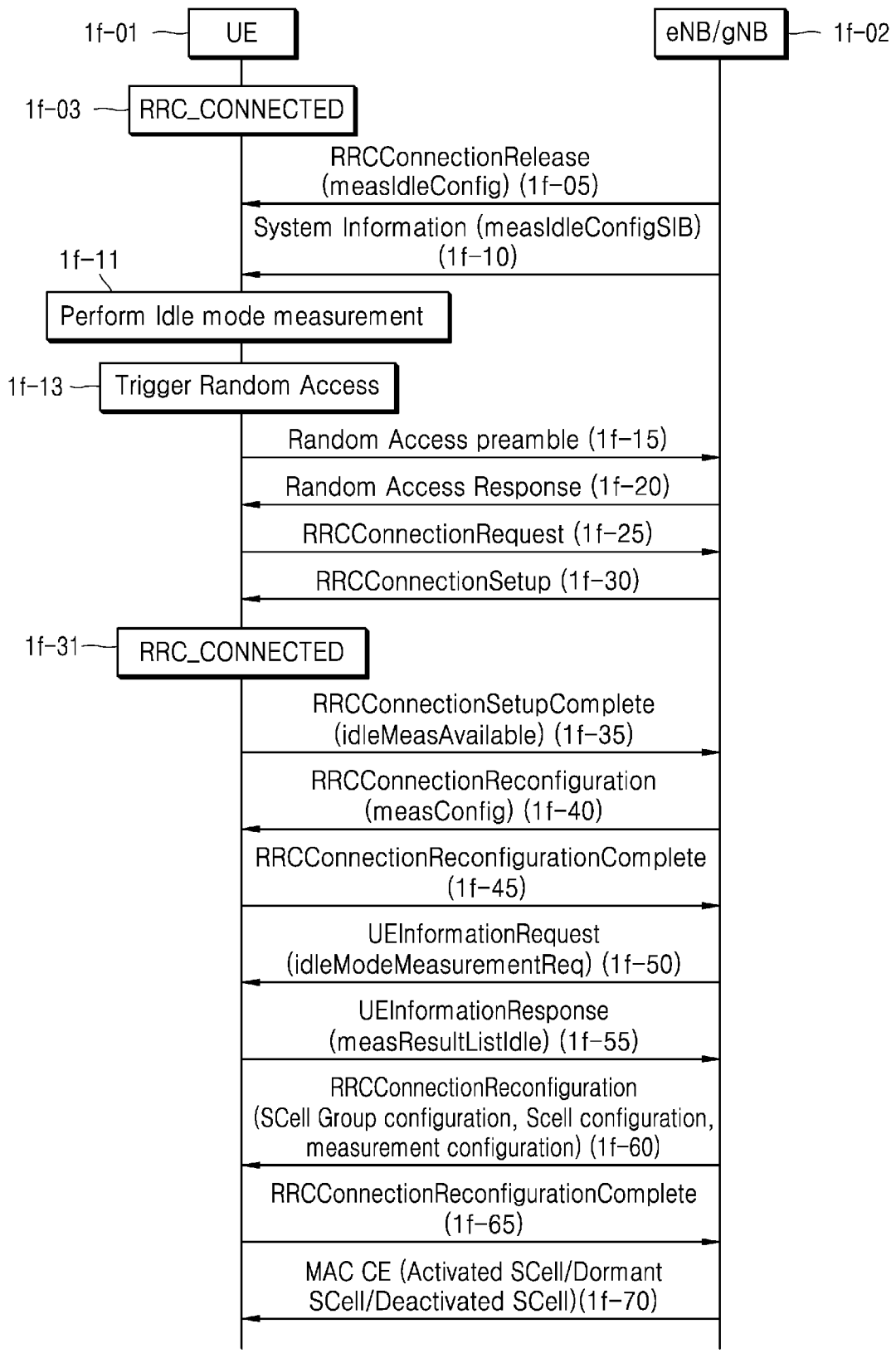
FIG. 1F illustrates a diagram for describing a procedure in which a UE supporting idle mode measurement performs the idle mode measurement and a base station configures CA for the UE, according to an embodiment of the disclosure.

FIG. 1F illustrates a diagram for describing a procedure in which a UE supporting an idle mode measurement releases an RRC connection with an eNB/gNB to perform the idle mode measurement and the eNB/gNB configures CA for the UE, based on a result of the idle mode measurement, according to an embodiment of the disclosure.

According to an embodiment of the disclosure, the UE may perform a cell selection procedure and/or a cell reselection procedure via frequency measurement in order to search for a cell to be camped on or a serving cell in the RRC idle mode. The UE may measure one or more frequencies in the RRC idle mode and may store results of the measurements, separately. In other words, the eNB/gNB may transmit measurement configuration information available in the RRC idle mode (measIdleConfig) in an RRCConnectionRelease message or system information (e.g., SIB5 or a new SIBx) to the UE, and the UE may measure at least one frequency, based on the measIdleConfig, and, when a set condition is satisfied, may transit to the RRC connected mode and then transmit a MeasurementReport message to the eNB/gNB. Alternatively, when the eNB/gNB transmits a UEInformationRequest message to the UE that has transited from the RRC idle mode to the RRC connected mode in order to request a measurement result, the UE in the RRC connected mode may transmit to the eNB/gNB a UEInformationResponse message including a result of a measurement performed in the RRC idle mode. This may delay application of existing CA by a long time.

Referring to FIG. 1F, a UE 1f-01 may establish an RRC connection with an eNB/gNB 1f-02 and thus may be in the RRC connected mode (operation 1f-03). When the UE 1f-01 that transmits or receives data in the RRC connected mode does not transmit or receive data for a certain reason or for a certain time, the eNB/gNB 1f-02 may transmit an RRCConnectionRelease message to the UE 1f-01 such that the UE 1f-01 switches to the RRC idle mode (operation 1f-05). The RRCConnectionRelease message may include measurement configuration information available in the RRC idle mode (measIdleConfig). The measIdleConfig being an IE may include at least one of the following parameters.

A carrier frequency list used for measurement by a UE in the RRC idle mode (measIdleCarrierList)

According to an embodiment, each carrier frequency that is used for measurement in the RRC idle mode may include at least one of a CarrierFreq containing an absolute radio frequency channel number value (ARFCN-Value), an indicator (allowedMeasBandwidth) indicating a measurement-allowable bandwidth, a cell list (validityArea) on which a UE is requested to perform an idle mode measurement, a cell list (measCellList) on which the UE is requested to perform an idle mode measurement and report a result of the idle mode measurement, a threshold of reference signal received power (RSRP) and/or reference signal received quality (RSRQ) used by the UE to determine whether to report cells measured through an idle mode measurement, or an indicator (reportQuantities) indicating whether the UE reports a result value of the cells measured through an idle mode measurement with the RSRP, or the RSRQ, or both the RSRP or the RSRQ.

The carrier frequency list (measIdleCarrierList) used for measurement in the RRC idle mode may be included in singular or in plural. For example, the measIdleCarrierList may be divided into measIdleCarrierListEUTRA and measIdleCarrierListNR according to radio access technologies.

A value representing a duration while the UE performs measurement in the RRC idle mode (measIdleDuration)

According to an embodiment, the measIdleDuration may represent a timer T311 value or a new timer T3xx value.

The UE may perform idle mode measurement after the UE receives the RRCConnectionRelease message and before the measIdleDuration expires.

When the RRCConnectionRelease message includes measIdleConfig in operation 1f-05, the UE 1f-01 may delete VarMeasIdleConfig and VarMeasIdleReport being UE variables. The UE may store, in the measIdleConfig, the value representing the duration while the UE performs measurement in the RRC idle mode (e.g., measIdleDuration), and may drive a timer by applying the value representing the duration while the UE performs measurement in the RRC idle mode. When the RRCConnectionRelease message includes the carrier frequency list used for measurement by the UE in the RRC idle mode, the UE 1f-01 may store the carrier frequency list and perform idle mode measurement while a timer is operating in supportable carriers, based on the stored carrier frequency list (operation 1f-11). When the RRCConnectionRelease message does not include the carrier frequency list used for measurement by the UE in the RRC idle mode, the UE 1f-01 may receive system information by searching for and camping on a suitable cell, via a cell selection procedure and/or a cell reselection procedure (operation 1f-10). When a carrier frequency list measIdleConfigSIB used for measurement in the RRC idle mode is included in the received system information, the UE 1f-01 may store the received measIdleConfigSIB while the on-going operation of the timer continues, or may replace the carrier frequency list within the UE 1f-01, based on the received measIdleConfigSIB, and perform idle mode measurement while the timer is operating in supportable carriers, based on the carrier frequency list (operation 1f-11). When system information that is broadcast by a target cell does not include the measIdleConfigSIB through a cell reselection procedure, the UE 1f-01 may stop the on-going idle mode measurement.

The UE 1f-01 may trigger a random access in order to establish an RRC connection with the eNB/gNB 1f-02 (operation 1f-13). When the random access is triggered, the UE 1f-01 may select a PRACH occasion and transmit a Random Access Preamble to the eNB/gNB 1f-02 (operation 1f-15). In response to the Random Access Preamble, the eNB/gNB 1f-02 may transmit an RAR message to the UE 1f-01 (operation 1f-20). The UE 1f-01 in the RRC idle mode may establish an inverse direction transmission synchronization with the eNB/gNB 1*f*-02 through operations 1*f*-15 and 1*f*-20.

The UE 1*f*-01 in the RRC idle mode that has established an inverse direction transmission synchronization may perform an RRC connection establishment procedure with the eNB/gNB 1*f*-02. First, the UE 1*f*-01 may transmit a RRCConnectionRequest message to the eNB/gNB 1*f*-02 (operation 1*f*-20). The RRCConnectionRequest message may include an identity of the UE 1*f*-01, an establishment cause for establishing an RCC connection, or the like. In response to the RRCConnectionRequest message, the eNB/gNB 1*f*-02 may transmit an RRCConnectionSetup message to the UE 1*f*-01 (operation 1*f*-30). The RRCConnectionSetup message may include radio resource setup information (RadioResourceConfigDedicated, radioBearerConfig, or masterCellGroup). In response to the RRCConnectionSetup message, the UE 1*f*-01 may set the radio resource setup information and may switch the RRC idle mode to the RRC connected mode (operation 1*f*-31). RRC connection establishment may be accompanied by connection of SRB1. Accordingly, an RRC message or an RRC message including a NAS message or an initial NAS message that is a control message between a UE and a BS may be transmitted and received via SRB1. When the system information received in operation 1*f*-10 includes an indicator (idleModeMeasurements) indicating that the eNB/gNB 1*f*-02 is able to process idle mode measurement of the UE 1*f*-01, and the VarMeasIdleReport as a UE variable includes idle mode measurement information by performing idle mode measurement in operation 1*f*-11, the UE 1*f*-01 switched to the RRC connected mode may include, in an RRCConnectionSetupComplete message, an indicator (idleMeasAvailable) indicating that an idle mode measurement report is possible. The UE 1*f*-01 may stop when the timer (for example, T311 or T3xx) keeps operating. The UE 1*f*-01 in the RRC connected mode may transmit the RRCConnectionSetupComplete message to the eNB/gNB 1*f*-02 through SRB1 (operation 1*f*-35). The RRCConnectionSetupComplete message may include a service request message transmitted by the UE 1*f*-01 to request an AMF or MME for bearer configuration for a certain service.

When the RRC connection establishment procedure is successfully performed, the eNB/gNB 1*f*-02 may perform an RRC connection reconfiguration procedure with the UE 1*f*-01. First, the eNB/gNB 1*f*-02 may transmit an RRCConnectionReconfiguration message to the UE 1*f*-01 (operation 1*f*-40). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1*f*-01 may apply the information included in the RRCConnectionReconfiguration message, and then may transmit an RRCConnectionReconfigurationComplete message to the eNB/gNB 1*f*-02 (operation 1*f*-45).

When the RRCConnectionSetupComplete message includes the indicator (idleMeasAvailable) indicating that an idle mode measurement report is possible, in operation 1*f*-35, the eNB/gNB 1*f*-02 may perform a UE information procedure with the UE 1*f*-01. The UE information procedure may be immediately performed without performing the above-described RRC connection reconfiguration procedure (including operations 1*f*-40 and 1*f*-45). The eNB/gNB 1*f*-02 may transmit, to the UE 1*f*-01 in the RRC connected mode, a UEInformationRequest message including an indicator (idleModeMeasurementReq) requesting a result of the measurement performed in the RRC idle mode (operation 1*f*-50). When security is successfully configured, the UE 1*f*-01 that has received the UEInformationRequest message may perform the following processes.

1> When the UEInformationRequest message includes the indicator (idleModeMeasurementReq) requesting a result of the measurement performed in the RRC idle mode and the UE 1*f*-01 has stored the VarMeasIdleReport, 2> measResultListIdle included in a UEInformationResponse message is set as a measReportIdle value (or an idleMeasReport value) included in the VarMeasIdleReport.

2> When it is confirmed by lower layers that the UEInformationResponse message was transmitted successfully, the VarMeasIdleReport is discarded.

1> The UEInformationResponse message is submitted to the lower layers via the SRB1. The UE 1*f*-01 may transmit, to the eNB/gNB 1*f*-02, the UEInformationReponse message including a list (measResultListIdle) of results of the measurements performed in the RRC idle mode (operation 1*f*-55).

In the above description, the measResultListIdle as an IE may mean a list of measResultIdle as an IE individually configured for one or more neighboring inter-frequency carriers by the UE 1*f*-01 in the RRC idle mode. A UE according to an embodiment of the disclosure may configure measResultIdle for each neighboring inter-frequency carrier when transmitting the UEInformationResponse message, by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC idle mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), measResultIdle may not include measResultServingCell.
   When the measResultIdle includes measResultServingCell for each neighboring inter-frequency carrier, the measResultIdle may include the same serving cell measurement results.
   The measResultServingCell may include or may not include at least one of the following result values.
   RSRP result values (rsrpResult)
   RSRQ result values (rsrqResult)
   A measurement result of neighboring cells for each neighboring inter-frequency carrier may include at least one of the following parameters.
   A carrier frequency (CarrierFreq) containing an absolute radio frequency channel number value (ARFCN-Value)
   A physical cell identifier (phyCellId) of each neighboring cell
   RSRP result value (rsrpResult)
   RSRQ result value (rsrqResult)
   When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an absolute radio frequency channel number value (ARFCN-Value)

A physical cell identifier (phyCellId) of each neighboring cell

RSRP result value (rsrpResult)

RSRQ result value (rsrqResult)

When the measResultListIdle is included in the UEInformationResponse message in operation 1f-55, the eNB/gNB 1f-02 may perform an RRC connection reconfiguration procedure with the UE 1f-01. First, the eNB/gNB 1f-02 may transmit an RRCConnectionReconfiguration message to the UE 1f-01 (operation 1f-60). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1f-01 may apply the information included in the RRCConnectionReconfiguration message, and then may transmit the RRCConnectionReconfigurationComplete message to the eNB/gNB 1f-02 (operation 1f-65).

The RRCConnectionReconfiguration message in operation 1f-60 may include a common configuration parameter for configuration of several SCells (Scell Group configuration) at one time or a configuration parameter (SCell configuration) for each of the SCells. When the RRCConnectionReconfiguration message includes a common configuration parameter for several SCells, at least one of the following methods may be applied.

Method 1: The RRCConnectionReconfiguration message may include a common parameter for each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include a list (sCellToReleaseList) for releasing one or more cells from each SCell group.

Method 2: The RRCConnectionReconfiguration message may include a common parameter for each SCell group and different parameters for different SCells in each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCConnectionReconfiguration message may include a list (sCellToReleaseList) for releasing one or more cells from each SCell group.

The eNB/gNB 1f-02 may apply CA by indicating a state (activated, dormant, or deactivated state) of each SCell configured in the UE 1f-01 by using a MAC CE (operation 1f-70).

Figure 1G:
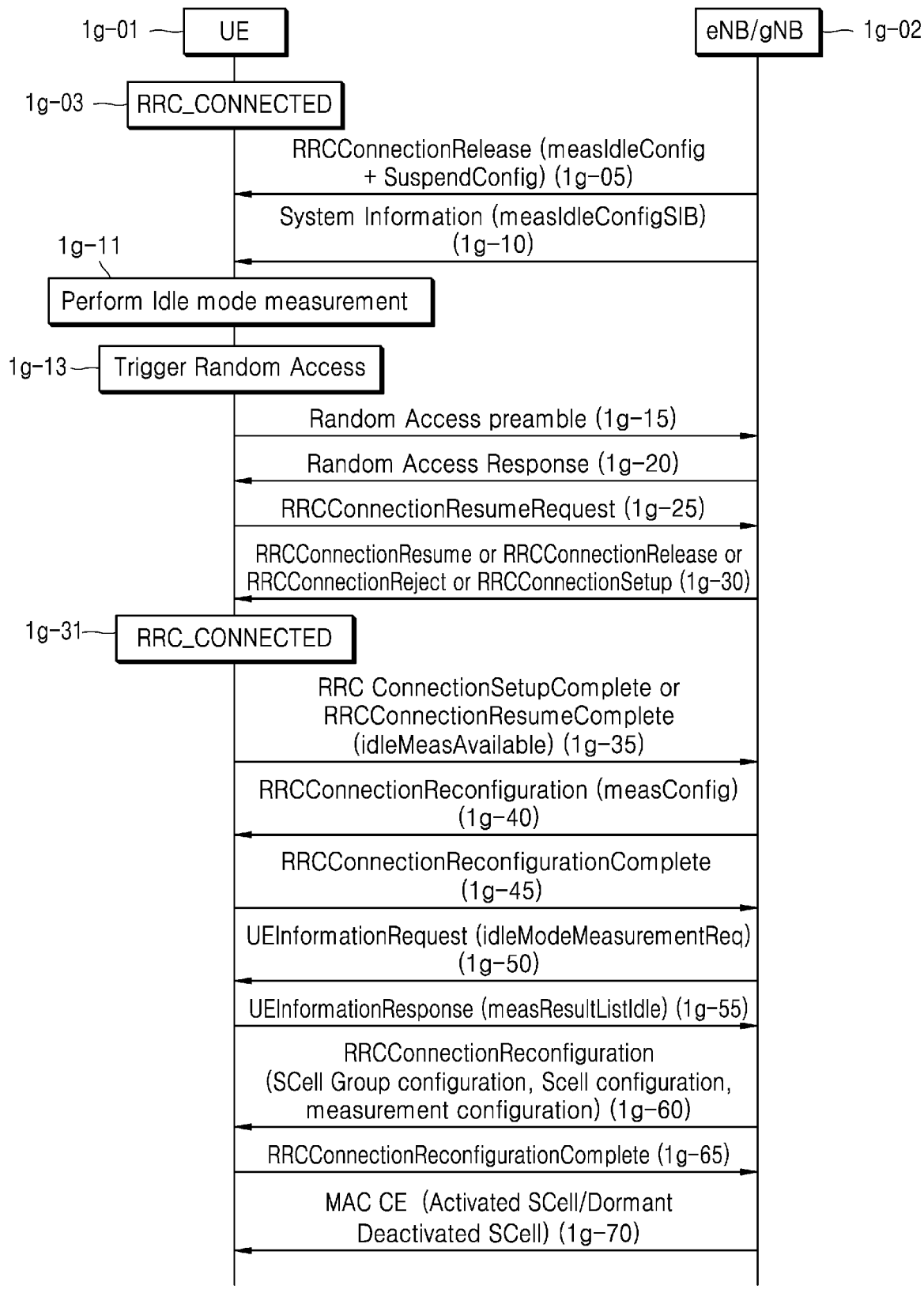
FIG. 1G illustrates a diagram for describing a procedure in which a UE performs the idle mode measurement and a base station configures CA for the UE, according to an embodiment of the disclosure.

FIG. 1G illustrates a diagram for describing a procedure in which a UE supporting an idle mode measurement releases an RRC connection with an eNB/gNB to perform the idle mode measurement and the eNB/gNB configures CA for the UE, based on a result of the idle mode measurement, according to an embodiment of the disclosure.

The UE according to an embodiment of the disclosure may perform a cell selection procedure and/or a cell reselection procedure via frequency measurement in order to search for a cell to be camped on or a serving cell in an RRC inactive mode. The UE may separately measure one or more frequencies in the RRC inactive mode and may store results of the measurements. In other words, the eNB/gNB may signal measurement configuration information available in the RRC inactive mode (measIdleConfig) in an RRCConnectionRelease message or system information (e.g., SIB5 or a new SIBx) to the UE, and the UE may measure at least one frequency, based on the measIdleConfig, and, when a set condition is satisfied, may transit to the RRC connected mode and then transmit a MeasurementReport message to the eNB/gNB. Alternatively, when the eNB/gNB transmits a UEInformationRequest message to the UE that has transited from the RRC inactive mode to the RRC connected mode in order to request a measurement result, the UE in the RRC connected mode may transmit to the eNB/gNB a UEInformationResponse message including a result of a measurement performed in the RRC inactive mode. This may delay application of existing CA by a long time.

Referring to FIG. 1G, a UE 1g-01 may establish an RRC connection with an eNB/gNB 1g-02 and thus may be in the RRC connected mode (operation 1g-03). When the UE 1g-01 that transmits or receives data in the RRC connected mode does not transmit or receive data for a certain reason or for a certain time, the eNB/gNB 1g-02 may transmit an RRCConnectionRelease message to the UE 1f-01 such that the UE 1g-01 switches to the RRC inactive mode (operation 1g-05). The RRCConnectionRelease message may include measurement configuration information available in the RRC inactive mode (measIdleConfig). The measIdleConfig being an IE may include at least one of the following parameters.

A carrier frequency list used for measurement by a UE in the RRC inactive mode (measIdleCarrierList)

According to an embodiment, each carrier frequency that is used for measurement in the RRC inactive mode may include at least one of a CarrierFreq containing an absolute radio frequency channel number value (ARFCN-Value), an indicator (allowedMeasBandwidth) indicating a measurement-allowable bandwidth, a cell list (validityArea) on which a UE is requested to perform an idle mode measurement, a cell list (measCellList) on which the UE is requested to perform an idle mode measurement and report a result of the idle mode measurement, a threshold of reference signal received power (RSRP) and/or reference signal received quality (RSRQ) used by the UE to determine whether to report cells measured through an idle mode measurement, or an indicator (reportQuantities) indicating whether the UE reports a result value of the cells measured through an idle mode measurement with the RSRP, or the RSRQ, or both the RSRP and the RSRQ.

The carrier frequency list used for measurement in the RRC inactive mode may be included in singular or in plural. For example, the carrier frequency list may be represented by measIdleCarrierListEUTRA or measIdleCarrierListNR according to radio access technologies.

A value representing a duration while the UE performs measurement in the RRC inactive mode (measIdleDuration)

According to an embodiment, the measIdleDuration may represent a timer T311 value or a new timer T3xx value.

The UE may perform idle mode measurement after the UE receives the RRCConnectionRelease message and before the measIdleDuration expires.

When the RRCConnectionRelease message includes measIdleConfig in operation 1g-05, the UE 1g-01 may delete VarMeasIdleConfig and VarMeasIdleReport being UE variables. The UE may store, in the measIdleConfig, the value representing the duration while the UE performs measurement in the RRC inactive mode (e.g., measIdleDuration), and may drive a timer by applying the value representing the duration while the UE performs measurement in the RRC inactive mode. When the RRCConnectionRelease message includes the carrier frequency list used for measurement by the UE in the RRC inactive mode, the UE 1g-01 may store the carrier frequency list and perform idle mode measurement while a timer is operating in supportable carriers, based on the stored carrier frequency list (operation 1g-11). When the RRCConnectionRelease message does not include the carrier frequency list used for measurement by the UE in the RRC inactive mode, the UE 1g-01 may receive system information by searching for and camping on a suitable cell, via a cell selection procedure and/or a cell reselection procedure (operation 1g-10). When a carrier frequency list measIdleConfigSIB used for measurement in the RRC inactive mode is included in the received system information, the UE 1g-01 may store the received measIdleConfigSIB while the on-going operation of the timer continues, or may replace the carrier frequency list within the UE 1g-01, based on the received measIdleConfigSIB, and perform idle mode measurement while the timer is operating in supportable carriers, based on the carrier frequency list (operation 1g-11). When system information that is broadcast by a target cell does not include the measIdleConfigSIB through a cell reselection procedure, the UE 1g-01 may stop the on-going idle mode measurement.

The UE 1g-01 may trigger a random access in order to establish an RRC connection with the eNB/gNB 1g-02 (operation 1g-13). When the random access is triggered, the UE 1g-01 may select a PRACH occasion and transmit a Random Access Preamble to the eNB/gNB 1g-02 (operation 1g-15). In response to the Random Access Preamble, the eNB/gNB 1g-02 may transmit an RAR message to the UE 1g-01 (operation 1g-20). The UE 1g-01 in the RRC inactive mode may establish an inverse direction transmission synchronization with the eNB/gNB 1g-02 through operations 1g-15 and 1g-20.

The UE 1g-01 in the RRC inactive mode that has established an inverse direction transmission synchronization may perform an RRC connection resume procedure with the eNB/gNB 1g-02. First, the UE 1g-01 may transmit a RRC-ConnectionResumeRequest message to the eNB/gNB 1g-02 (operation 1g-20). The RRCConnectionResumeRequest message may include an identity of the UE 1g-01 (resume-Identity), a cause for resuming an RCC connection (resume-Cause), or the like. In response to the RRCConnectionResumeRequest message, the eNB/gNB 1g-02 may transmit, to the UE 1g-01, an RRCConnectionResume message, an RRCConnectionRelease message, an RRCConnectionReject message, or an RRCConnectionSetup message (operation 1g-30).

The RRCConnectionResumeRequest message may include radio resource setup information (RadioResourceConfigDedicated and/or radioBearerConfig and/or masterCellGroup and/or secondaryCellGroup). Alternatively, the RRCConnectionResumeRequest message may include measurement configuration information (measIdleConfig). The measurement configuration information may be signaled separately for a master cell group (MCG) and a secondary cell group (SCG). In response to the RRCConnectionResume message, the UE 1g-01 may set the radio resource setup information and may switch the RRC inactive to the RRC connected mode (operation 1g-31). When the system information received in operation 1g-10 includes an indicator (idleModeMeasurements) indicating that the eNB/gNB 1g-02 is able to process idle mode measurement of the UE 1g-01, and the VarMeasIdleReport as a UE variable includes idle mode measurement information by performing idle mode measurement in operation 1g-11, the UE 1g-01 switched to the RRC connected mode may include, in an RRCConnectionResumeComplete message, an indicator (idleMeasAvailable) indicating that an idle mode measurement report is possible. The UE 1g-01 may stop when the timer (for example, T311 or T3xx) keeps operating. The UE 1g-01 in the RRC connected mode may transmit the RRC-ConnectionResumeComplete message to the eNB/gNB 1g-02 through SRB1 (operation 1g-35).

When the eNB/gNB 1g-02 transmits the RRCConnectionRelease message to the UE 1g-01 in operation 1g-30, the UE 1g-01 may apply at least one of the following methods.

When the RRCConnectionRelease message does not include the measIdleConfig, the UE 1g-01 may keep driving the timer driven in operation 1g-05 or stop the timer, or may initialize the timer value of the timer to a pre-stored timer value and then drive the timer. When the UE 1g-01 stops the timer, the UE 1g-01 may delete the VarMeasIdleConfig and the VarMeasIdleReport as UE variables and may stop the idle mode measurement. When the UE 1g-01 keeps driving the timer, the UE 1g-01 may maintain pre-stored UE variable values and may continuously perform the idle mode measurement until the timer expires. When the UE 1g-01 initializes the timer value of the timer to a pre-stored timer value and then drive the timer, the UE 1g-01 may maintain pre-stored UE variable values and may perform the idle mode measurement until a newly driven timer expires.

When the RRCConnectionRelease message includes the measIdleConfig, the UE 1g-01 may replace a value stored in operation 1g-05 or 1g-10.

The UE 1g-01 may continue to drive the timer driven in operation 1g-05 or re-drive the timer with a measuring-performing value newly signaled in operation 1g-30, thereby performing the idle mode measurement until the re-driven timer expires.

When the RRCConnectionRelease message includes suspendConfig, the UE 1g-01 may maintain the RRC inactive mode and re-perform the RRC connection resume procedure with the eNB/gNB 1g-02.

When the RRCConnectionRelease message does not include suspendConfig, the UE 1g-01 may transit to the RRC idle mode and perform an RRC connection establishment procedure with the eNB/gNB 1g-02 according to the above-describe embodiment.

When the eNB/gNB 1g-02 transmits the RRCConnectionReject message to the UE 1g-01 in operation 1g-30, the UE 1g-01 may apply at least one of the following methods.

When the RRCConnectionReject message includes waitTime, the UE 1g-01 may keep driving the timer driven in operation 1g-05 or may initialize the timer value of the timer to a pre-stored timer value and then drive the timer. When the UE 1g-01 stops the timer, the UE 1g-01 may delete the VarMeasIdleConfig and the VarMeasIdleReport as UE variables and may stop the idle mode measurement. When the UE 1g-01 keeps driving the timer, the UE 1g-01 may maintain pre-stored UE variable values and may continuously perform the idle mode measurement until the timer expires. When the UE 1g-01 initializes the timer value of the timer to a pre-stored timer value and then drive the timer, the UE 1g-01 may maintain pre-stored UE variable values and may perform the idle mode measurement until a newly driven timer expires. After the UE 1g-01 transits to the RRC idle mode, receives the RRCConnectionReject message, and then waits for the waitTime, the UE 1g-01 may perform an RRC connection establishment procedure with the eNB/gNB 1g-02 according to the above-describe embodiment. Alternatively, after the UE 1g-01 maintains the RRC inactive mode, receives the RRCConnectionReject message, and then waits for the waitTime, the UE 1g-01 may re-perform an RRC connection resume procedure with the eNB/gNB 1g-02 according to the above-describe embodiment.

When the RRCConnectionReject message does not include the waitTime, the UE 1g-01 may keep driving the timer driven in operation 1g-05 or may initialize the timer value of the timer to a pre-stored timer value and then drive the timer. When the UE 1g-01 stops the timer, the UE 1g-01 may delete the VarMeasIdleConfig and the VarMeasIdleReport as UE variables and may stop the idle mode measurement. When the UE 1g-01 keeps driving the timer, the UE 1g-01 may maintain pre-stored UE variable values and may continuously perform the idle mode measurement until the timer expires. When the UE 1g-01 initializes the timer value of the timer to a pre-stored timer value and then drive the timer, the UE 1g-01 may maintain pre-stored UE variable values and may perform the idle mode measurement until a newly driven timer expires. After the UE 1g-01 transits to the RRC idle mode, receives the RRCConnectionReject message, and then waits for the waitTime, the UE 1g-01 may perform an RRC connection establishment procedure with the eNB/gNB 1g-02 according to the above-describe embodiment.

When the eNB/gNB 1g-02 transmits an RRCConnectionResume message or an RRCConnection establishment message to the UE 1g-01 in operation 1g-30, the UE 1g-01 may stop the timer driven in operation 1g-05 and may delete the VarMeasIdleConfig and the VarMeasIdleReport as UE variables and stop the idle mode measurement.

When the RRC connection establishment procedure or the RRC connection resume procedure is successfully performed, the eNB/gNB 1g-02 may perform an RRC connection reconfiguration procedure with the UE 1g-01. First, the eNB/gNB 1g-02 may transmit an RRCConnectionReconfiguration message to the UE 1g-01 (operation 1g-40). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1g-01 may apply the information included in the RRCConnectionReconfiguration message, and then may transmit an RRCConnectionReconfiguration-Complete message to the eNB/gNB 1g-02 (operation 1g-45).

When the RRCConnectionSetupComplete message or the RRCConnectionResumeComplete message includes the indicator (idleMeasAvailable) indicating that an idle mode measurement report is possible, in operation 1g-35, the eNB/gNB 1g-02 may perform a UE information procedure with the UE 1g-01. The UE information procedure may be immediately performed without performing the above-described RRC connection reconfiguration procedure (including operations 1g-40 and 1g-45). The eNB/gNB 1g-02 may transmit, to the UE 1g-01 in the RRC connected mode, a UEInformationRequest message including an indicator (idleModeMeasurementReq) requesting a result of the measurement performed in the RRC idle mode or the RRC inactive mode (operation 1g-50). When security is successfully configured, the UE 1g-01 that has received the UEInformationRequest message may perform the following processes.

1> When the UEInformationRequest message includes the indicator (idleModeMeasurementReq) requesting a result of the measurement performed in the RRC inactive mode or the RRC idle mode and the UE 1g-01 has stored the VarMeasIdleReport, 2> measResultListIdle included in a UEInformationResponse message is set as a measReportIdle value (or an idleMeasReport value) included in the VarMeasIdleReport.

2> When it is confirmed by lower layers that the UEInformationResponse message was transmitted successfully, the VarMeasIdleReport is discarded.

1> The UEInformationResponse message is submitted to the lower layers via the SRB1. The UE 1g-01 may transmit, to the eNB/gNB 1g-02, the UEInformationReponse message including a list (measResultListIdle) of results of the measurements performed in the RRC inactive mode or the RRC idle mode (operation 1g-55).

In the above description, the measResultListIdle as an IE may mean a list of measResultIdle as an IE individually configured for one or more neighboring inter-frequency carriers by the UE 1g-01 in the RRC inactive mode or the RRC idle mode. A UE according to an embodiment of the disclosure may configure measResultIdle for each neighboring inter-frequency carrier when transmitting the UEInformationResponse message, by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC inactive mode or the RRC idle mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), the measResultIdle may not include measResultServingCell.

When the measResultIdle includes the measResultServingCell, the measResultIdle may include the same serving cell measurement results for each neighboring inter-frequency carrier.

The measResultServingCell may include or may not include at least one of the following result values.

RSRP result values (rsrpResult)

RSRQ result value (rsrqResult)

A measurement result of neighboring cells for each neighboring inter-frequency carrier may include at least one of the following parameters.

A carrier frequency (CarrierFreq) containing an absolute radio frequency channel number value (ARFCN-Value)

A physical cell identifier (phyCellId) of each neighboring cell

RSRP result value (rsrpResult)

RSRQ result value (rsrqResult)

When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an absolute radio frequency channel number value (ARFCN-Value)

A physical cell identifier (phyCellId) of each neighboring cell

RSRP result value (rsrpResult)

RSRQ result value (rsrqResult)

When the measResultListIdle is included in the UEInformationResponse message in operation 1g-55, the eNB/gNB 1g-02 may perform an RRC connection reconfiguration procedure with the UE 1g-01. First, the eNB/gNB 1g-02 may transmit an RRCConnectionReconfiguration message to the UE 1g-01 (operation 1g-60). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1g-01 may apply the information included in the RRCConnectionReconfiguration message, and then may transmit the RRCConnectionReconfigurationComplete message to the eNB/gNB 1g-02 (operation 1g-65).

The RRCConnectionReconfiguration message in operation 1g-60 may include a common configuration parameter for configuration of several SCells (Scell Group configuration) at one time or a configuration parameter (SCell configuration) for each of the SCells. When the RRCConnectionReconfiguration message includes a common configuration parameter for several SCells, at least one of the following methods may be applied.

Method 1: The RRCConnectionReconfiguration message may include a common parameter for each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include a list (sCellToReleaseList) for releasing one or more cells from each SCell group.

Method 2: The RRCConnectionReconfiguration message may include a common parameter for each SCell group and different parameters for different SCells in each SCell group (for example, SCellGroupToAddModList or SCellGroup-ToReleaseList).

Because a plurality of SCell groups may exist, the RRC-ConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCConnectionReconfiguration message may include a list (sCellToReleaseList) for releasing one or more cells from each SCell group.

The eNB/gNB 1g-02 may apply CA by indicating a state (activated, dormant, or deactivated state) of each SCell configured in the UE 1g-01 by using a MAC CE (operation 1g-70).

Figure 1H:
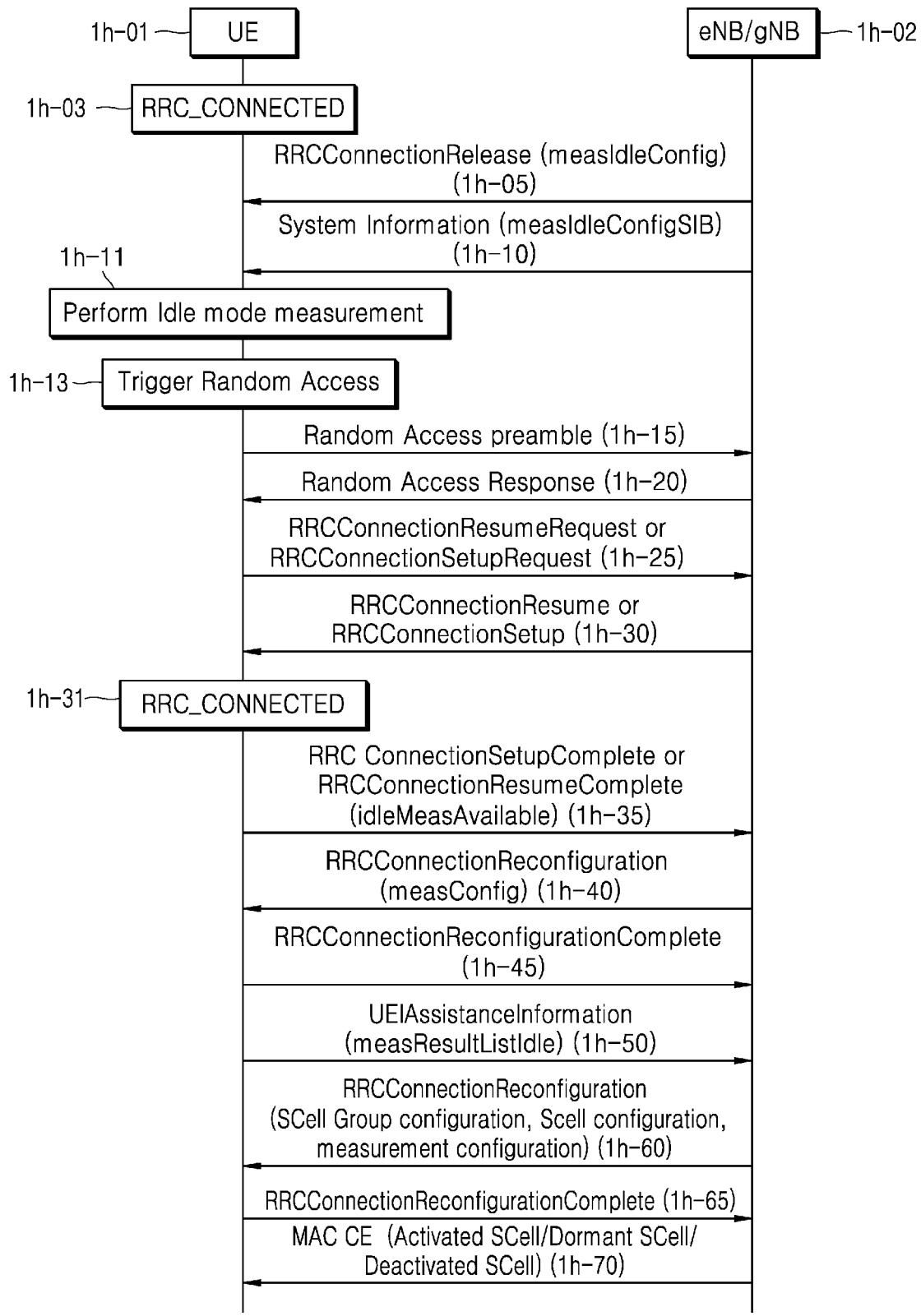
FIG. 1H illustrates a diagram for describing a procedure in which a UE performs the idle mode measurement and a base station configures CA for the UE, according to an embodiment of the disclosure.

FIG. 1H illustrates a diagram for describing a procedure in which a UE supporting an idle mode measurement releases an RRC connection with an eNB/gNB to perform the idle mode measurement and the eNB/gNB configures CA for the UE, based on a result of the idle mode measurement, according to an embodiment of the disclosure.

According to an embodiment of the disclosure, the UE may perform a cell selection procedure and/or a cell reselection procedure via frequency measurement in order to search for a cell to be camped on or a serving cell in the RRC idle mode or the RRC inactive mode. The UE may separately measure one or more frequencies in the RRC idle mode or the RRC inactive mode and may store results of the measurements. In other words, the eNB/gNB may signal measurement configuration information available in the RRC idle mode or the RRC inactive mode (measIdleConfig) in an RRCConnectionRelease message or system information (e.g., SIB5 or a new SIBx) to the UE, and the UE may measure at least one frequency, based on the measIdleConfig, and, when a set condition is satisfied, may transit to the RRC connected mode and then transmit a MeasurementReport message to the eNB/gNB. Alternatively, when the eNB/gNB transmits a UEInformationRequest message to the UE that has transited from the RRC idle mode or the RRC inactive mode to the RRC connected mode in order to request a measurement result, the UE in the RRC connected mode may transmit to the eNB/gNB a UEInformationResponse message including a result of a measurement performed in the RRC idle mode or the RRC inactive mode. Alternatively, the UE in the RRC connected mode may transmit to the eNB/gNB an UEAssistanceInformation message including a result of the measurement performed in the RRC idle mode or the RRC inactive mode. This may delay application of existing CA by a long time.

Referring to FIG. 1H, a UE 1h-01 may establish an RRC connection with an eNB/gNB 1h-02 and thus may be in the RRC connected mode (operation 1h-03). When the UE 1h-01 that transmits or receives data in the RRC connected mode does not transmit or receive data for a certain reason or for a certain time, the eNB/gNB 1h-02 may transmit an RRCConnectionRelease message to the UE 1h-01 such that the UE 1h-01 switches to the RRC inactive mode or the RRC idle mode (operation 1h-05). The RRCConnectionRelease message may include measurement configuration information available in the RRC inactive mode or the RRC idle mode (measIdleConfig). The measIdleConfig being an IE may include at least one of the following parameters.

A carrier frequency list used for measurement by a UE in the RRC inactive mode or the RRC idle mode (measIdleCarrierList)

According to an embodiment, each carrier frequency that is used for measurement in the RRC inactive mode or the RRC idle mode may include at least one of a CarrierFreq containing an absolute radio frequency channel number value (ARFCN-Value), an indicator (allowedMeasBandwidth) indicating a measurement-allowable bandwidth, a cell list (validityArea) on which a UE is requested to perform an idle mode measurement, a cell list (measCellList) on which the UE is requested to perform an idle mode measurement and report a result of the idle mode measurement, a threshold of reference signal received power (RSRP) and/or reference signal received quality (RSRQ) used by the UE to determine whether to report cells measured through an idle mode measurement, or an indicator (reportQuantities) indicating whether the UE reports a result value of the cells measured through an idle mode measurement with the RSRP, the RSRQ, or both the RSRP and the RSRQ.

The carrier frequency list used for measurement in the RRC inactive mode or the RRC idle mode may be included in singular or in plural. For example, the measIdleCarrierList may be divided into measIdleCarrierListEUTRA and measIdleCarrierListNR according to radio access technologies.

A value representing a duration while the UE performs measurement in the RRC inactive mode or the RRC idle mode (measIdleDuration)

According to an embodiment, the measIdleDuration may represent a timer T311 value or a new timer T3xx value.

The UE may perform idle mode measurement after the UE receives the RRCConnectionRelease message and before the measIdleDuration expires.

When the RRCConnectionRelease message includes measIdleConfig in operation 1h-05, the UE 1h-01 may delete VarMeasIdleConfig and VarMeasIdleReport being UE variables. The UE may store, in the measIdleConfig, the value representing the duration while the UE performs measurement in the RRC inactive mode or the RRC idle mode (e.g., measIdleDuration), and may drive a timer by applying the value representing the duration while the UE performs measurement in the RRC inactive mode or the RRC idle mode. When the RRCConnectionRelease message includes the carrier frequency list used for measurement by the UE in the RRC inactive mode or the RRC idle mode, the UE 1h-01 may store the carrier frequency list and perform idle mode measurement while a timer is operating in supportable carriers, based on the stored carrier frequency list (operation 1h-11). When the RRCConnectionRelease message does not include the carrier frequency list used for measurement by the UE in the RRC inactive mode or the RRC idle mode, the UE 1h-01 may receive system information by searching for and camping on a suitable cell, via a cell selection procedure and/or a cell reselection procedure (operation 1h-10). When a carrier frequency list measIdleConfigSIB used for measurement in the RRC inactive mode or the RRC idle mode is included in the received system information, the UE 1h-01 may store the received measIdleConfigSIB while the on-going operation of the timer continues, or may replace the carrier frequency list within the UE 1h-01, based on the received measIdleConfigSIB, and perform idle mode measurement while the timer is operating in supportable carriers, based on the carrier frequency list (operation 1h-11). When system information that is broadcast by a target cell does not include the measIdleConfigSIB through a cell reselection procedure, the UE 1h-01 may stop the on-going idle mode measurement.

The UE 1h-01 may trigger a random access in order to establish an RRC connection with the eNB/gNB 1h-02 (operation 1h-13). When the random access is triggered, the UE 1h-01 may select a PRACH occasion and transmit a Random Access Preamble to the eNB/gNB 1h-02 (operation 1h-15). In response to the Random Access Preamble, the eNB/gNB 1h-02 may transmit an RAR message to the UE 1h-01 (operation 1h-20). The UE 1h-01 in the RRC idle mode or the RRC inactive mode may establish an inverse direction transmission synchronization with the eNB/gNB 1h-02 through operations 1h-15 and 1h-20.

The UE 1h-01 in the RRC inactive mode or the RRC idle mode that has established an inverse direction transmission synchronization may perform an RRC connection establishment procedure or an RRC connection resume procedure with the eNB/gNB 1h-02.

The UE 1h-01 in the RRC idle mode may transmit an RRCConnectionSetupRequest message to the eNB/gNB 1h-02 (operation 1h-25). The RRCConnectionRequest message may include an identity of the UE 1h-01, an establishment cause for establishing an RCC connection, or the like. In response to the RRCConnectionRequest message, the eNB/gNB 1h-02 may transmit an RRCConnectionSetup message to the UE 1h-01 (operation 1h-30). The RRCConnectionSetup message may include radio resource setup information (RadioResourceConfigDedicated, radioBearerConfig, masterCellGroup, or secondaryCellGroup). Alternatively, the RRCConnectionSetup message may include measurement configuration information (measIdleConfig). The measurement configuration information may be signaled separately for a MCG and a SCG. Alternatively, the RRCConnectionSetup message my include a new timer value to transmit, without a request by the eNB/gNB 1h-02, a result of the measurement performed in the RRC idle mode or the RRC inactive mode. For example, a new timer may be driven after receiving an RRCConnectionSetup message, after switching to the RRC connected mode, when transmitting an RRCConnectionSetupComplete message, or after an RRC connection establishment procedure successfully ends. When the driven timer expires, the UE 1h-01 may include, in the UEAssistanceInformation message, a result of the measurement performed in the RRC inactive mode or the RRC idle mode after the RRC connection establishment procedure successfully ends, and may report the UEAssistanceInformation including the result of the measurement in the RRC inactive mode or the RRC idle mode to the eNB/gNB 1h-02. An event where the UE 1h-01 in the RRC connected mode includes, in the UEAssistanceInformation message, a result of the measurement performed in the RRC inactive mode or the RRC idle mode through the RRCConnectionSetup message or via a terminal operation after the RRC connection establishment procedure successfully ends, and reports the UEAssistanceInformation message including the result of the measurement in the RRC inactive mode or the RRC idle mode to the eNB/gNB 1h-02 may be defined. For example, when the RRCConnectionSetup message does not include Scell group configuration information, or when the UE 1h-01 includes, in the RRCConnectionSetupComplete message, an indicator (idleMeasAvailable) indicating that an idle mode measurement report is possible and transmits the RRCConnectionSetupComplete message including the indicator (idleMeasAvailable) to the eNB/gNB 1h-02, or when the eNB/gNB 1h-02 does not configure a SCell Group for a certain time period after the UE 1h-01 transmits the RRCConnectionSetupComplete message including the indicator (idleMeasAvailable) to the eNB/gNB 1h-02, or when the UE 1h-01 transmits, to the eNB/gNB 1h-02, the RRCConnectionSetupComplete message not including the indicator (idleMeasAvailable) indicating that an idle mode measurement report is possible, even when the mode measurement report is possible, or when the UE 1h-01 switched to the RRC connected mode determines to transmit or receive a plurality of pieces of data, or when the UE 1h-01 desires to quickly apply CA, or when the eNB/gNB 1h-02 does not particularly request a measurement result until the above-described timer expires, the UE 1h-01 in the RRC connected mode may include, in the UEAssistanceInformation message, a result of the measurement performed in the RRC inactive mode or the RRC idle mode and report the UEAssistanceInformation message including the result of the measurement in the RRC inactive mode or the RRC idle mode to the eNB/gNB 1h-02. In response to the RRCConnectionSetup message, the UE 1h-01 may set the radio resource setup information and may switch the RRC idle mode to the RRC connected mode (operation 1h-31). When the system information received in operation 1h-10 includes an indicator (idleModeMeasurements) indicating that the eNB/gNB 1h-02 is able to process idle mode measurement of the UE 1h-01, and the VarMeasIdleReport as a UE variable includes idle mode measurement information by performing idle mode measurement in operation 1h-11, the UE 1h-01 switched to the RRC connected mode may include, in an RRCConnectionSetupComplete message, an indicator (idleMeasAvailable) indicating that an idle mode measurement report is possible. The UE 1h-01 may stop when the timer (for example, T311 or T3xx) keeps operating. The UE 1h-01 in the RRC connected mode may transmit the RRCConnectionSetupComplete message to the eNB/gNB 1h-02 through SRB1 (operation 1h-35). The RRCConnectionSetupComplete message may include a service request message transmitted by the UE 1h-01 to request an AMF or MME for bearer configuration for a certain service.

When the RRC connection establishment procedure is successfully performed, the eNB/gNB 1h-02 may perform an RRC connection reconfiguration procedure with the UE 1h-01. First, the eNB/gNB 1h-02 may transmit an RRCConnectionReconfiguration message to the UE 1h-01 (operation 1h-40). The RRCConnectionReconfiguration message may include at least one of configuration information about a DRB to process user data, configuration information about SRB1 and/or SRB2 via which a control message may be transmitted and received, or measurement configuration information (measConfig). Alternatively, the RRCConnectionReconfiguration message my include a new timer value to transmit, without a request by the eNB/gNB 1h-02, a result of the measurement performed in the RRC idle mode or the RRC inactive mode. For example, a new timer may be driven when receiving an RRCConnectionReconfiguration message, when transmitting an RRCConnectionReconfigurationComplete message, or after an RRC connection reconfiguration procedure successfully ends. When the timer expires, the UE 1h-01 in the RRC connected mode may include, in the UEAssistanceInformation message, a result of the measurement performed in the RRC inactive mode or the RRC idle mode after the RRC connection reconfiguration procedure successfully ends, and may report the UEAssistanceInformation message including the result of the measurement in the RRC inactive mode or the RRC idle mode to the eNB/gNB 1h-02. An event where the UE 1h-01 in the RRC connected mode includes, in the UEAssistanceInformation message, a result of the measurement performed in the RRC inactive mode or the RRC idle mode through the RRCConnectionReconfiguration message or via a terminal operation and reports the UEAssistanceInformation message including the result of the measurement in the RRC inactive mode or the RRC idle mode to the eNB/gNB 1h-02 may be defined. For example, when the RRCConnectionReconfiguration message does not include Scell group configuration information, or when the UE 1h-01 includes, in the RRCConnectionSetupComplete message, an indicator (idleMeasAvailable) indicating that an idle mode measurement report is possible and transmits the RRCConnectionSetupComplete message including the indicator (idleMeasAvailable) to the eNB/gNB 1h-02, or when the eNB/gNB 1h-02 does not configure a SCell Group for a certain time period after the UE 1h-01 transmits the RRCConnectionReconfigurationComplete message including the indicator (idleMeasAvailable) to the eNB/gNB 1h-02, or when the UE 1h-01 transmits to the eNB/gNB 1h-02 the RRCConnectionReconfigurationComplete message not including the indicator (idleMeasAvailable) indicating that an idle mode measurement report is possible, even when the mode measurement report is possible, or when the UE 1h-01 in the RRC connected mode determines to transmit or receive a plurality of pieces of data, or when the UE 1h-01 desires to quickly apply CA, or when the eNB/gNB 1h-02 does not particularly request a measurement result until the above-described timer expires, the UE 1h-01 in the RRC connected mode may include, in the UEAssistanceInformation message, a result of the measurement performed in the RRC inactive mode or the RRC idle mode and may report the UEAssistanceInformation message including the result of the measurement in the RRC inactive mode or the RRC idle mode to the eNB/gNB 1h-02. In response to the RRCConnectionReconfiguration message, the UE 1h-01 may apply the information included in the RRCConnectionReconfiguration message, and then may transmit an RRCConnectionReconfigurationComplete message to the eNB/gNB 1h-02 (operation 1h-45).

After an RRC connection reconfiguration procedure ends, the UE 1h-01 may transmit the UEAssistanceInformation message to the eNB/gNB 1h-02 (operation 1h-50). As in the above-described method, the UEAssistanceInformation message may be immediately transmitted without performing the above-described RRC connection reconfiguration procedure (including operations 1h-40 and 1h-45). The UEAssistanceInformation message may include measResultListIdle as a measReportIdle value (or an idleMeasReport value) included in VarMeasIdleReport. The measResultListIdle as an IE may mean a list of measResultIdle as an IE individually configured for one or more neighboring inter-frequency carriers by the UE 1h-01 in the RRC idle mode. A UE according to an embodiment of the disclosure may configure measResultIdle for each neighboring inter-frequency carrier when transmitting the UEAssistanceInformation message, by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC idle mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), the measResultIdle may not include measResultServingCell.

When the measResultIdle includes measResultServingCell for each neighboring inter-frequency carrier, the measResultIdle may include the same serving cell measurement results.

The measResultServingCell may include or may not include at least one of the following result values.

RSRP result values (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. —When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When the measResultListIdle is included in the UEAssistanceInformation message in operation 1h-50, the eNB/gNB 1h-02 may perform an RRC connection reconfiguration procedure with the UE 1h-01. First, the eNB/gNB 1h-02 may transmit an RRCConnectionReconfiguration message to the UE 1h-01 (operation 1h-60). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1h-01 may apply the information included in the RRCConnectionReconfiguration message, and then may transmit an RRCConnectionReconfigurationComplete message to the eNB/gNB 1h-02 (operation 1h-65).

The RRCConnectionReconfiguration message in operation 1h-60 may include a common configuration parameter for configuration of several SCells (Scell Group configuration) at one time or a configuration parameter (SCell configuration) for each of the SCells. When the RRCConnectionReconfiguration message includes a common configuration parameter for several SCells, at least one of the following methods may be applied.

Method 1: The RRCConnectionReconfiguration message may include a common parameter for each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include a list (sCellToReleaseList) for releasing one or more cells from each SCell group.

Method 2: The RRCConnectionReconfiguration message may include a common parameter for each SCell group and different parameters for different SCells in each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCConnectionReconfiguration message may include a list (sCellToReleaseList) for releasing one or more cells from each SCell group.

The eNB/gNB 1h-02 may apply CA by indicating a state (activated, dormant, or deactivated state) of each SCell configured in the UE 1h-01 by using a MAC CE (operation 1h-70).

The UE 1h-01 in the RRC inactive mode may transmit an RRCConnectionResumeRequest message to the eNB/gNB 1h-02 (operation 1h-25). The RRCConnectionResumeRequest message may include an identity of the UE 1h-01 (resumeIdentity), a cause for resuming an RCC connection (resumeCause), or the like. In response to the RRCConnectionResumeRequest message, the eNB/gNB 1h-02 may transmit an RRCConnectionResume message to the UE 1h-01 (operation 1h-30). The RRCConnectionResume message may include radio resource setup information (RadioResourceConfigDedicated, radioBearerConfig, masterCellGroup, or secondaryCellGroup). Alternatively, the RRCConnectionResume message may include measurement configuration information (measIdleConfig). The measurement configuration information may be signaled separately for a MCG and a SCG. Alternatively, the RRCConnectionResume message my include a new timer value to transmit, without a request by the eNB/gNB 1h-02, a result of the measurement performed in the RRC idle mode or the RRC inactive mode. For example, a new timer may be driven after receiving an RRCConnectionResume message, after switching to the RRC connected mode, when transmitting an RRCConnectionResumeComplete message, or after an RRC connection resume procedure successfully ends. When the driven timer expires, the UE 1h-01 may include, in the UEAssistanceInformation message, a result of the measurement performed in the RRC inactive mode or the RRC idle mode after the RRC connection resume procedure successfully ends, and may report the UEAssistanceInformation including the result of the measurement in the RRC inactive mode or the RRC idle mode to the eNB/gNB 1h-02. An event where the UE 1h-01 in the RRC connected mode includes, in the UEAssistanceInformation message, a result of the measurement performed in the RRC inactive mode or the RRC idle mode through the RRCConnectionResume message or via a terminal operation after the RRC connection resume procedure successfully ends, and reports the UEAssistanceInformation message including the result of the measurement in the RRC inactive mode or the RRC idle mode to the eNB/gNB 1h-02 may be defined. For example, when the RRCConnectionResume message does not include Scell group configuration information, or when the UE 1h-01 includes, in the RRCConnectionResumeComplete message, an indicator (idleMeasAvailable) indicating that an idle mode measurement report is possible and transmits the RRCConnectionResumeComplete message including the indicator (idleMeasAvailable) to the eNB/gNB 1h-02, or when the eNB/gNB 1h-02 does not configure a SCell Group for a certain time period after the UE 1h-01 transmits the RRCConnectionResumeComplete message including the indicator (idleMeasAvailable) to the eNB/gNB 1h-02, or when the UE 1h-01 transmits, to the eNB/gNB 1h-02, the RRCConnectionResumeComplete message not including the indicator (idleMeasAvailable) indicating that an idle mode measurement report is possible, even when the mode measurement report is possible, or when the UE 1h-01 switched to the RRC connected mode determines to transmit or receive a plurality of pieces of data, or when the UE 1h-01 desires to quickly apply CA, or when the eNB/gNB 1h-02 does not particularly request a measurement result until the above-described timer expires, the UE 1h-01 in the RRC connected mode may include, in the UEAssistanceInformation message, a result of the measurement performed in the RRC inactive mode or the RRC idle mode and report the UEAssistanceInformation message including the result of the measurement in the RRC inactive mode or the RRC idle mode to the eNB/gNB 1h-02. In response to the RRCConnectionResume message, the UE 1h-01 may set the radio resource setup information and may switch the RRC inactive to the RRC connected mode (operation 1h-31). When the system information received in operation 1h-10 includes an indicator (idleModeMeasurements) indicating that the eNB/gNB 1h-02 is able to process idle mode measurement of the UE 1h-01, and the VarMeasIdleReport as a UE variable includes idle mode measurement information by performing idle mode measurement in operation 1h-11, the UE 1h-01 switched to the RRC connected mode may include, in an RRCConnectionResumeComplete message, an indicator (idleMeasAvailable) indicating that an idle mode measurement report is possible. The UE 1h-01 may stop when the timer (for example, T311 or T3xx) keeps operating. The UE 1h-01 in the RRC connected mode may transmit the RRCConnectionResumeComplete message to the eNB/gNB 1h-02 through SRB1 (operation 1h-35). The RRCConnectionResumeComplete message may include a service request message transmitted by the UE 1h-01 to request an AMF or MME for bearer configuration for a certain service.

When the RRC connection resume procedure is successfully performed, the eNB/gNB 1h-02 may perform an RRC connection reconfiguration procedure with the UE 1h-01. First, the eNB/gNB 1h-02 may transmit an RRCConnectionReconfiguration message to the UE 1h-01 (operation 1h-40). The RRCConnectionReconfiguration message may include at least one of configuration information about a DRB to process user data, configuration information about SRB1 and/or SRB2 via which a control message may be transmitted and received, or measurement configuration information (measConfig). Alternatively, the RRCConnectionReconfiguration message my include a new timer value to transmit, without a request by the eNB/gNB 1h-02, a result of the measurement performed in the RRC idle mode or the RRC inactive mode. For example, a new timer may be driven when receiving an RRCConnectionReconfiguration message, when transmitting an RRCConnectionReconfigurationComplete message, or after an RRC connection reconfiguration procedure successfully ends. When the timer expires, the UE 1h-01 in the RRC connected mode may include, in the UEAssistanceInformation message, a result of the measurement performed in the RRC inactive mode or the RRC idle mode after the RRC connection reconfiguration procedure successfully ends, and may report the UEAssistanceInformation message including the result of the measurement in the RRC inactive mode or the RRC idle mode to the eNB/gNB 1h-02. An event where the UE 1h-01 in the RRC connected mode includes, in the UEAssistanceInformation message, a result of the measurement performed in the RRC inactive mode or the RRC idle mode through the RRCConnectionReconfiguration message or via a terminal operation and reports the UEAssistanceInformation message including the result of the measurement in the RRC inactive mode or the RRC idle mode to the eNB/gNB 1h-02 may be defined. For example, when the RRCConnectionReconfiguration message does not include Scell group configuration information, or when the UE 1h-01 includes, in the RRCConnectionResumeComplete message, an indicator (idleMeasAvailable) indicating that an idle mode measurement report is possible and transmits the RRCConnectionResumeComplete message including the indicator (idleMeasAvailable) to the eNB/gNB 1h-02, or when the eNB/gNB 1h-02 does not configure a SCell Group for a certain time period after the UE 1h-01 transmits the RRCConnectionReconfigurationComplete message including the indicator (idleMeasAvailable) to the eNB/gNB 1h-02, or when the UE 1h-01 transmits to the eNB/gNB 1h-02 the RRCConnectionReconfigurationComplete message not including the indicator (idleMeasAvailable) indicating that an idle mode measurement report is possible, even when the mode measurement report is possible, or when the UE 1h-01 in the RRC connected mode determines to transmit or receive a plurality of pieces of data, or when the UE 1h-01 desires to quickly apply CA, or when the eNB/gNB 1h-02 does not particularly request a measurement result until the above-described timer expires, the UE 1h-01 in the RRC connected mode may include, in the UEAssistanceInformation message, a result of the measurement performed in the RRC inactive mode or the RRC idle mode and may report the UEAssistanceInformation message including the result of the measurement in the RRC inactive mode or the RRC idle mode to the eNB/gNB 1h-02. In response to the RRCConnectionReconfiguration message, the UE 1h-01 may apply the information included in the RRCConnectionReconfiguration message, and then may transmit an RRCConnectionReconfigurationComplete message to the eNB/gNB 1h-02 (operation 1h-45).

After an RRC connection reconfiguration procedure ends, the UE 1h-01 may transmit the UEAssistanceInformation message to the eNB/gNB 1h-02 (operation 1h-50). As in the above-described method, the UEAssistanceInformation message may be immediately transmitted without performing the above-described RRC connection reconfiguration procedure (including operations 1h-40 and 1h-45). The UEAssistanceInformation message may include measResultListIdle as a measReportIdle value (or an idleMeasReport value) included in VarMeasIdleReport. The measResultListIdle as an IE means a list of measResultIdle as an IE individually configured for one or more neighboring inter-frequency carriers by the UE 1h-01 in the RRC inactive mode. A UE according to an embodiment of the disclosure may configure measResultIdle for each neighboring inter-frequency carrier when transmitting the UEAssistanceInformation message), by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC inactive mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), the measResultIdle may not include measResultServingCell.

When the measResultIdle includes measResultServingCell for each neighboring inter-frequency carrier, the measResultIdle may include the same serving cell measurement results.

The measResultServingCell may include or may not include at least one of the following result values.

RSRP result values (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When the measResultListIdle is included in the UEAssistanceInformation message in operation 1h-50, the eNB/gNB 1h-02 may perform an RRC connection reconfiguration procedure with the UE 1h-01. First, the eNB/gNB 1h-02 may transmit an RRCConnectionReconfiguration message to the UE 1h-01 (operation 1h-60). The RRCConnectionReconfiguration message may include at least one of configuration information about a DRB to process user data, configuration information about SRB1 and/or SRB2 via which a control message may be transmitted and received, or measurement configuration information (measConfig). In response to the RRCConnectionReconfiguration message, the UE 1h-01 may apply the information included in the RRCConnectionReconfiguration message, and then may transmit an RRCConnectionReconfigurationComplete message to the eNB/gNB 1h-02 (operation 1h-65).

The RRCConnectionReconfiguration message in operation 1h-60 may include a common configuration parameter for configuration of several SCells (Scell Group configuration) at one time or a configuration parameter (SCell configuration) for each of the SCells. When the RRCConnectionReconfiguration message includes a common configuration parameter for several SCells, at least one of the following methods may be applied.

Method 1: The RRCConnectionReconfiguration message may include a common parameter for each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include a list (sCellToReleaseList) for releasing one or more cells from each SCell group.

Method 2: The RRCConnectionReconfiguration message may include a common parameter for each SCell group and different parameters for different SCells in each SCell group (for example, SCellGroupToAddModList or SCellGroupToReleaseList).

Because a plurality of SCell groups may exist, the RRCConnectionReconfiguration message may include SCell group identifiers for identifying the SCell groups.

The RRCConnectionReconfiguration message may include a common parameter for each SCell group (for example, sCellConfigCommon or sCellGroupCommonConfig).

The RRCConnectionReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCConnectionReconfiguration message may include a list (sCellToReleaseList) for releasing one or more cells from each SCell group.

The eNB/gNB 1h-02 may apply CA by indicating a state (activated, dormant, or deactivated state) of each SCell configured in the UE 1h-01 by using a MAC CE (operation 1h-70).

Figure 1I:
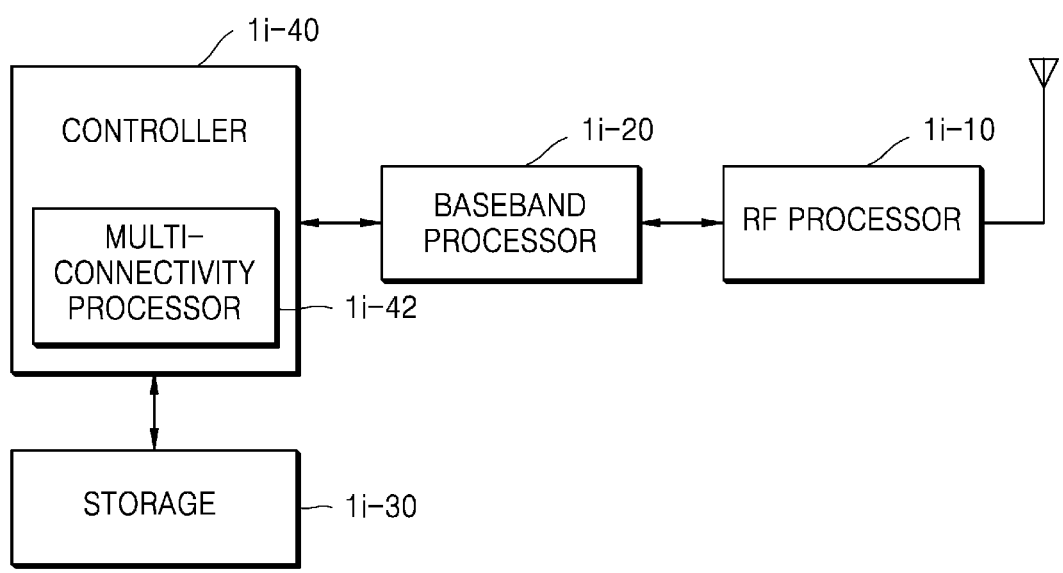
FIG. 1I illustrates a block diagram of a structure of a UE according to an embodiment of the disclosure.

FIG. 1I illustrates a block diagram of a structure of a UE according to an embodiment of the disclosure.

Referring to FIG. 1I, the UE may include a radio frequency (RF) processor 1i-10, a baseband processor 1i-20, a storage 1i-30, and a controller 1i-40. Embodiments are not limited thereto, and the UE may include more or less components than those illustrated in FIG. 1I.

According to an embodiment of the disclosure, the RF processor 1i-10 may perform functions for transmitting and receiving a signal via a radio channel, such as a band conversion, amplification, and the like of the signal. In other words, the RF processor 1i-10 may up-convert a baseband signal provided from the baseband processor 1i-20, to an RF band signal and transmit the RF band signal through an antenna, and down-convert an RF band signal received through an antenna, to a baseband signal. For example, the RF processor 1i-10 may include a transmit filter, a receive filter, an amplifier, a mixer, an oscillator, a digital-to-analog converter (DAC), and an analog-to-digital converter (ADC). Although only a single antenna is illustrated in FIG. 1I, the UE may include multiple antennas.

The RF processor 1i-10 may include a plurality of RF chains. The RF processor 1i-10 may perform beamforming. For beamforming, the RF processor 1i-10 may adjust phases and amplitudes of signals transmitted or received through multiple antennas or antenna elements. The RF processor 1i-10 may perform an multiple input multiple output (MIMO) operation and may receive layers (or data of multiple layers) in the MIMO operation. The RF processor 1i-10 may perform received beam sweeping by appropriately configuring multiple antennas or antenna elements, or may adjust a direction and a beam width of the received beam such that the received beam coordinates with a transmit beam, under the control of the controller 1i-40.

The baseband processor 1i-20 may perform conversion between a baseband signal and a bitstream based on physical layer specifications of a system. For example, for data transmission, the baseband processor 1i-20 may generate complex symbols by encoding and modulating a transmit bitstream. For data reception, the baseband processor 1i-20 may reconstruct a received bitstream by demodulating and decoding a baseband signal provided by the RF processor 1i-10. For example, according to an OFDM scheme, for data transmission, the baseband processor 1i-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1i-20 may split a baseband signal provided from the RF processor 1i-10, in OFDM symbol units, reconstruct signals mapped to subcarriers by performing fast Fourier transformation (FFT), and then reconstruct a received bitstream by demodulating and decoding the signals.

The baseband processor 1i-20 and the RF processor 1i-10 may transmit and receive signals as described above. Each of the baseband processor 1i-20 and the RF processor 1i-10 may also be called a transmitter, a receiver, a transceiver, or a communicator. At least one of the baseband processor 1i-20 or the RF processor 1i-10 may include multiple communication modules to support multiple different radio access technologies. Also, at least one of the baseband processor 1i-20 or the RF processor 1i-10 may include multiple different communication modules to process signals of different frequency bands. For example, the different radio access technologies may include an LTE network, an NR network, etc. The different frequency bands may include a super high frequency (SHF) (e.g., 2.5 GHz and 5 GHz) band and a millimeter wave (mmWave) (e.g., 60 GHz) band. The UE may transmit or receive a signal to or from a base station by using the baseband processor 1i-20 and the RF processor 1i-10, and the signal may include control information and data.

The storage 1i-30 may store data for operations of the UE, e.g., basic programs, application programs, and configuration information The storage 1i-30 may provide the stored data upon request by the controller 1i-40. The storage 1i-30 may be composed of storage media, such as read-only memory (ROM), random access memory (RAM), hard disks, compact disc (CD)-ROM, and digital versatile discs (DVDs), or a combination of the storage media. The storage 1i-30 may be composed of a plurality of memories.

The controller 1i-40 may control overall operations of the UE. For example, the controller 1i-40 may transmit and receive signals through the baseband processor 1i-20 and the RF processor 1i-10. The controller 1i-40 may write and read data to and from the storage 1i-30. To this end, the controller 1i-40 may include at least one processor. For example, the controller 1i-40 may include a communication processor (CP) performing control for communication, and an application processor (AP) controlling an upper layer, such as an application program. The controller 1i-40 may control the UE to perform a communication method for supporting the above-described carrier aggregation. At least one of the components included in the UE may be implemented by using a single chip.

Figure 1J:
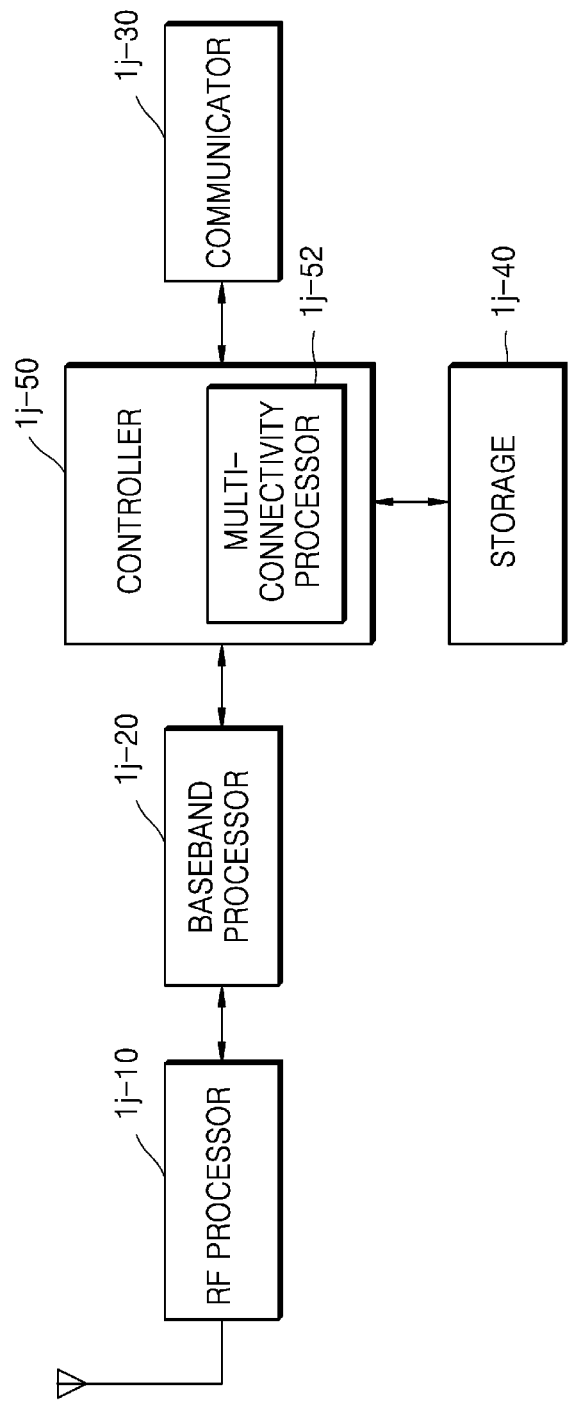
FIG. 1J illustrates a block diagram of a structure of a base station according to an embodiment of the disclosure.

FIG. 1J illustrates a block diagram of a structure of a base station according to an embodiment of the disclosure.

The base station according to an embodiment of the disclosure may include at least one transmission reception point (TRP). Referring to FIG. 1J, the base station may include an RF processor 1j-10, a baseband processor 1j-20, a communicator 1j-30, a storage 1j-40, and a controller 1j-50. Embodiments are not limited thereto, and the base station may include more or less components than those illustrated in FIG. 1J.

The RF processor 1j-10 may perform functions for transmitting and receiving a signal via a radio channel, such as a band conversion, amplification, and the like of the signal. In other words, the RF processor 1j-10 may up-convert a baseband signal provided from the baseband processor 1i-20, to an RF band signal and transmit the RF band signal through an antenna, and down-convert an RF band signal received through an antenna, to a baseband signal. For example, the RF processor 1j-10 may include a transmitting filter, a receiving filter, an amplifier, a mixer, an oscillator, a DAC, an ADC, or the like. Although only a single antenna is illustrated in FIG. 1J, the RF processor 1j-10 may include multiple antennas. The RF processor 1j-10 may include a plurality of RF chains. The RF processor 1j-10 may perform beamforming. For beamforming, the RF processor 1j-10 may adjust phases and amplitudes of signals transmitted or received through multiple antennas or antenna elements. The RF processor 1j-10 may perform a DL MIMO operation by transmitting at least one layer.

The baseband processor 1j-20 may perform conversion between a baseband signal and a bitstream based on physical layer specifications of a first radio access technology. For example, for data transmission, the baseband processor 1j-20 may generate complex symbols by encoding and modulating a transmit bitstream. For data reception, the baseband processor 1j-20 may reconstruct a received bitstream by demodulating and decoding a baseband signal provided by the RF processor 1j-10. For example, according to an OFDM scheme, for data transmission, the baseband processor 1*j*-20 may generate complex symbols by encoding and modulating a transmit bitstream, map the complex symbols to subcarriers, and then configure OFDM symbols by performing IFFT and CP insertion. For data reception, the baseband processor 1*j*-20 may split a baseband signal provided from the RF processor 1*j*-10, in OFDM symbol units, reconstruct signals mapped to subcarriers by performing FFT, and then reconstruct a received bitstream by demodulating and decoding the signals. The baseband processor 1*j*-20 and the RF processor 1*j*-10 may transmit and receive signals as described above. Accordingly, each of the baseband processor 1*j*-20 and the RF processor 1*j*-10 may also be called a transmitter, a receiver, a transceiver, a communicator, or a wireless communicator. The base station may transmit or receive a signal to or from a base station by using the baseband processor 1*j*-20 and the RF processor 1*j*-10, and the signal may include control information and data.

The communicator 1*j*-30 may provide an interface for communicating with other nodes in a network. According to an embodiment, the communicator 1*j*-30 may be a backhaul communicator.

The storage 1*j*-40 may store data for operations of a main base station, e.g., basic programs, application programs, and configuration information In particular, the storage 1*j*-40 may store information about bearers allocated for a connected UE, a measurement report transmitted from the connected UE, etc. The storage 1*j*-40 may store criteria information used to determine whether to provide or release multi-connectivity to or from the UE. The storage 1*j*-40 may provide the stored data upon request by the controller 1*j*-50. The storage 1*j*-40 may be composed of storage media, such as ROM, RAM, hard disks, CD-ROM, and DVDs, or a combination of the storage media. The storage 1*j*-40 may be composed of a plurality of memories. The controller 1*j*-50 may control overall operations of the base station. For example, the controller 1*j*-50 may transmit and receive signals through the baseband processor 1*j*-20 and the RF processor 1*j*-10 or through the communicator 1*j*-30. The controller 1*j*-50 may write and read data to and from the storage 1*j*-40. To this end, the controller 1*j*-50 may include at least one processor. Each of the baseband processor 1*j*-20 and the RF processor 1*j*-10 may also be called a transmitter, a receiver, a transceiver, a communicator, or a wireless communicator. The controller 1*j*-50 may control the base station to perform a communication method for supporting the above-described carrier aggregation. At least one of the components included in the base station may be implemented by using a single chip.

Figure 2A:
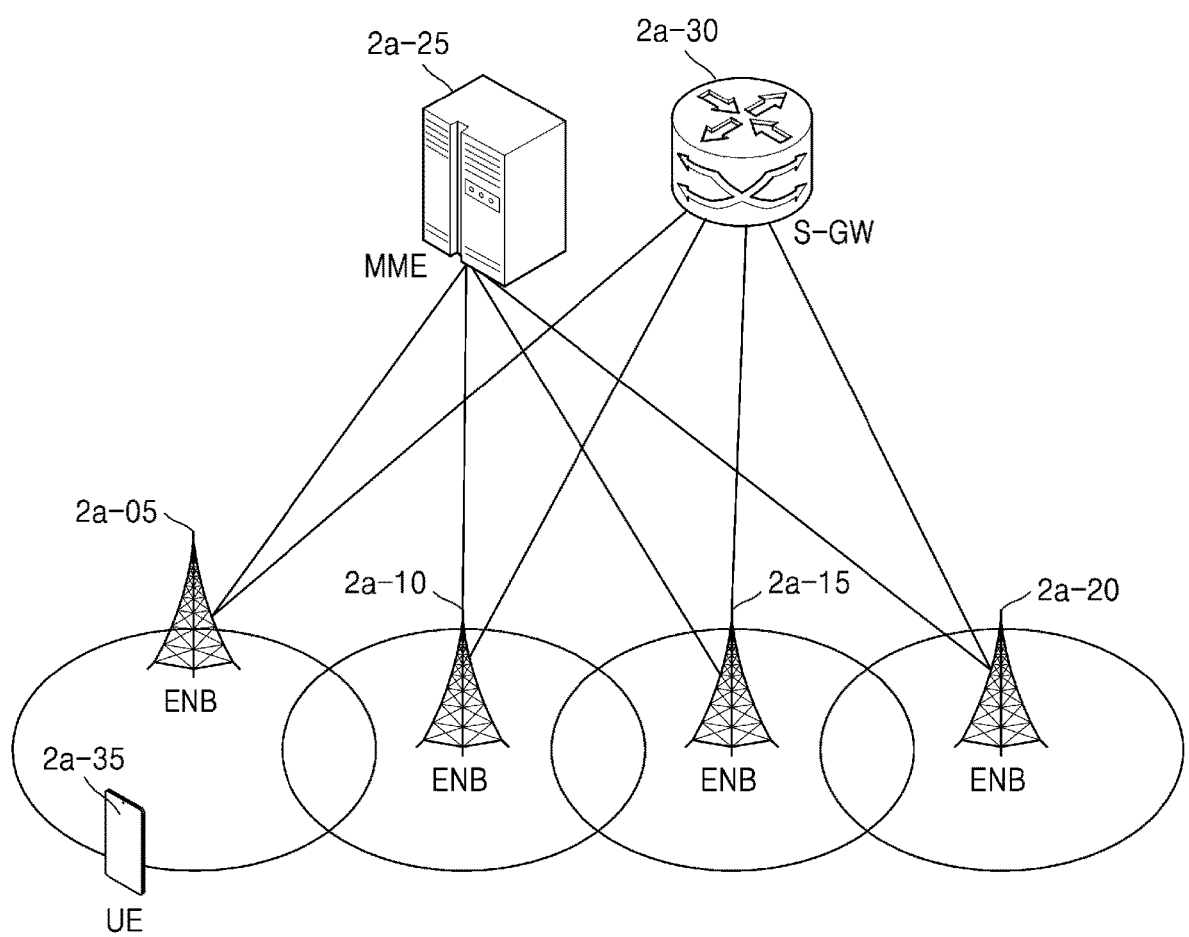
FIG. 2A illustrates a diagram of a structure of an LTE system according to an embodiment of the disclosure.

FIG. 2A illustrates a diagram of a structure of an LTE system according to an embodiment of the disclosure.

Referring to FIG. 2A, a RAN of the LTE system includes evolved node Bs (hereinafter, referred to as eNBs, node Bs (NBs) or base stations) 2*a*-05, 2*a*-10, 2*a*-15, and 2*a*-20, an MME 2*a*-25, and an S-GW 2*a*-30. A UE 2*a*-35 (also referred to as a terminal) may access an external network via the eNB 2*a*-05, 2*a*-10, 2*a*-15, or 2*a*-20 and the S-GW 2*a*-30.

In FIG. 2A, the eNB 2*a*-05, 2*a*-10, 2*a*-15, or 1*a*-20 may correspond to an existing NB of a UMTS. The eNB 2*a*-05, 2*a*-10, 2*a*-15, or 2*a*-20 may be connected to the UE 2*a*-35 through a radio channel and may perform complex functions compared to the existing NB. In the LTE system, all user traffic including a real-time service such as VoIP may be provided via a shared channel. Accordingly, an entity that schedules UEs 2*a*-35 by gathering state information such as buffer states, available transmit power states, and channel states of the UEs 2*a*-35 may be necessary, and the eNB 2*a*-05, 2*a*-10, 2*a*-15, or 2*a*-20 may operate as the entity.

A single eNB may generally control multiple cells. For example, the LTE system may use radio access technology such as OFDM at a bandwidth of 20 MHz to achieve a data rate of 100 Mbps. Also, the eNB 2*a*-05, 2*a*-10, 2*a*-15, or 2*a*-20 may use an AMC scheme to determine a modulation scheme and a channel coding rate in accordance with a channel state of the UE 2*a*-35. The S-GW 2*a*-30 is an entity for providing data bearers and may configure or release the data bearers under the control of the MME 2*a*-25. The MME 2*a*-25 is an entity for performing a mobility management function and various control functions for the UE 2*a*-35 and may be connected to the eNBs 2*a*-05, 2*a*-10, 2*a*-15, and 2*a*-20.

Figure 2B:
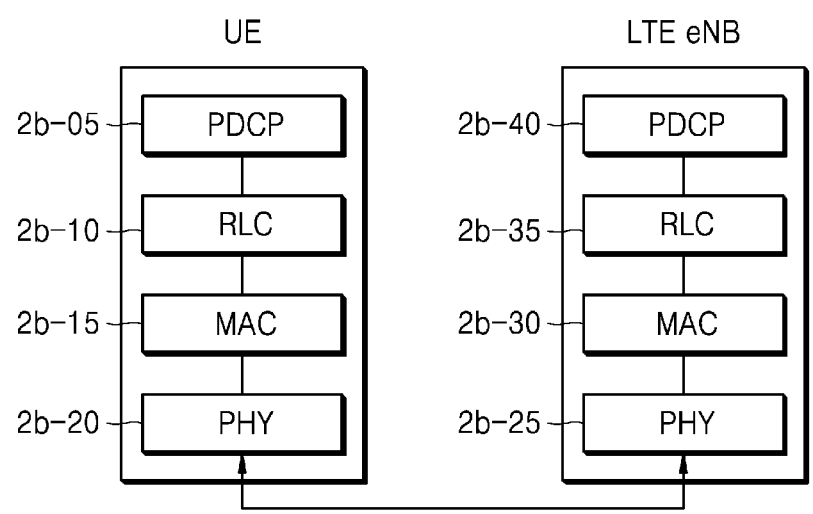
FIG. 2B illustrates a diagram of a radio protocol architecture in an LTE system, according to an embodiment of the disclosure.

FIG. 2B illustrates a diagram of a radio protocol architecture in an LTE system, according to an embodiment of the disclosure.

Referring to FIG. 2B, the radio protocol architecture of the LTE system may include PDCP layers 2*b*-05 and 2*b*-40, RLC layers 2*b*-10 and 2*b*-35, and MAC layers 2*b*-15 and 2*b*-30 respectively for a UE and an eNB. The PDCP layer 2*b*-05 or 2*b*-40 is in charge of IP header compression/decompression, etc. Main functions of the PDCP layer 2*b*-05 or 2*b*-40 may be summarized as below. Embodiments of the disclosure are not limited to the following functions.

Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLC layer 2*b*-10 or 2*b*-35 may perform, for example, an ARQ operation by reconfiguring PDCP PDUs to appropriate sizes. Main functions of the RLC layer 2*b*-10 or 2*b*-35 may be summarized as below. Embodiments of the disclosure are not limited to the following functions.

Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC layer 2*b*-15 or 2*b*-30 is connected to multiple RLC layers configured for a single UE and may multiplex RLC PDUs into a MAC PDU and demultiplex the RLC PDUs from the MAC PDU. Main functions of the MAC layer 2*b*-15 or 2*b*-30 may be summarized as below. Embodiments of the disclosure are not limited to the following functions.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding A PHY layer 2b-20 or 2b-25 may channel-code and modulate upper layer data into OFDM symbols and transmit the OFDM symbols through a radio channel, or demodulate OFDM symbols received through a radio channel and channel-decode and deliver the OFDM symbols to an upper layer. Embodiments of the disclosure are not limited thereto.

Figure 2C:
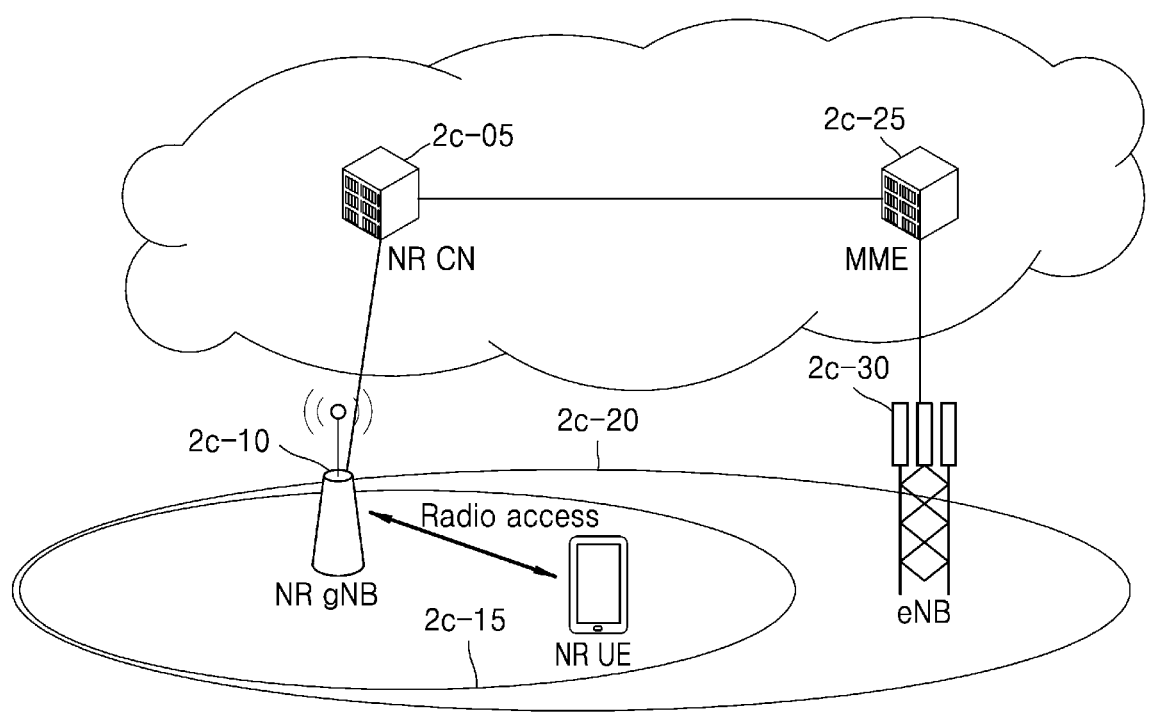
FIG. 2C illustrates a diagram of a structure of a next-generation mobile communication system, according to an embodiment of the disclosure.

FIG. 2C illustrates a diagram of a structure of a next-generation mobile communication system, according to an embodiment of the disclosure.

Referring to FIG. 2C, a RAN of the next-generation mobile communication system (e.g., an NR or 5G system) may include a new radio node B (hereinafter, referred to as a NR gNB or an NR base station) 2c-10 and an NR CN 2c-05. An NR UE or UE 2c-15 may access an external network via the NR gNB 2c-10 and the NR CN 2c-05.

In FIG. 2C, the NR gNB 2c-10 may correspond to an eNB of an existing LTE system. The NR gNB 2c-10 is connected to the NR UE 2c-15 through radio channels and may provide superior services compared to an existing NB. In the next-generation mobile communication system, all user traffic may be provided via a shared channel. Accordingly, an entity that schedules UEs by gathering state information such as buffer states, available transmit power states, and channel states of the UEs may be necessary, and the NR gNB 2c-10 may operate as the entity. A single NR gNB may generally control multiple cells. In the next-generation mobile communication system, a bandwidth greater than a current maximum bandwidth may be used to achieve an ultrahigh data rate compared to a current LTE system. OFDM may be used as radio access technology, and beamforming technology may be additionally used. According to an embodiment, the NR gNB 2c-10 may use an AMC scheme to determine a modulation scheme and a channel coding rate in accordance with a channel state of the UE.

The NR CN 2c-05 may perform functions such as mobility support, bearer setup, and QoS setup. The NR CN 2c-05 is an entity for performing a mobility management function and various control functions for the UE may be connected to multiple NR gNBs 2c-10. The next-generation mobile communication system may cooperate with the existing LTE system, and the NR CN 2c-05 may be connected to an MME 2c-25 through a network interface. The MME 2c-25 may be connected to an eNB 2c-30 being an existing base station.

Figure 2D:
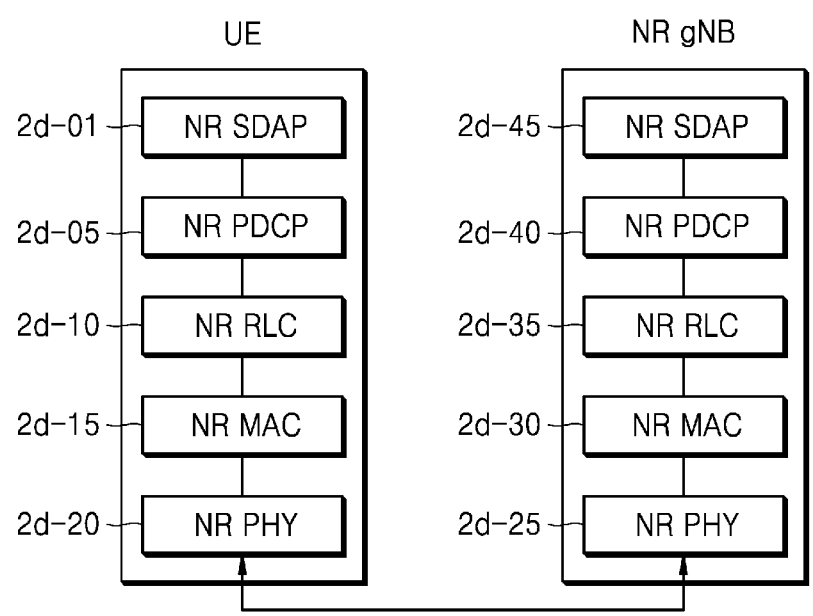
FIG. 2D illustrates a diagram of a radio protocol architecture of a next-generation mobile communication system, according to an embodiment of the disclosure.

FIG. 2D illustrates a diagram of a radio protocol architecture of a next-generation mobile communication system, according to an embodiment of the disclosure.

Referring to FIG. 2D, the radio protocol architecture of the next-generation mobile communication system may include NR SDAP layers 2d-01 and 2d-45, NR PDCP layers 2d-05 and 2d-40, NR RLC layers 2d-10 and 2d-35, NR MAC layers 2d-15 and 2d-30, and NR PHY layers 2d-20 and 2d-25 respectively for a UE and an NR gNB.

According to an embodiment, main functions of the NR SDAP layer 2d-01 or 2d-45 may include some of the following functions. Embodiments of the disclosure are not limited to the following functions.

Transfer of user plane data

Mapping between a QoS flow and a DRB for both DL and UL

Marking QoS flow ID in both DL and UL packets

Reflective QoS flow to DRB mapping for the UL SDAP PDUs

With respect to an SDAP layer, the UE may receive, via an RRC message, settings on whether to use a header of the SDAP layer or use a function of the SDAP layer for each PDCP layer, each bearer, or each logical channel. When an SDAP header is configured, the UE may instruct a non-access stratum (NAS) reflective QoS 1-bit indicator and an access stratum (AS) reflective QoS 1-bit indicator of the SDAP header to update or reconfigure mapping information regarding the data bearer and the QoS flow of UL and DL. The SDAP header may include QoS flow ID indicating QoS. According to an embodiment, QoS information may be used as data processing priority information, scheduling information, etc. for supporting a smooth service.

According to an embodiment, main functions of the NR PDCP layer 2d-05 or 2d-40 may include some of the following functions. Embodiments of the disclosure are not limited to the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

According to an embodiment, a reordering function of the NR PDCP layer 2d-05 or 2d-40 may denote a function of reordering PDCP PDUs received from a lower layer, based on a PDCP SN. The reordering function of the NR PDCP layer 2d-05 or 2d-40 may include at least one of a function of delivering the reordered data to an upper layer in order, a function of immediately delivering the reordered data without considering an order, a function of recording missing PDCP PDUs by reordering the PDCP PDUs, a function of reporting a status of the missing PDCP PDUs to a transmitter, or a function of requesting to retransmit the missing PDCP PDUs.

According to an embodiment, main functions of the NR RLC layer 2d-10 or 2d-35 may include some of the following functions. Embodiments of the disclosure are not limited to the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

According to an embodiment, in-sequence delivery of the NR RLC layer 2d-10 or 2d-35 may denote a function of delivering RLC SDUs received from a lower layer, to an upper layer in order. When an RLC SDU is segmented into multiple RLC SDUs and received, the in-sequence delivery of the NR RLC layer 2*d*-10 or 2*d*-35 may include a function of reassembling the multiple RLC SDUs and delivering the RLC SDUs.

The in-sequence delivery of the NR RLC layer 2*d*-10 or 2*d*-35 may include at least one of a function of reordering received RLC PDUs on an RLC SN or PDCP SN basis, a function of recording missing RLC PDUs by reordering the RLC PDUs, a function of reporting a status of the missing RLC PDUs to a transmitter, or a function of requesting to retransmit the missing RLC PDUs.

According to an embodiment, the in-sequence delivery of the NR RLC layer 2*d*-10 or 2*d*-35 may include a function of delivering only RLC SDUs previous to a missing RLC SDU, to the upper layer in order, when the missing RLC SDU exists. According to an embodiment, the in-sequence delivery of the NR RLC layer 2*d*-10 or 2*d*-35 may include a function of delivering all RLC SDUs received before a timer is started, to the upper layer in order, when a certain timer is expired although a missing RLC SDU exists. The in-sequence delivery of the NR RLC layer 2*d*-10 or 2*d*-35 may include a function of delivering all RLC SDUs received up to a current time, to the upper layer in order, when a certain timer is expired although a missing RLC SDU exists. Embodiments of the disclosure are not limited thereto.

According to an embodiment, the NR RLC layer 2*d*-10 or 2*d*-35 may process the RLC PDUs in order of reception regardless of sequence numbers and deliver the RLC PDUs to the NR PDCP layer 2*d*-05 or 2*d*-40 (Out-of sequence delivery).

According to an embodiment, when the NR RLC layer 2*d*-10 or 2*d*-35 receives segments, the NR RLC layer 2*d*-10 or 2*d*-35 may reconfigure the segments received later or stored in a buffer, into a whole RLC PDU and deliver the whole RLC PDU to the NR PDCP layer 2*d*-05 or 2*d*-40. According to an embodiment, the NR RLC layer 2*d*-10 or 2*d*-35 may not have a concatenation function, and the concatenation function may be performed by the NR MAC layer 2*d*-15 or 2*d*-30 or be replaced with a multiplexing function of the NR MAC layer 2*d*-15 or 2*d*-30.

According to an embodiment, out-of-sequence delivery of the NR RLC layer 2*d*-10 or 2*d*-35 may denote a function of delivering RLC SDUs received from a lower layer, immediately to an upper layer out of an order. The out-of-sequence delivery of the NR RLC layer 2*d*-10 or 2*d*-35 may include a function of reassembling multiple RLC SDUs segmented from an RLC SDU and delivering the RLC SDU when the segmented RLC SDUs are received. The out-of-sequence delivery of the NR RLC layer 2*d*-10 or 2*d*-35 may include a function of storing RLC SNs or PDCP SNs of received RLC PDUs and recording missing RLC PDUs by ordering the RLC PDUs.

According to an embodiment, the NR MAC layer 2*d*-15 or 2*d*-30 may be connected to multiple NR RLC layers 2*d*-10 or 2*d*-35 configured for a single UE, and main functions of the NR MAC layer 2*d*-15 or 2*d*-30 may include some of the following functions. Embodiments of the disclosure are not limited to the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to an embodiment, the NR PHY layer 2*d*-20 or 2*d*-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, embodiments are not limited thereto.

Figure 2E:
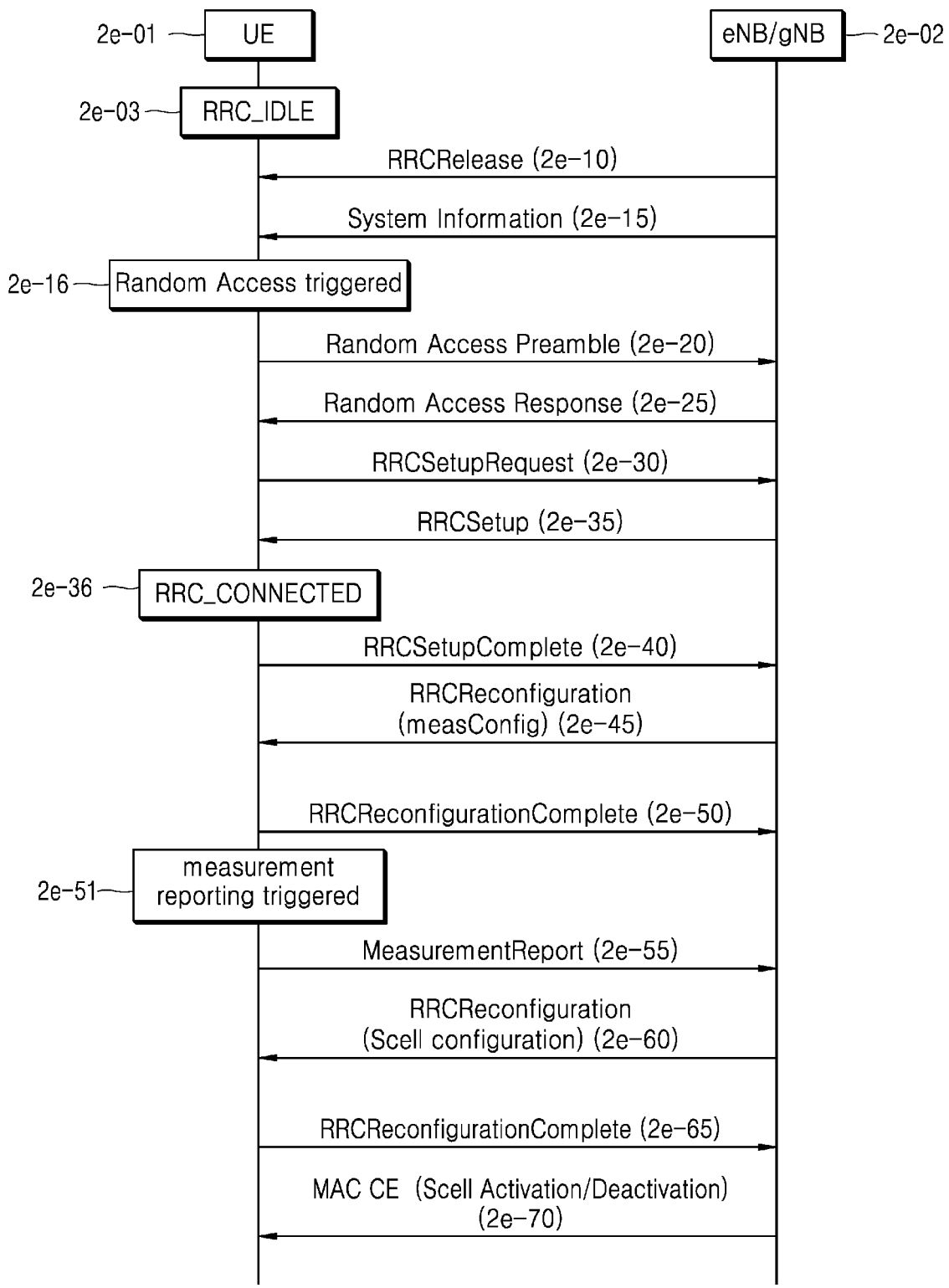
FIG. 2E illustrates a diagram for describing a procedure in which a UE not supporting idle mode measurement switches from an RRC idle mode to an RRC connected mode, and a procedure in which a base station configures CA for the UE, according to an embodiment of the disclosure.

FIG. 2E illustrates a diagram for describing a procedure in which a UE not supporting an idle mode measurement establishes an RRC connection with a gNB and switches an RRC idle mode to an RRC connected mode, and a procedure in which the gNB configures CA for the UE, according to an embodiment of the disclosure.

The UE according to an embodiment of the disclosure may perform a cell selection procedure and/or a cell reselection procedure via frequency measurement in order to search for a cell to be camped on or a serving cell in the RRC idle mode. However, the UE does not report, to the gNB, results of separately measuring one or more frequencies in the RRC idle mode. In other words, after the UE transits from the RRC idle mode to the RRC connected mode, the UE may measure one or more frequencies, based on measurement configuration information (measConfig) set in an RRCReconfiguration message, and, when a set condition is satisfied, may transmit a MeasurementReport message to the gNB.

Referring to FIG. 2E, a UE 2*e*-01 may establish an RRC connection with a gNB 2*e*-02 and thus may be in the RRC connected mode (operation 2*e*-05). When the UE 2*e*-01 that transmits or receives data in the RRC connected mode does not transmit or receive data for a certain reason or for a certain time, the gNB 2*e*-02 may transmit an RRCRelease message not including suspended configuration information (suspendConfig) to the UE 2*e*-01 such that the UE 2*e*-01 switches to the RRC idle mode (operation 2*e*-10). The UE 2*e*-01 in the RRC idle mode may receive system information by searching for and camping on a suitable cell, via a cell selection procedure and/or a cell reselection procedure (operation 2*e*-15).

The UE 2*e*-01 may perform a random access procedure in order to establish an RRC connection with the gNB 2*e*-02. When random access is triggered (operation 2*e*-16), the UE 2*e*-01 may select a PRACH occasion and transmit a Random Access Preamble to the gNB 2*e*-02 (operation 2*e*-20). In response to the Random Access Preamble, the gNB 2*e*-02 may transmit an RAR message to the UE 2*e*-01 (operation 2*e*-25). The UE 2*e*-01 in the RRC idle mode may establish an inverse direction transmission synchronization with the gNB 2*e*-02 through operations 2*e*-20 and 2*e*-25.

The UE 2*e*-01 in the RRC idle mode may perform an RRC connection establishment procedure with the gNB 2*e*-02. First, the UE 2*e*-01 may transmit a RRCSetupRequest message to the gNB 2*e*-02 (operation 2*e*-30). The RRCSetupRequest message may include an identity of the UE 2*e*-01, an establishment cause for establishing an RCC connection, or the like. In response to the RRCSetupRequest message, the gNB 2*e*-02 may transmit an RRCSetup message to the UE 2*e*-01 (operation 2*e*-35). The RRCSetup message may include radio bearer configuration information (radioBearerConfig), master cell group configuration information (masterCellGroup), etc. In detail, the radio bearer configuration information and the master cell group configuration information within the RRCSetup message may include information accompanied by SRB1 connection, RLC bearer configuration information about SRB1, MAC cell group configuration information (mac-CellGroupConfig), physical cell group configuration information (physicalCellGroup- Config), etc. In response to the RRCSetup message, the UE 2e-01 may apply the information included in the RRCSetup message and may switch the RRC idle mode to the RRC connected mode (operation 2e-36). The UE 2e-01 in the RRC connected mode may transmit a RRCSetupComplete message to the gNB 2e-02 through SRB1 (operation 2e-40).

When the RRC connection establishment procedure is successfully performed, the gNB 2e-02 may perform an RRC connection reconfiguration procedure with the UE 2e-01. First, the gNB 2e-02 may transmit an RRCReconfiguration message to the UE 2e-01 (operation 2e-45). The RRCReconfiguration message may include at least one of radio bearer configuration information (radioBearerConfig), master cell group configuration information (masterCellGroup), or measurement configuration information (measConfig). In response to the RRCReconfiguration message, the UE 2e-01 may apply the information included in the RRCReconfiguration message, and then may transmit an RRCReconfigurationComplete message to the gNB 2e-02 (operation 2e-50).

When the RRCReconfiguration message includes the measConfig in operation 2e-45, the UE 2e-01 in the RRC connected mode may perform measurement by applying the measConfig. When measurement reporting is triggered (operation 2e-51), the UE 2e-01 may transmit a MeasurementReport message to the gNB 2e-02 (operation 2e-55).

When the gNB 2e-02 successfully receives the MeasurementReport message, the gNB 2e-02 may perform an RRC connection reconfiguration procedure to configure CA for the UE 2e-01 in the RRC connected mode. CA according to an embodiment of the disclosure means more transmitting and receiving data between a UE and a BS through an additional carrier or secondary cells or serving cells (SCells). First, the gNB 2e-02 may transmit an RRCReconfiguration message to the UE 2e-01 (operation 2e-60). The RRCReconfiguration message may include configuration information (Scell configuration) about at least one SCell. For example, the Scell configuration may include a list of SCells to be added or modified (sCellToAddModList) and/or a list of configured SCells to be released (sCellToReleaseList), each of which is an IE. When the UE 2e-01 successfully receives the RRCReconfiguration message, the UE 2e-01 may apply the Scell configuration and then transmit an RRCReconfigurationComplete message to the gNB 2e-02 (operation 2e-65). The gNB 2e-02 may apply CA by indicating a state (activated or deactivated state) of each SCell configured in the UE 2e-01 by using a MAC CE (operation 2e-70).

Figure 2F:
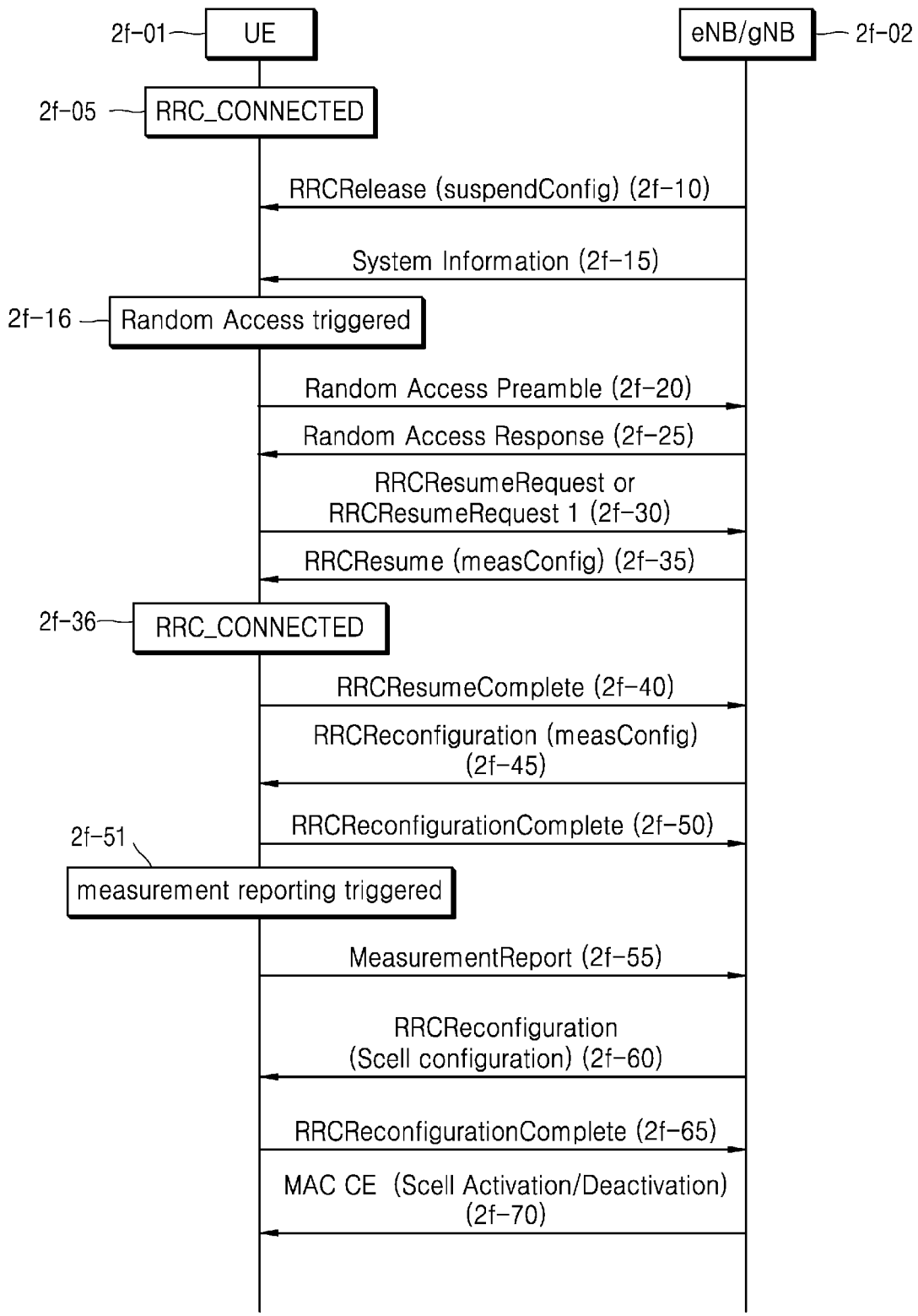
FIG. 2F illustrates a diagram for describing a procedure in which a UE not supporting idle mode measurement switches from an RRC inactive mode to an RRC connected mode, and a procedure in which a base station configures CA for the UE, according to an embodiment of the disclosure.

FIG. 2F illustrates a diagram for describing a procedure in which a UE not supporting an idle mode measurement establishes an RRC connection with a gNB and switches an RRC inactive mode to an RRC connected mode, and a procedure in which the gNB configures CA for the UE, according to an embodiment of the disclosure.

The UE according to an embodiment of the disclosure may perform a cell selection procedure and/or a cell reselection procedure via frequency measurement in order to search for a cell to be camped on or a serving cell in an RRC inactive mode. However, the UE does not report, to the gNB, results of separately measuring one or more frequencies in the RRC inactive mode. In other words, after the UE transits from the RRC inactive mode to the RRC connected mode, the UE may measure one or more frequencies, based on measurement configuration information (measConfig) set in an RRCResume message or an RRCReconfiguration message, and, when a set condition is satisfied, may transmit a MeasurementReport message to the gNB.

Referring to FIG. 2F, a UE 2f-01 may establish an RRC connection with a gNB 2f-02 and thus may be in the RRC connected mode (operation 2f-05). When the UE 2f-01 that transmits or receives data in the RRC connected mode does not transmit or receive data for a certain reason or for a certain time, the gNB 2f-02 may transmit an RRCRelease message including suspended configuration information (suspendConfig) to the UE 2f-01 such that the UE 2f-01 switches to the RRC inactive mode (operation 2f-10). The UE 2f-01 in the RRC inactive mode may receive system information by searching for and camping on a suitable cell, via a cell selection procedure and/or a cell reselection procedure (operation 2f-15).

The UE 2f-01 may perform a random access procedure in order to establish an RRC connection with the gNB 2f-02. When random access is triggered (operation 2f-16), the UE 2f-01 may select a PRACH occasion and transmit a Random Access Preamble to the gNB 2f-02 (operation 2f-20). In response to the Random Access Preamble, the gNB 2f-02 may transmit an RAR message to the UE 2f-01 (operation 2f-25). The UE 2f-01 in the RRC inactive mode may establish an inverse direction transmission synchronization with the gNB 2f-02 through operations 2f-20 and 2f-25.

The UE 2f-01 in the RRC inactive mode may perform an RRC connection resume procedure with the gNB 2f-02. First, the UE 2f-01 may transmit an RRCResumeRequest message or an RRCResumeRequest1 message to the gNB 2f-02 (operation 2f-30). According to an embodiment, the RRCResumeRequest message or the RRCResumeRequest1 message may include, for example, a UE identifier (resumeIdentity), resume encryption information (resumeMAC-I), and a cause (resumeCause) for resuming an RRC connection, which are used by a gNB to retrieve a terminal context. In response to the RRCResumeRequest message or the RRCResumeRequest1 message, the gNB 2f-02 may transmit an RRCResume message to the UE 2f-01 (operation 2f-35). The RRCResumeRequest message or the RRCResumeRequest1 message may include radio bearer configuration information (radioBearerConfig), master cell group configuration information (masterCellGroup), measurement configuration information (measConfig), etc. In detail, the radio bearer configuration information and the master cell group configuration information within the RRCResumeRequest message or the RRCResumeRequest1 message may include, but are not limited to, configuration information of an SRB and DRBs that resume, RLC bearer configuration information about the SRB and the DRBs, MAC cell group configuration information (mac-CellGroupConfig), physical cell group configuration information (physicalCellGroupConfig), etc. In response to the RRCSetup message, the UE 2f-01 may apply the information included in the RRCResumeRequest message or the RRCResumeRequest1 message and may switch the RRC inactive mode to the RRC connected mode (operation 2f-36). The UE 2f-01 in the RRC connected mode may transmit a RRCResumeComplete message to the gNB 2f-02 through SRB1 (operation 2f-40).

When the RRCResume message includes the measConfig in operation 2f-35, the UE 2f-01 in the RRC connected mode may perform measurement by applying the measConfig. When measurement reporting is triggered (operation 2f-51), the UE 2f-01 may transmit a MeasurementReport message to the gNB 2f-02 (operation 2f-55). According to an embodiment, the UE 2f-01 may perform the above procedure without performing operations 2f-45 and 2f-50.

When the RRC connection resume procedure is successfully performed, the gNB 2f-02 may perform an RRC connection reconfiguration procedure with the UE 2f-01.

First, the gNB 2f-02 may transmit an RRCReconfiguration message to the UE 2f-01 (operation 2f-45). The RRCReconfiguration message may include at least one of radio bearer configuration information (radioBearerConfig), master cell group configuration information (masterCellGroup), or measurement configuration information (measConfig). In response to the RRCReconfiguration message, the UE 2f-01 may apply the information included in the RRCReconfiguration message, and then may transmit an RRCReconfigurationComplete message to the gNB 2f-02 (operation 2f-50).

When the RRCReconfiguration message includes the measConfig in operation 2f-45, the UE 2f-01 in the RRC connected mode may perform measurement by applying the measConfig. When measurement reporting is triggered (operation 2f-51), the UE 2f-01 may transmit a MeasurementReport message to the gNB 2f-02 (operation 2f-55).

When the gNB 2f-02 successfully receives the MeasurementReport message, the gNB 2f-02 may perform an RRC connection reconfiguration procedure to configure CA for the UE 2F-01 in the RRC connected mode. CA according to an embodiment of the disclosure means more transmitting and receiving data between a UE and a BS through an additional carrier or secondary cells or serving cells (SCells). First, the gNB 2f-02 may transmit an RRCReconfiguration message to the UE 2f-01 (operation 2f-60). The RRCReconfiguration message may include configuration information (Scell configuration) about at least one SCell. For example, the Scell configuration may include a list of SCells to be added or modified (sCellToAddModList) and/or a list of configured SCells to be released (sCellToReleaseList), each of which is an IE. When the UE 2f-01 successfully receives the RRCReconfiguration message, the UE 2f-01 may apply the Scell configuration and then transmit an RRCReconfigurationComplete message to the gNB 2f-02 (operation 2f-65). The gNB 2f-02 may apply CA by indicating a state (activated or deactivated state) of each SCell configured in the UE 2f-01 by using a MAC CE (operation 2f-70).

Figure 2G:
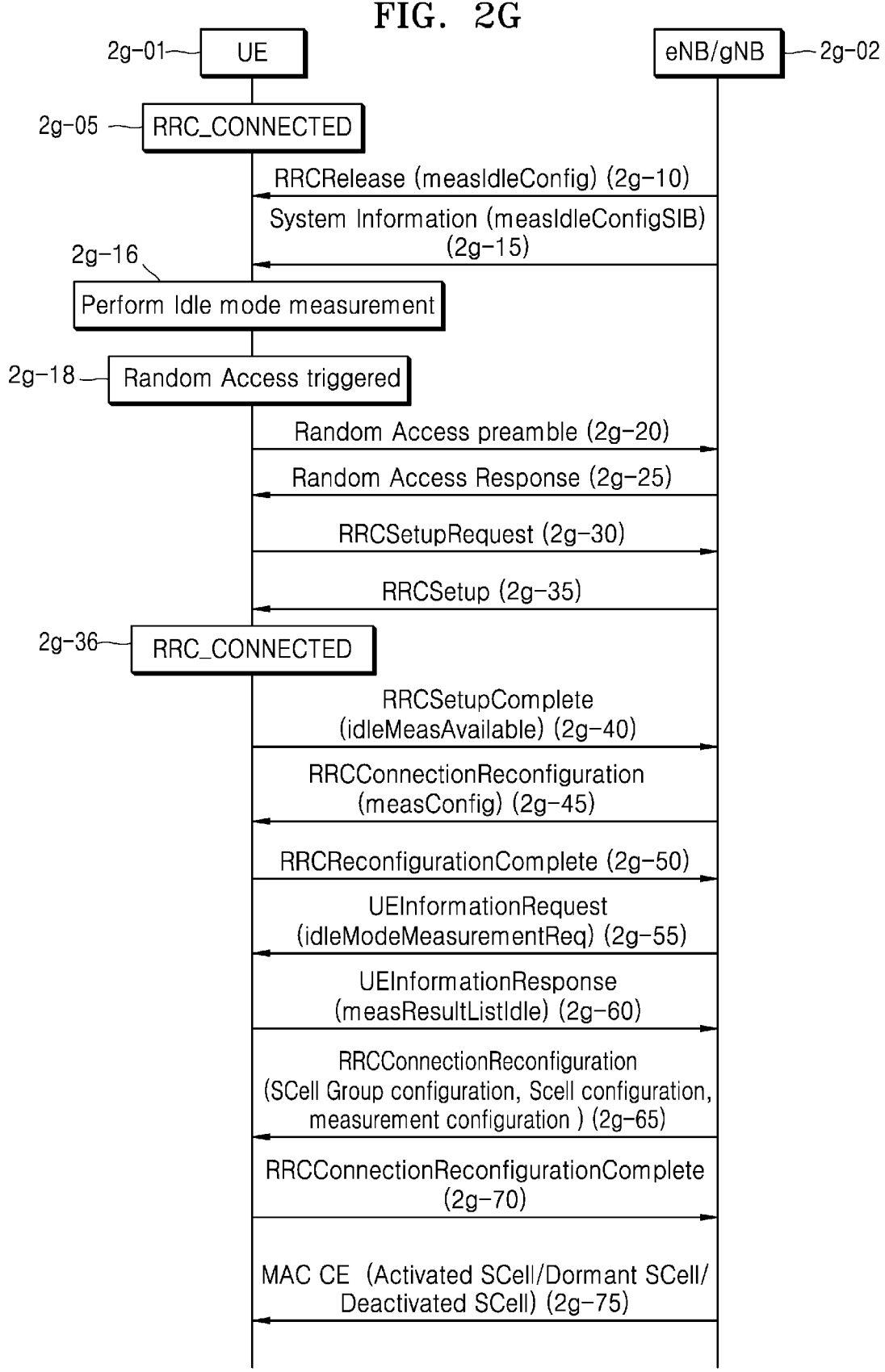
FIG. 2G illustrates a diagram for describing a procedure in which a UE supporting idle mode measurement switches from an RRC connected mode to an RRC idle mode, and a method in which a base station provides idle mode measurement configuration information to the UE, according to an embodiment of the disclosure.

FIG. 2G illustrates a diagram for describing a procedure in which a UE supporting an idle mode measurement releases an RRC connection with a gNB and switches an RRC connected mode to an RRC idle mode, and a method in which the gNB provides idle mode measurement configuration information to the UE, according to an embodiment of the disclosure.

The UE according to an embodiment of the disclosure may perform a cell selection procedure and/or a cell reselection procedure via frequency measurement in order to search for a cell to be camped on or a serving cell in the RRC idle mode. The UE may measure several frequencies in the RRC idle mode and may store results of the measurements, separately. To this end, the gNB may transmit, to the UE in the RRC connected mode, an RRCRelease message including measurement configuration information (measIdleConfig) that is available in the RRC idle mode by the UE. Alternatively, the gNB may broadcast, to the UE in the RRC idle mode, system information (e.g., SIB5 or a new SIBx) including measurement configuration information (measIdleConfigSIB) that is available in the RRC idle mode by the UE. The UE in the RRC idle mode may measure at least one frequency, based on the measurement configuration information included in the RRCRelease message or the system information. When the gNB transmits a UEInformationRequest message to the UE that has transited from the RRC idle mode to the RRC connected mode in order to request a measurement result, the UE may transmit to the gNB a UEInformationResponse message including a result of a measurement performed in the RRC idle mode. This may delay application of existing CA by a long time.

Referring to FIG. 2G, a UE 2g-01 may establish an RRC connection with an eNB/gNB 2g-02 and thus may be in the RRC connected mode (operation 2g-05). When the UE 2g-01 that transmits or receives data in the RRC connected mode does not transmit or receive data for a certain reason or for a certain time, the eNB/gNB 2g-02 may transmit an RRCRelease message not including suspended configuration information (suspendConfig) to the UE 2g-01 such that the UE 2g-01 switches to the RRC idle mode (operation 2g-10). The RRCRelease message may further include measurement configuration information available in the RRC idle mode (measIdleConfig). The measIdleConfig being an IE may include at least one of the following parameters.

- A carrier frequency list used for measurement by the UE 2g-01 in the RRC idle mode (measIdleCarrierList) The measIdleCarrier List may include one or more pieces of information (measIdleCarrier) about each carrier frequency.
- Each measIdleCarrier include at least one of the following pieces of information. Embodiments of the disclosure are not limited to the following example.
- dl-CarrierFreq: An absolute radio frequency channel number value (ARFCN-Value) representing the center frequency of a synchronization signal block (hereinafter, an SS Block) of neighboring cells may be included. The UE 2g-01 may apply reference signal measurement timing configuration of neighboring cells, based on the information dl-CarrierFreq, or may perform neighboring cell measurement.
- nrofSS-BlocksToAverage: The number of SS/PBCH blocks that are used to derive a cell measurement value. The UE 2g-01 may derive a cell measurement value by taking an average of SS/PBCH measurement values by applying the signaled value. When the information nrofSS-BlocksToAverage is not signaled, the UE 2g-01 may derive a cell measurement value, based on a SS/PBCH block providing a greatest signal intensity.
- absThreshSS-BlocsConsolidation: A threshold that is used to consolidate measurement results of the SS/PBCH blocks. The UE 2g-01 may use, in the cell measurement value, an SS/PBCH block signal intensity that is greater than a signaled absThreshSS-BlocsConsolidation value. When the information absThreshSS-BlocsConsolidation is not signaled, the UE 2g-01 may derive a cell measurement value, based on a SS/PBCH block providing a greatest signal intensity.
- smtc: Measurement timing configuration information for inter-frequency measurement or intra-frequency measurement may be included. In detail, the information smtc may mean period and offset information of a measurement time interval for receiving an SS/PBCH block, and duration information of the measurement time interval. An ASN. 1 structure of smtc is as shown in Table 1 below.

TABLE 1

SSB-MTC information element
ASN1START
TAG-SSB-MTC-START
SSB-MTC ::=              SEQUENCE {
  periodicityAndOffset      CHOICE {
    sf5                       INTEGER (0..4),
    sf10                        INTEGER (0..9),
    sf20                        INTEGER (0..19),
    sf40                        INTEGER (0..39), TABLE 1-continued

| | |
|---|---|
| sf80 | INTEGER (0..79), |
| sf160 | INTEGER (0..159) |
| }, | |
| duration | ENUMERATED { sf1, sf2, sf3, sf4, sf5 } |
| } | |

The UE 2g-01 may set a reference signal measurement timing via the signaled value.

ssbSubcarrierSpacing: A sub-carrier spacing between SSBs may be included. For example, in the case of a frequency band that is less than 6 GHz, a 15 or 30 kHz value may be signaled, and, in the case of a frequency band that is greater than 6 GHz, a 120 or 240 kHz value may be signaled.

deriveSSB-IndexFromCell: An indicating value indicating timing information that the UE 2g-01 may/should use to derive the index of an SS block that is transmitted by a neighboring cell or serving cell existing in a signaled center frequency may be included. For example, when a deriveSSB-IndexFromCell value is signaled or set as TRUE, the UE 2g-01 may derive the index of an SS block of all of the neighboring cells existing in the center frequency by applying timing information of any cell detected in the center frequency. This may also be equally applied to a case where the center frequency is a serving frequency, Because, due to a cell reselection procedure, the center frequency of the UE 2g-01 performing idle mode measurement may be a serving frequency or an inter-frequency. Alternatively, the UE 2g-01 may apply a system frame number (SFN) and a frame boundary alignment to all of the cells existing in the center frequency.

reportQuantities: An indicator indicating whether the UE 2g-01 reports result values of cells measured through idle mode measurement with a reference signal received power (RSRP) or a reference signal received quantity (RSRQ) or with both of the RSRP and the RSRQ may be included.

reportQuantityCell: The result values of the cells measured by the UE 2g-01 through idle mode measurement may be included. In this case, the UE 2g-01 may report, to the eNB/gNB 2g-02, the result values of the cells measured by the UE 2g-01 through idle mode measurement with the RSRP or the RSRQ or with both of the RSRP and the RSRQ.

reportQuantityRsIndexes: An indicator indicating whether the UE 2g-01 reports information measured for each reference signal (RS) index through idle mode measurement with the RSRP or the RSRQ or with both of the RSRP and the RSRQ may be included. The information reportQuantityRsIndexes may be indicated when a beam level management is efficient during Scell configuration.

maxNrofRS-IndexesToReport: A value representing how many RS indexes at maximum the UE 2g-01 reports to the eNB/gNB 2g-02, based on idle mode measurement, may be included. The information maxNrofRS-IndexesToReport may be indicated when a beam level management is efficient during Scell configuration.

includeBeamMeasurements: An indicator indicating that a beam measurement result is to be included may be included. For example, when reportQuantityRS-Indexes is set as TRUE for each SS/PBCH block index, the UE 2g-01 may report a measurement value to the eNB/gNB 2g-02, based on SS/PBCH. The information includeBeamMeasurements may be indicated when a beam level management is efficient during Scell configuration.

validityArea: A cell list on which the UE 2g-01 is requested to perform idle mode measurement and report a result of the idle mode measurement may be included.

measCellList: A cell list on which the UE 2g-01 is requested to perform idle mode measurement and report a result of the idle mode measurement may be included.

quantityThreshold: A threshold of the RSRP or RSRQ based on which the UE 2g-01 may determine whether to report cells measured via idle mode measurement may be included. Alternatively, respective thresholds may be included for the RSRP and the RSRQ.

measIdleCarrierList may be signaled for each radio access technology. For example, measIdleCarrierList may include measIdleCarrierListEUTRA and measIdleCarrierListNR.

A value representing a duration while the UE 2g-01 performs measurement in the RRC idle mode (measIdleDuration)

According to an embodiment, the measIdleDuration may represent a timer T311 value or a new timer T3xx value.

The UE 2g-01 may perform idle mode measurement after the UE 2g-01 receives the RRCRelease message and before the measIdleDuration expires.

measIdleDuration may be signaled for each radio access technology or regardless of radio access technologies. For example, measIdleDuration may be divided into measIdleDurationEUTRA and measIdleDurationNR and signaled, or may be signaled as a single value to be commonly applied.

When the RRCRelease message includes measIdleConfig in operation 2g-10, the UE 2g-01 may delete VarMeasIdleConfig and VarMeasIdleReport being UE variables. The UE may store, in the measIdleConfig, the value representing the duration while the UE performs measurement in the RRC idle mode (e.g., measIdleDuration), and may drive a timer by applying the value representing the duration while the UE performs measurement in the RRC idle mode. When the RRCRelease message includes the carrier frequency list used for measurement by the UE in the RRC idle mode, the UE 2g-01 may store the carrier frequency list and perform idle mode measurement while a timer is operating in supportable carriers, based on the stored carrier frequency list (operation 2g-16). When the RRCRelease message does not include the carrier frequency list used for measurement by the UE in the RRC idle mode, the UE 2g-01 may receive system information by searching for and camping on a suitable cell, via a cell selection procedure and/or a cell reselection procedure (operation 2g-15). When a carrier frequency list measIdleConfigSIB used for measurement in the RRC idle mode is included in the received system information, the UE 2g-01 may store the received measIdleConfigSIB while the on-going operation of the timer continues, or may replace the carrier frequency list within the UE 2g-01, based on the received measIdleConfigSIB, and perform idle mode measurement while the timer is operating in supportable carriers, based on the carrier frequency list (operation 2g-15). The measIdleConfigSIB according to an embodiment may include some or all of the parameters included in the above-described measIdleConfig.

When system information that is broadcast by a target cell does not include the measIdleConfigSIB through a cell reselection procedure, the UE 2g-01 may stop the on-going idle mode measurement.

In operation 2g-16, the UE 2g-01 may perform measurement by deriving a timing of an SS/PBCH block, based on an SFN and a subframe of a certain cell, by using the smtc received from the eNB/gNB 2g-02 and a certain equation. The certain equation is expressed as follows. SMTC is substituted into the equation below. An SFN including a measurement time interval of each SS/PBCH block satisfies the following equation.

$$SFN \bmod T = (FLOOR (Offset/10))$$

When a period is greater than 5 subframes, a subframe by which a first SS/PBCH block of the interval satisfies the following equation.

$$subframe = Offset \bmod 10$$

Otherwise, $$subframe = Offset \text{ or } (Offset+5)$$

Herein, T means CEIL(Periodicity/10).

A UE according to an embodiment of the disclosure may measure a plurality of frequencies in the RRC idle mode and may store results of the measurements. In this case, a serving cell or neighboring cells may have different SFNs and different subframe timings. Thus, the UE 2g-01 needs to determine the SFNs and the subframes of which serving cell or neighboring cells are based on to derive the timing of the SS/PBCH block. According to the disclosure, the serving cell or neighboring cells serving as a basis are determined using at least one of the following methods. Embodiments of the disclosure are not limited to the following examples.

Option 1) When the RRCRelease message (operation 2g-10) includes smtc, the UE may derive the timing of the SS/PBCH block for a cell that has received the RRCRelease message, based on the smtc information. On the indicated dl-CarrierFreq in the RRCRelease message, the UE shall not consider SS/PBCH block transmission in subframes outside the SMTC occasion for radio resource measurements (RRMs) based on SS/PBCH blocks.

Option 2) When the RRCRelease message (operation 2g-10) includes smtc, the UE may derive the timing of the SS/PBCH block for a serving cell, based on the smtc information. On the indicated dl-CarrierFreq in the RRCRelease message, the UE shall not consider SS/PBCH block transmission in subframes outside the SMTC occasion for RRMs based on SS/PBCH blocks.

Option 3) When the RRCRelease message (operation 2g-10) includes smtc, the UE may derive the timing of the SS/PBCH block for a cell list (measCellList or validityArea) included in the RRCRelease message, based on the smtc information. On the indicated dl-CarrierFreq in the RRCRelease message, the UE shall not consider SS/PBCH block transmission in subframes outside the SMTC occasion for RRMs based on SS/PBCH blocks.

Option 4) When the system information (operation 2g-15) includes smtc, the UE may derive the timing of the SS/PBCH block for a cell list (measCellList or validityArea) included in the system information, based on the smtc information. For example, for a cell included in a serving frequency, the UE may apply smtc information included in SIB2, or, for a cell included in an inter-frequency, the UE may apply smtc information included in SIB4. On the indicated dl-CarrierFreq in the RRCRelease message, the UE shall not consider SS/PBCH block transmission in subframes outside the SMTC occasion for RRMs based on SS/PBCH blocks.

The UE may receive an SS/PBCH block during the derived measurement time interval, and may perform RSRP, RSRQ, etc. corresponding to the received SS/PBCH block.

The UE 2g-01 may perform a random access procedure in order to establish an RRC connection with the eNB/gNB 2g-02. When random access is triggered (operation 2g-18), the UE 2g-01 may select a PRACH occasion and transmit a Random Access Preamble to the eNB/gNB 2g-02 (operation 2g-20). In response to the Random Access Preamble, the eNB/gNB 2g-02 may transmit an RAR message to the UE 2g-01 (operation 2g-25). The UE 2g-01 in the RRC idle mode may establish an inverse direction transmission synchronization with the eNB/gNB 2g-02 through operations 2g-20 and 2g-25.

The UE 2g-01 in the RRC idle mode may perform an RRC connection establishment procedure with the eNB/gNB 2g-02. First, the UE 2g-01 may transmit a RRCSetupRequest message to the eNB/gNB 2g-02 (operation 2g-30). The RRCSetupRequest message may include an identity of the UE 2g-01, an establishment cause for establishing an RCC connection, or the like. In response to the RRCSetupRequest message, the eNB/gNB 2g-02 may transmit an RRCSetup message to the UE 2g-01 (operation 2g-35). The RRCSetup message may include radio bearer configuration information (radioBearerConfig), master cell group configuration information (masterCellGroup), etc. In detail, the radio bearer configuration information and the master cell group configuration information may include information accompanied by SRB1 connection, RLC bearer configuration information about SRB1, MAC cell group configuration information (mac-CellGroupConfig), physical cell group configuration information (physicalCellGroupConfig), etc. In response to the RRCSetup message, the UE 2g-01 may apply the information and may switch the RRC idle mode to the RRC connected mode (operation 2g-36). When the system information received in operation 2g-15 includes an indicator (idleModeMeasurements) indicating that the eNB/gNB 2g-02 is able to process idle mode measurement of the UE 2g-01, and the VarMeasIdleReport as a UE variable includes idle mode measurement information by performing idle mode measurement in operation 2g-16, the UE 2g-01 switched to the RRC connected mode may include, in an RRCSetupComplete message, an indicator (idleMeasAvailable) indicating that an idle mode measurement report is possible. The UE 2g-01 may stop when the timer (for example, T311 or T3xx) keeps operating. The UE 2g-01 in the RRC connected mode may transmit the RRCSetupComplete message to the eNB/gNB 2g-02 through SRB1 (operation 2g-40).

When the RRC connection establishment procedure is successfully performed, the eNB/gNB 2g-02 may perform an RRC connection reconfiguration procedure with the UE 2g-01. First, the eNB/gNB 2g-02 may transmit an RRCReconfiguration message to the UE 2g-01 (operation 2g-45). The RRCReconfiguration message may include at least one of radio bearer configuration information (radioBearerConfig), master cell group configuration information (masterCellGroup), or measurement configuration information (measConfig). In response to the RRCReconfiguration message, the UE 2g-01 may apply the information included in the RRCReconfiguration message, and then may transmit an RRCReconfigurationComplete message to the eNB/gNB 2g-02 (operation 2g-50).

When the RRCSetupComplete message includes the indicator (idleMeasAvailable) indicating that an idle mode measurement report is possible, in operation 2g-40, the eNB/gNB 2g-02 may perform a UE information procedure with the UE 2g-01. The UE information procedure may be immediately performed without performing the above-described RRC connection reconfiguration procedure (including operations 2g-45 and 2g-50). The eNB/gNB 2g-02 may transmit, to the UE 2g-01 in the RRC connected mode, a UEInformationRequest message including an indicator (idleModeMeasurementReq) requesting a result of the measurement performed in the RRC idle mode (operation 2g-55). When security is successfully configured, the UE 2g-01 that has received the UEInformationRequest message may perform the following processes.

1> When the UEInformationRequest message includes the indicator (idleModeMeasurementReq) requesting a result of the measurement performed in the RRC idle mode and the UE 2g-01 has stored the VarMeasIdleReport,
2> measResultListIdle included in a UEInformationResponse message is set as a measReportIdle value (or an idleMeasReport value) included in the VarMeasIdleReport.
2> When it is confirmed by lower layers that the UEInformationResponse message was transmitted successfully, the VarMeasIdleReport is discarded.
1> The UEInformationResponse message is submitted to the lower layers via the SRB1. The UE 2g-01 may transmit, to the eNB/gNB 2g-02, the UEInformationReponse message including a list (measResultListIdle) of results of the measurements performed in the RRC idle mode (operation 2g-60).

In the above description, the measResultListIdle as an IE may mean a list of measResultIdle as an IE individually configured for one or more neighboring inter-frequency carriers by the UE 2g-01 in the RRC idle mode. A UE according to an embodiment of the disclosure may configure measResultIdle for each neighboring inter-frequency carrier when transmitting the UEInformationResponse message, by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC idle mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), the measResultIdle may not include measResultServingCell.

When the measResultIdle includes measResultServingCell for each neighboring inter-frequency carrier, the measResultIdle may include the same serving cell measurement results.

The measResultServingCell may include or may not include at least one of the following result values.

RSRP result values (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When the measResultListIdle is included in the UEInformationResponse message in operation 2g-60, the eNB/gNB 2g-02 may perform an RRC connection reconfiguration procedure with the UE 2g-01. First, the eNB/gNB 2g-02 may transmit an RRCReconfiguration message to the UE 2g-01 (operation 2g-65). The RRCReconfiguration message may include at least one of configuration information about a DRB to process user data, configuration information about SRB1 and/or SRB2 via which a control message may be transmitted and received, or measurement configuration information (measConfig). In response to the RRCReconfiguration message, the UE 2g-01 may apply the information included in the RRCReconfiguration message, and then may transmit an RRCReconfigurationComplete message to the eNB/gNB 2g-02 (operation 2g-70).

The RRCReconfiguration message in operation 2g-65 may include a common configuration parameter for configuration of several SCells (Scell Group configuration) at one time or a configuration parameter (SCell configuration) for each of the SCells. When the RRCReconfiguration message includes a common configuration parameter for several SCells, at least one of the following methods may be applied.

Method 1: The RRCReconfiguration message may include a common parameter for each SCell group (for example, SCellGroupToAddModList or SCellGroupToReleaseList).

Because a plurality of SCell groups may exist, the RRCReconfiguration message may include SCell group identifiers for identifying the SCell groups.

The RRCReconfiguration message may include a common parameter for each SCell group (for example, sCellConfigCommon or sCellGroupCommonConfig).

The RRCReconfiguration message may include a list (sCellToAddModList) for adding or modifying one or more cells to each SCell group. In this case, an initial state of each Scell may be set as an activated state, a dormant state, or an inactive state.

The RRCReconfiguration message may include a list (sCellToReleaseList) for releasing one or more cells from each SCell group.

Method 2: The RRCReconfiguration message may include a common parameter for each SCell group and different parameters for different SCells in each SCell group (for example, SCellGroupToAddModList or SCellGroupToReleaseList).

Because a plurality of SCell groups may exist, the RRCReconfiguration message may include SCell group identifiers for identifying the SCell groups.

The RRCReconfiguration message may include a common parameter for each SCell group (for example, sCellConfigCommon or sCellGroupCommonConfig).

The RRCReconfiguration message may include a list (sCellToAddModList) for adding or modifying one or more cells to each SCell group. In this case, an initial state of each Scell may be set as an activated state, a dormant state, or an inactive state.

The RRCConnectionReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCReconfiguration message may include a list (sCellToReleaseList) for releasing one or more cells from each SCell group.

The eNB/gNB 2*g*-02 may apply CA by indicating a state (activated, dormant, or deactivated state) of each SCell configured in the UE 2*g*-01 by using a MAC CE (operation 2*g*-75).

FIG. 2H illustrates a diagram for describing a procedure in which a UE supporting an idle mode measurement releases an RRC connection with an eNB/gNB and switches an RRC connected mode to an RRC inactive mode, and a method in which the eNB/gNB provides idle mode measurement configuration information to the UE, according to an embodiment of the disclosure.

The UE according to an embodiment of the disclosure may perform a cell selection procedure and/or a cell reselection procedure via frequency measurement in order to search for a cell to be camped on or a serving cell in an RRC inactive mode. The UE may separately measure several frequencies in the RRC inactive mode and may store results of the measurements. An idle mode measurement according to an embodiment of the disclosure may mean that the UE performs measurement in the RRC inactive mode. To this end, the eNB/gNB may transmit, to the UE in the RRC connected mode, an RRCRelease message including measurement configuration information (measIdleConfig) that is available in the RRC inactive mode by the UE. Alternatively, the eNB/gNB may broadcast, to the UE in the RRC inactive mode, system information (e.g., SIB5 or a new SIBx) including measurement configuration information (measIdleConfigSIB) that is available in the RRC inactive mode by the UE. The UE in the RRC inactive mode may measure at least one frequency, based on the measurement configuration information included in the RRCRelease message or the system information. When the eNB/gNB transmits a UEInformationRequest message to the UE that has transited from the RRC inactive mode to the RRC connected mode in order to request a measurement result, the UE may transmit to the eNB/gNB a UEInformationResponse message including a result of a measurement performed in the RRC inactive mode. This may delay application of existing CA by a long time.

Referring to FIG. 2H, a UE 2*h*-01 may establish an RRC connection with an eNB/gNB 2*h*-02 and thus may be in the RRC connected mode (operation 2*h*-05). When the UE 2*h*-01 that transmits or receives data in the RRC connected mode does not transmit or receive data for a certain reason or for a certain time, the eNB/gNB 2*h*-02 may transmit an RRCRelease message including suspended configuration information (suspendConfig) to the UE 2*h*-01 such that the UE 2*h*-01 switches to the RRC inactive mode (operation 2*h*-10). The RRCRelease message may further include measurement configuration information available in the RRC inactive mode (measIdleConfig). The measIdleConfig being an IE may include at least one of the following parameters.

A carrier frequency list used for measurement by a UE in the RRC inactive mode (measIdleCarrierList) The measIdleCarrier List may include one or more pieces of information (measIdleCarrier) about each carrier frequency.

Each measIdleCarrier include at least one of the following pieces of information. Embodiments of the disclosure are not limited to the following example.

dl-CarrierFreq: An absolute radio frequency channel number value (ARFCN-Value) representing the center frequency of a synchronization signal block (hereinafter, an SS Block) of neighboring cells may be included. The UE 2*h*-01 may apply reference signal measurement timing configuration of neighboring cells, based on the information dl-CarrierFreq, or may perform neighboring cell measurement.

nrofSS-BlocksToAverage: The number of SS/PBCH blocks that are used to derive a cell measurement value. The UE 2*h*-01 may derive a cell measurement value by taking an average of SS/PBCH measurement values by applying the signaled value. When the information nrofSS-BlocksToAverage is not signaled, the UE 2*h*-01 may derive a cell measurement value, based on a SS/PBCH block providing a greatest signal intensity.

absThreshSS-BlocsConsolidation: A threshold that is used to consolidate cell measurement values respectively derived from SS/PBCH blocks. The UE 2*h*-01 may use, in the cell measurement value, an SS/PBCH block signal intensity that is greater than a signaled absThreshSS-BlocsConsolidation value. When the information absThreshSS-BlocsConsolidation is not signaled, the UE 2*h*-01 may derive a cell measurement value, based on a SS/PBCH block providing a greatest signal intensity.

smtc: Measurement timing configuration information for inter-frequency measurement or intra-frequency measurement may be included. In detail, the information smtc may mean period and offset information of a measurement time interval for receiving an SS/PBCH block, and duration information of the measurement time interval. An ASN. 1 structure of smtc is as shown in Table 2 below.

TABLE 2

```
SSB-MTC information element
ASN1START
TAG-SSB-MTC-START
SSB-MTC ::=            SEQUENCE {
periodicityAndOffset     CHOICE {
sf5                        INTEGER (0..4),
sf10                       INTEGER (0..9),
sf20                       INTEGER (0..19),
sf40                       INTEGER (0..39),
sf80                       INTEGER (0..79),
sf160                      INTEGER (0..159)
},
duration                 ENUMERATED { sf1, sf2, sf3, sf4,
sf5 }
}
```

The UE 2h-01 may set a reference signal measurement timing via the signaled value.

ssbSubcarrierSpacing: A sub-carrier spacing between SSBs may be included. For example, in the case of a frequency band that is less than 6 GHz, a 15 or 30 kHz value may be signaled, and, in the case of a frequency band that is greater than 6 GHz, a 120 or 240 kHz value may be signaled.

deriveSSB-IndexFromCell: An indicating value indicating timing information that the UE 2h-01 may/should use to derive the index of an SS block that is transmitted by a neighboring cell or serving cell existing in a signaled center frequency may be included. For example, when a deriveSSB-IndexFromCell value is signaled or set as TRUE, the UE 2h-01 may derive the index of an SS block of all of the neighboring cells existing in the center frequency by applying timing information of any cell detected in the center frequency. This may also be equally applied to a case where the center frequency is a serving frequency, Because, due to a cell reselection procedure, the center frequency of the UE 2h-01 performing idle mode measurement may be a serving frequency or an inter-frequency. Alternatively, the UE 2h-01 may apply an SFN and a frame boundary alignment to all of the cells existing in the center frequency.

reportQuantities: An indicator indicating whether the UE 2h-01 reports result values of cells measured through idle mode measurement with the RSRP or the RSRQ or with both of the RSRP and the RSRQ may be included.

reportQuantityCell: The result values of the cells measured by the UE 2h-01 through idle mode measurement may be included. In this case, the UE 2h-01 may report, to the eNB/gNB 2h-02, the result values of the cells measured by the UE 2h-01 through idle mode measurement with the RSRP or the RSRQ or with both of the RSRP and the RSRQ.

reportQuantityRsIndexes: An indicator indicating whether the UE 2h-01 reports information measured for each RS index through idle mode measurement with the RSRP or the RSRQ or with both of the RSRP and the RSRQ may be included. The information reportQuantityRsIndexes may be indicated when a beam level management is efficient during Scell configuration.

maxNrofRS-IndexesToReport: A value representing how many RS indexes at maximum the UE 2h-01 reports to the eNB/gNB 2h-02, based on idle mode measurement, may be included. The information maxNrofRS-IndexesToReport may be indicated when a beam level management is efficient during Scell configuration.

includeBeamMeasurements: An indicator indicating that a beam measurement result is to be included may be included. For example, when reportQuantityRS-Indexes is set as TRUE for each SS/PBCH block index, the UE 2h-01 may report a measurement value to the eNB/gNB 2h-02, based on SS/PBCH. The information includeBeamMeasurements may be indicated when a beam level management is efficient during Scell configuration.

validityArea: A cell list on which the UE 2h-01 is requested to perform idle mode measurement and report a result of the idle mode measurement may be included.

measCellList: A cell list on which the UE 2h-01 is requested to perform idle mode measurement and report a result of the idle mode measurement may be included.

quantityThreshold: A threshold of the RSRP or RSRQ based on which the UE 2h-01 may determine whether to report cells measured via idle mode measurement may be included. Alternatively, respective thresholds may be included for the RSRP and RSRQ.

measIdleCarrierList may be signaled for each radio access technology. For example, measIdleCarrierList may include measIdleCarrierListEUTRA and measIdleCarrierListNR.

A value representing a duration while the UE performs measurement in the RRC inactive mode (measIdleDuration)

According to an embodiment, the measIdleDuration may represent a timer T311 value or a new timer T3xx value.

The UE may perform idle mode measurement after the UE receives the RRCRelease message and before the measIdleDuration expires.

measIdleDuration may be signaled for each radio access technology or regardless of radio access technologies. For example, measIdleDuration may be divided into measIdleDurationEUTRA and measIdleDurationNR and signaled, or may be signaled as a single value to be commonly applied.

When the RRCRelease message includes measIdleConfig in operation 2h-10, the UE 2h-01 may delete VarMeasIdleConfig and VarMeasIdleReport being UE variables. The UE may store, in the measIdleConfig, the value representing the duration while the UE performs measurement in the RRC inactive mode (e.g., measIdleDuration), and may drive a timer by applying the value representing the duration while the UE performs measurement in the RRC inactive mode. When the RRCRelease message includes the carrier frequency list used for measurement by the UE in the RRC inactive mode, the UE 2h-01 may store the carrier frequency list and perform idle mode measurement while a timer is operating in supportable carriers, based on the stored carrier frequency list (operation 2h-16). When the RRCRelease message does not include the carrier frequency list used for measurement by the UE in the RRC inactive mode, the UE 2h-01 may receive system information by searching for and camping on a suitable cell, via a cell selection procedure and/or a cell reselection procedure (operation 2h-15). When a carrier frequency list measIdleConfigSIB used for measurement in the RRC inactive mode is included in the received system information, the UE 2h-01 may store the received measIdleConfigSIB while the on-going operation of the timer continues, or may replace the carrier frequency list within the UE 2h-01, based on the received measIdle-ConfigSIB, and perform idle mode measurement while the timer is operating in supportable carriers, based on the carrier frequency list (operation 2h-15). The measIdleConfigSIB according to an embodiment may include some or all of the parameters included in the above-described measIdleConfig.

When system information that is broadcast by a target cell does not include the measIdleConfigSIB through a cell reselection procedure, the UE 2h-01 may stop the on-going idle mode measurement.

In operation 2h-16, the UE 2h-01 may perform measurement by deriving a timing of an SS/PBCH block, based on an SFN and a subframe of a certain cell, by using the smtc received from the eNB/gNB 2h-02 and a certain equation. The certain equation is expressed as follows. SMTC is substituted into the equation below. An SFN including a measurement time interval of each SS/PBCH block satisfies the following equation.

$$SFN \bmod T = (FLOOR(Offset/10))$$

When a period is greater than 5 subframes, a subframe by which a first SS/PBCH block of the interval satisfies the following equation.

$$subframe = Offset \bmod 10$$

Otherwise, $$subframe = Offset \text{ or } (Offset+5)$$

Herein, T means CEIL(Periodicity/10).

A UE according to an embodiment of the disclosure may measure a plurality of frequencies in the RRC inactive mode and may store results of the measurements. In this case, a serving cell or neighboring cells may have different SFNs and different subframe timings. Thus, the UE 2h-01 needs to determine the SFNs and the subframes of which serving cell or neighboring cells are based on to derive the timing of the SS/PBCH block. According to the disclosure, the serving cell or neighboring cells serving as a basis are determined using at least one of the following methods. Embodiments of the disclosure are not limited to the following examples.

Option 1) When the RRCRelease message (operation 2h-10) includes smtc, the UE may derive the timing of the SS/PBCH block for a cell that has received the RRCRelease message, based on the smtc information. On the indicated dl-CarrierFreq in the RRCRelease message, the UE shall not consider SS/PBCH block transmission in subframes outside the SMTC occasion for RRMs based on SS/PBCH blocks.

Option 2) When the RRCRelease message (operation 2h-10) includes smtc, the UE may derive the timing of the SS/PBCH block for a serving cell, based on the smtc information. On the indicated dl-CarrierFreq in the RRCRelease message, the UE shall not consider SS/PBCH block transmission in subframes outside the SMTC occasion for RRMs based on SS/PBCH blocks.

Option 3) When the RRCRelease message (operation 2h-10) includes smtc, the UE may derive the timing of the SS/PBCH block for a cell list (measCellList or validityArea) included in the RRCRelease message, based on the smtc information. On the indicated dl-CarrierFreq in the RRCRelease message, the UE shall not consider SS/PBCH block transmission in subframes outside the SMTC occasion for RRMs based on SS/PBCH blocks.

Option 4) When the system information (operation 2h-15) includes smtc, the UE may derive the timing of the SS/PBCH block for a cell list (measCellList or validityArea) included in the system information, based on the smtc information. For example, for a cell included in a serving frequency, the UE may apply smtc information included in SIB2, or, for a cell included in an inter-frequency, the UE may apply smtc information included in SIB4. On the indicated dl-CarrierFreq in the RRCRelease message, the UE shall not consider SS/PBCH block transmission in subframes outside the SMTC occasion for RRMs based on SS/PBCH blocks.

The UE may receive an SS/PBCH block during the derived measurement time interval, and may perform RSRP, RSRQ, etc. corresponding to the received SS/PBCH block.

The UE 2h-01 may perform a random access procedure in order to establish an RRC connection with the eNB/gNB 2h-02. When random access is triggered (operation 2h-18), the UE 2h-01 may select a PRACH occasion and transmit a Random Access Preamble to the eNB/gNB 2h-02 (operation 2h-20). In response to the Random Access Preamble, the eNB/gNB 2h-02 may transmit an RAR message to the UE 2h-01 (operation 2h-25). The UE 2h-01 in the RRC idle mode may establish an inverse direction transmission synchronization with the eNB/gNB 2h-02 through operations 2h-20 and 2h-25.

The UE 2h-01 in the RRC idle mode may perform an RRC connection resume procedure with the eNB/gNB 2h-02. First, the UE 2h-01 may transmit an RRCResumeRequest message or an RRCResumeRequest1 message to the eNB/gNB 2h-02 (operation 2h-30). The RRCResumeRequest message or the RRCResumeRequest1 message may include, for example, a UE identifier (resumeIdentity), resume encryption information (resumeMAC-I), and a cause (resumeCause) for resuming an RRC connection, which are used by an eNB/gNB to retrieve a terminal context. In response to the RRCResumeRequest message or the RRCResumeRequest1 message, the eNB/gNB 2h-02 may transmit an RRCResume message to the UE 2h-01 (operation 2h-35). The RRCResume message may include radio bearer configuration information (radioBearerConfig), master cell group configuration information (masterCellGroup), measurement configuration information (measConfig), etc. In detail, the radio bearer configuration information and the master cell group configuration information may include configuration information of an SRB and DRBs that resume, RLC bearer configuration information about the SRB and the DRBs, MAC cell group configuration information (macCellGroupConfig), physical cell group configuration information (physicalCellGroupConfig), etc. In response to the RRCSetup message, the UE 2h-01 may apply the information and may switch to the RRC connected mode (operation 2h-36). When the system information received in operation 2h-15 includes an indicator (idleModeMeasurements) indicating that the eNB/gNB 2h-02 is able to process idle mode measurement of the UE 2h-01, and the VarMeasIdleReport as a UE variable includes idle mode measurement information by performing idle mode measurement in operation 2h-16, the UE 2h-01 switched to the RRC connected mode may include, in an RRCResumeComplete message, an indicator (idleMeasAvailable) indicating that an idle mode measurement report is possible. The UE 2h-01 may stop when the timer (for example, T311 or T3xx) keeps operating. The UE 2h-01 in the RRC connected mode may transmit the RRCResumeComplete message to the eNB/gNB 2h-02 through SRB1 (operation 2h-40).

When the RRC connection resume procedure is successfully performed, the eNB/gNB 2h-02 may perform an RRC connection reconfiguration procedure with the UE 2h-01.

First, the eNB/gNB 2h-02 may transmit an RRCReconfiguration message to the UE 2h-01 (operation 2h-45). The RRCReconfiguration message may include at least one of radio bearer configuration information (radioBearerConfig), master cell group configuration information (masterCellGroup), or measurement configuration information (measConfig). In response to the RRCReconfiguration message, the UE 2h-01 may apply the information included in the RRCReconfiguration message, and then may transmit an RRCReconfigurationComplete message to the eNB/gNB 2h-02 (operation 2h-50).

When the RRCResumeComplete message includes the indicator (idleMeasAvailable) indicating that an idle mode measurement report is possible, in operation 2h-40, the eNB/gNB 2h-02 may perform a UE information procedure with the UE 2h-01. The UE information procedure may be immediately performed without performing the above-described RRC connection reconfiguration procedure (including operations 2h-45 and 2h-50). The eNB/gNB 2h-02 may transmit, to the UE 2h-01 in the RRC connected mode, a UEInformationRequest message including an indicator (idleModeMeasurementReq) requesting a result of the measurement performed in the RRC inactive mode (operation 2h-55). When security is successfully configured, the UE 2h-01 that has received the UEInformationRequest message may perform the following processes.

1> When the UEInformationRequest message includes the indicator (idleModeMeasurementReq) requesting a result of the measurement performed in the RRC inactive mode and the UE 2h-01 has stored the VarMeasIdleReport, 2> measResultListIdle included in a UEInformationResponse message is set as a measReportIdle value (or an idleMeasReport value) included in the VarMeasIdleReport.

2> When it is confirmed by lower layers that the UEInformationResponse message was transmitted successfully, the VarMeasIdleReport is discarded.

1> The UEInformationResponse message is submitted to the lower layers via the SRB1. The UE 2h-01 may transmit, to the eNB/gNB 2h-02, the UEInformationReponse message including a list (measResultListIdle) of results of the measurements performed in the RRC inactive mode (operation 2h-60).

In the above description, the measResultListIdle as an IE may mean a list of measResultIdle as an IE individually configured for one or more neighboring inter-frequency carriers by the UE 2h-01 in the RRC inactive mode. A UE according to an embodiment of the disclosure may configure measResultIdle for each neighboring inter-frequency carrier when transmitting the UEInformationResponse message, by using at least one of the following methods.

Method 1: The measResultIdle may optionally include a measurement result (measResultServingCell) of a serving cell through idle mode measurement with respect to each neighboring inter-frequency carrier, and may optionally include a measurement result (measResultNeighCells) of one or more neighboring cells.

The measResultIdle optionally includes the measurement result (measResultServingCell) of a serving cell, because there exist only one serving cell of the UE in the RRC inactive mode and accordingly there is no need to report a plurality of neighboring inter-frequencies. For example, when measResultServingCell for each neighboring inter-frequency carrier is represented in the form of a value of 0 or 1 (or FALSE or TURE) and is 0 (or FALSE), the measResultIdle may not include measResultServingCell.

When the measResultIdle includes measResultServingCell for each neighboring inter-frequency carrier, the measResultIdle may include the same serving cell measurement results.

The measResultServingCell may include or may not include at least one of the following result values.

RSRP result values (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When there are no measurement results of neighboring cells for all neighboring inter-frequency carriers, the measResultListIdle may not be included in the UEInformationResponse message.

Method 2: The measResultIdle may always include a measurement result (measResultServingCell) of a serving cell through idle mode measurement with respect to each neighboring inter-frequency carrier, and may optionally include a measurement result (measResultNeighCells) of one or more neighboring cells.

The measResultIdle always includes a serving cell measure result for each neighboring inter-frequency carrier, and the serving cell measurement results are the same as each other. When there is no measurement result of neighboring cells for each neighboring inter-frequency carrier, the measResultListIdle does not include the neighboring inter-frequency carrier. When there are no measurement results of neighboring cells for all neighboring inter-frequency carriers, the measResultListIdle may not be included in the UEInformationResponse message.

The measResultServingCell may include at least one of the following result values.

RSRP result value (rsrpResult)

RSRQ result value (rsrqResult)

A measurement result of neighboring cells for each neighboring inter-frequency carrier may include at least one of the following parameters.

A carrier frequency (CarrierFreq) containing an ARFCN-Value

A physical cell identifier (phyCellId) of each neighboring cell

RSRP result value (rsrpResult)

RSRQ result value (rsrqResult)

When the measResultListIdle is included in the UEInformationResponse message in operation 2h-60, the eNB/gNB 2h-02 may perform an RRC connection reconfiguration procedure with the UE 2h-01. First, the eNB/gNB 2h-02 may transmit an RRCReconfiguration message to the UE 2h-01 (operation 2h-65). The RRCReconfiguration message may include at least one of configuration information about a DRB to process user data, configuration information about SRB1 and/or SRB2 via which a control message may be transmitted and received, or measurement configuration information (measConfig). In response to the RRCReconfiguration message, the UE 2h-01 may apply the information included in the RRCReconfiguration message, and then may transmit an RRCReconfigurationComplete message to the eNB/gNB 2h-02 (operation 2h-70).

The RRCReconfiguration message in operation 2h-65 may include a common configuration parameter for configuration of several SCells (Scell Group configuration) at one time or a configuration parameter (SCell configuration) for each of the SCells. When the RRCReconfiguration message includes a common configuration parameter for several SCells, at least one of the following methods may be applied.

Method 1: The RRCReconfiguration message may include a common parameter for each SCell group (for example, SCellGroupToAddModList or SCellGroupToReleaseList).

Because a plurality of SCell groups may exist, the RRCReconfiguration message may include SCell group identifiers for identifying the SCell groups.

The RRCReconfiguration message may include a common parameter for each SCell group (for example, sCellConfigCommon or sCellGroupCommonConfig).

The RRCReconfiguration message may include a list (sCellToAddModList) for adding or modifying one or more cells to each SCell group. In this case, an initial state of each Scell may be set as an activated state, a dormant state, or an inactive state.

The RRCReconfiguration message may include a list (sCellToReleaseList) for releasing one or more cells from each SCell group.

Method 2: The RRCReconfiguration message may include a common parameter for each SCell group and different parameters for different SCells in each SCell group (for example, SCellGroupToAddModList or SCellGroupToReleaseList).

Because a plurality of SCell groups may exist, the RRCReconfiguration message may include SCell group identifiers for identifying the SCell groups.

The RRCReconfiguration message may include a common parameter for each SCell group (for example, sCellConfigCommon or sCellGroupCommonConfig).

The RRCReconfiguration message may include a list (sCellToAddModList) for adding or modifying one or more cells to each SCell group. In this case, an initial state of each Scell may be set as an activated state, a dormant state, or an inactive state.

The RRCReconfiguration message may include an indicator for indicating delta configuration to apply different parameters for different SCells in each SCell group. When the indicator is included in a specific Scell, a common parameter of an Scell group to which SCells belong. When the indicator is not included in the specific Scell, only parameters different from the common parameter of the Scell group may be additionally included or only the parameter of the specific Scell may be included.

The RRCReconfiguration message may include a list (sCellToReleaseList) for releasing one or more cells from each SCell group.

The eNB/gNB 2h-02 may apply CA by indicating a state (activated, dormant, or deactivated state) of each SCell configured in the UE 2h-01 by using a MAC CE (operation 2h-75).

Figure 2I:
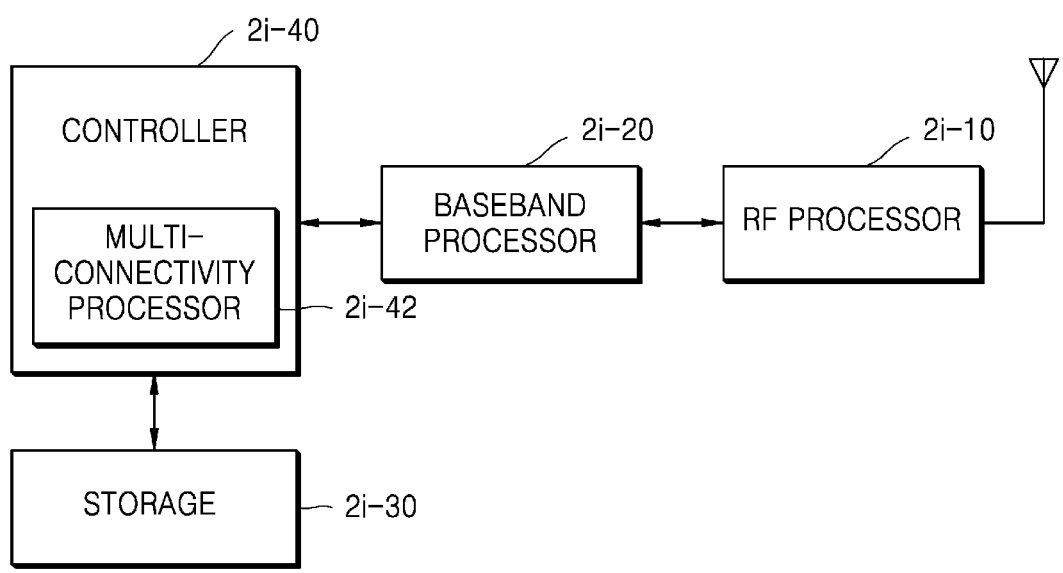
FIG. 2I illustrates a block diagram of a structure of a UE according to an embodiment of the disclosure.

FIG. 2I illustrates a block diagram of a structure of a UE according to an embodiment of the disclosure.

Referring to FIG. 2I, the UE may include an RF processor 2i-10, a baseband processor 2i-20, a storage 2i-30, and a controller 2i-40. Embodiments are not limited thereto, and the UI may include more or less components than those illustrated in FIG. 2I. The UE of FIG. 2I may correspond to the UE of FIG. 1I.

According to an embodiment of the disclosure, the RF processor 2i-10 may perform functions for transmitting and receiving a signal via a radio channel, such as a band conversion, amplification, and the like of the signal. In other words, the RF processor 2i-10 may up-convert a baseband signal provided from the baseband processor 2i-20, to an RF band signal and transmit the RF band signal through an antenna, and down-convert an RF band signal received through an antenna, to a baseband signal. For example, the RF processor 2i-10 may include a transmit filter, a receive filter, an amplifier, a mixer, an oscillator, a DAC, and an ADC. Although only a single antenna is illustrated in FIG. 2I, the UE may include multiple antennas.

The RF processor 2i-10 may include a plurality of RF chains. The RF processor 2i-10 may perform beamforming. For beamforming, the RF processor 2i-10 may adjust phases and amplitudes of signals transmitted or received through multiple antennas or antenna elements. The RF processor 2i-10 may perform an MIMO operation and may receive layers (or data of multiple layers) in the MIMO operation. The RF processor 2i-10 may perform received beam sweeping by appropriately configuring multiple antennas or antenna elements, or may adjust a direction and a beam width of the received beam such that the received beam coordinates with a transmit beam, under the control of the controller 2i-40.

The baseband processor 2i-20 may perform conversion between a baseband signal and a bitstream based on physical layer specifications of a system. For example, for data transmission, the baseband processor 2i-20 may generate complex symbols by encoding and modulating a transmit bitstream. For data reception, the baseband processor 2i-20 may reconstruct a received bitstream by demodulating and decoding a baseband signal provided by the RF processor 2i-10. For example, according to an OFDM scheme, for data transmission, the baseband processor 2i-20 may generate complex symbols by encoding and modulating a transmit bitstream, map the complex symbols to subcarriers, and then configure OFDM symbols by performing IFFT and CP insertion. For data reception, the baseband processor 2i-20 may split a baseband signal provided from the RF processor 2i-10, in OFDM symbol units, reconstruct signals mapped to subcarriers by performing FFT, and then reconstruct a received bitstream by demodulating and decoding the signals.

The baseband processor 2i-20 and the RF processor 2i-10 may transmit and receive signals as described above. Each of the baseband processor 2i-20 and the RF processor 2i-10 may also be called a transmitter, a receiver, a transceiver, or a communicator. At least one of the baseband processor 2i-20 or the RF processor 2i-10 may include multiple communication modules to support multiple different radio access technologies. Also, at least one of the baseband processor 2i-20 or the RF processor 2i-10 may include multiple different communication modules to process signals of different frequency bands. For example, the different radio access technologies may include an LTE network, an NR network, etc. The different frequency bands may include an SHF (e.g., 2.5 GHz and 5 GHz) band and a mmWave (e.g., 60 GHz) band. The UE may transmit or receive a signal to or from a base station by using the baseband processor 2i-20 and the RF processor 2i-10, and the signal may include control information and data.

The storage 2i-30 may store data for operations of the UE, e.g., basic programs, application programs, and configuration information The storage 2i-30 may provide the stored data upon request by the controller 2i-40. The storage 2i-30 may be composed of storage media, such as ROM, RAM, hard disks, CD-ROM, and DVDs, or a combination of the storage media. The storage 2i-30 may be composed of a plurality of memories.

The controller 2i-40 may control overall operations of the UE. For example, the controller 2i-40 may transmit and receive signals through the baseband processor 2i-20 and the RF processor 2i-10. The controller 2i-40 may write and read data to and from the storage 2i-30. To this end, the controller 2i-40 may include at least one processor. For example, the controller 2i-40 may include a CP performing control for communication, and an AP controlling an upper layer, such as an application program. The controller 2i-40 may control the UE to perform a communication method for supporting the above-described carrier aggregation. At least one of the components included in the UE may be implemented by using a single chip.

Figure 2J:
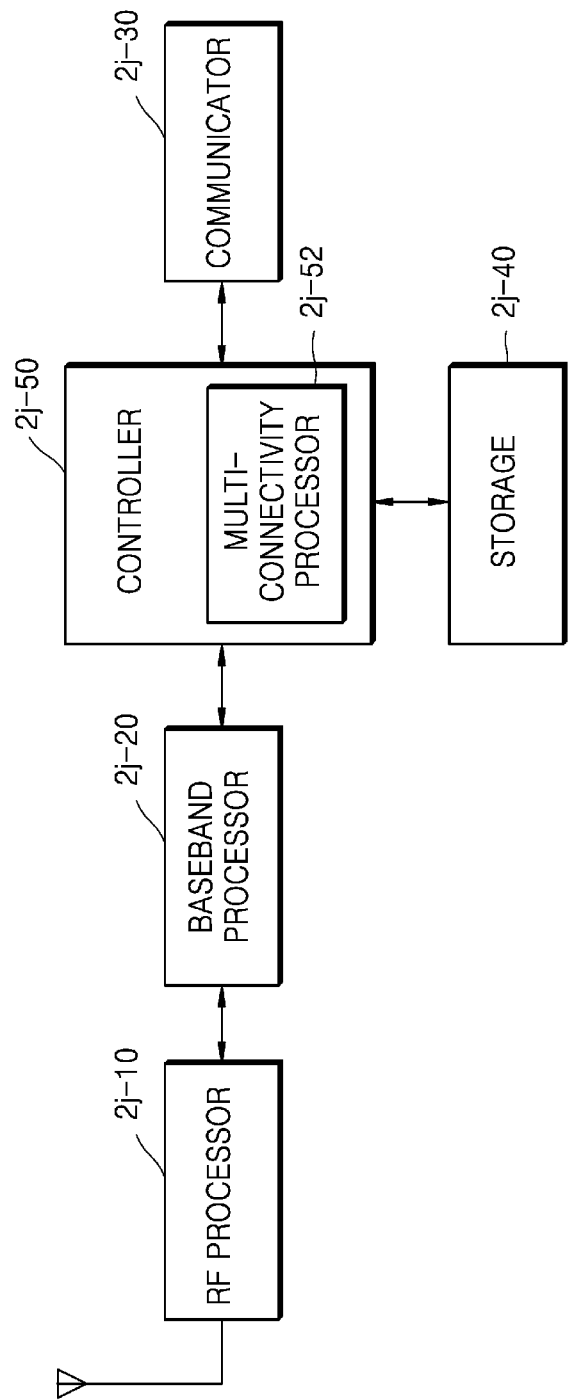
FIG. 2J illustrates a block diagram of a structure of a base station according to an embodiment of the disclosure.

FIG. 2J illustrates a block diagram of a structure of a base station according to an embodiment of the disclosure.

The base station according to an embodiment of the disclosure may include at least one TRP. Referring to FIG. 2J, the base station may include an RF processor 2j-10, a baseband processor 2j-20, a communicator 2j-30, a storage 2j-40, and a controller 2j-50. Embodiments are not limited thereto, and the base station may include more or less components than those illustrated in FIG. 2J. The base station of FIG. 2J may correspond to the base station of FIG. 2I.

The RF processor 2j-10 may perform functions for transmitting and receiving a signal via a radio channel, such as a band conversion, amplification, and the like of the signal. In other words, the RF processor 2j-10 may up-convert a baseband signal provided from the baseband processor 2i-20, to an RF band signal and transmit the RF band signal through an antenna, and down-convert an RF band signal received through an antenna, to a baseband signal. For example, the RF processor 2j-10 may include a transmitting filter, a receiving filter, an amplifier, a mixer, an oscillator, a DAC, an ADC, or the like. Although only a single antenna is illustrated in FIG. 2J, the RF processor 2j-10 may include multiple antennas. The RF processor 2j-10 may include a plurality of RF chains. The RF processor 2j-10 may perform beamforming. For beamforming, the RF processor 2j-10 may adjust phases and amplitudes of signals transmitted or received through multiple antennas or antenna elements. The RF processor 2j-10 may perform a DL MIMO operation by transmitting at least one layer.

The baseband processor 2j-20 may perform conversion between a baseband signal and a bitstream based on physical layer specifications of a first radio access technology. For example, for data transmission, the baseband processor 2j-20 may generate complex symbols by encoding and modulating a transmit bitstream. For data reception, the baseband processor 2j-20 may reconstruct a received bitstream by demodulating and decoding a baseband signal provided by the RF processor 2j-10. For example, according to an OFDM scheme, for data transmission, the baseband processor 2j-20 may generate complex symbols by encoding and modulating a transmit bitstream, map the complex symbols to subcarriers, and then configure OFDM symbols by performing IFFT and CP insertion. For data reception, the baseband processor 2j-20 may split a baseband signal provided from the RF processor 2j-10, in OFDM symbol units, reconstruct signals mapped to subcarriers by performing FFT, and then reconstruct a received bitstream by demodulating and decoding the signals. The baseband processor 2j-20 and the RF processor 2j-10 may transmit and receive signals as described above. Accordingly, each of the baseband processor 2j-20 and the RF processor 2j-10 may also be called a transmitter, a receiver, a transceiver, a communicator, or a wireless communicator. The base station may transmit or receive a signal to or from a base station by using the baseband processor 2j-20 and the RF processor 2j-10, and the signal may include control information and data.

The communicator 2j-30 may provide an interface for communicating with other nodes in a network. According to an embodiment, the communicator 2j-30 may be a backhaul communicator.

The storage 2j-40 may store data for operations of a main base station, e.g., basic programs, application programs, and configuration information In particular, the storage 2j-40 may store information about bearers allocated for a connected UE, a measurement report transmitted from the connected UE, etc. The storage 2j-40 may store criteria information used to determine whether to provide or release multi-connectivity to or from the UE. The storage 2j-40 may provide the stored data upon request by the controller 2j-50. The storage 2j-40 may be composed of storage media, such as ROM, RAM, hard disks, CD-ROM, and DVDs, or a combination of the storage media. The storage 2j-40 may be composed of a plurality of memories.

The controller 2j-50 may control overall operations of the base station. For example, the controller 2j-50 may transmit and receive signals through the baseband processor 2j-20 and the RF processor 2j-10 or through the communicator 2j-30. The controller 2j-50 may write and read data to and from the storage 2j-40. To this end, the controller 2j-50 may include at least one processor. Each of the baseband processor 2j-20 and the RF processor 2j-10 may also be called a transmitter, a receiver, a transceiver, a communicator, or a wireless communicator. The controller 2j-50 may control the base station to perform a communication method for supporting the above-described carrier aggregation. At least one of the components included in the base station may be implemented by using a single chip.

The methods according to embodiments of the disclosure as described in the specification or in the following claims may be implemented as hardware, software, or a combination of hardware and software. When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory (including random access memory (RAM) or flash memory), read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access a device performing the embodiments of the disclosure.

According to the above-described embodiments, CA may be effectively provided in a mobile communication system.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

The embodiments of the disclosure disclosed in the specification and drawings are merely presented specific examples to easily explain the technical contents of the disclosure and promote understanding of the disclosure, and are not intended to limit the scope of the disclosure. In other words, it is obvious to those skilled in the art that other modifications based on the technical spirit of the disclosure can be implemented. In addition, each of the above embodiments can be combined with each other when necessary to operate. For example, portions of one embodiment of the disclosure and another embodiment may be combined with each other so that a base station and a UE may be operated. Furthermore, embodiments of the disclosure may be applicable to other communication systems, and other modifications based on the technical spirit of the embodiments may be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:
receiving a message including measIdleConfig;
performing measurement in an idle mode or an inactive mode, based on the measIdleConfig;
receiving a UEInformationRequest message for requesting a result of the measurement; and
transmitting a UEInformationResponse message including the result of the measurement,
wherein the message includes a radio resource control (RRC) release message or system information,
wherein the measIdleConfig includes measIdleCarrierListEUTRA and measIdleCarrierListNR including information on at least one measIdleCarrier,
wherein the information includes reportQuantities associated with the at least one measIdleCarrier,
wherein the measIdleConfig includes an indicator (includeBeamMeasurements) indicating whether to include a beam measurement result.

2. The method of claim 1, wherein the result of the measurement includes a measurement result of a serving cell and a result of measurement with respect to each of one or more frequency carriers, and the result of the measurement with respect to each of one or more frequency carriers comprises a measurement result of one or more cells.

3. The method of claim 1, wherein the measIdleConfig includes at least one of an indicator (reportQuantityRsIndexes) indicating whether the UE reports a measurement result for each reference signal (RS) index with a reference signal received power (RSRP) or a reference signal received quality (RSRQ or with both of the RSRP and the RSRQ, or an indicator (maxNrofRS-IndexesToReport) indicating how many measurement results at maximum from among the measurement results for the RS indexes the UE reports.

4. The method of claim 1, wherein the measIdleConfig includes at least one of information (nrofSS-BlocksToAverage) about a number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

5. The method of claim 1, wherein the measIdleConfig comprises at least one of information (measIdleDuration) about a duration while the UE performs measurement, cell list information (measCellList) of a list of cells that are to be measured by the UE, or information (quantityThreshold) about a threshold based on which the UE determines whether to report the result of the measurement.

6. The method of claim 5, further comprising:
transmitting an RRCResumeRequest message; and
receiving an RRCConnectionReject message,
wherein, when the RRCConnectionReject message includes waitTime, the UE continuously performs measurement in the idle mode until a timer operating according to the information (measIdleDuration) expires.

7. A method performed by a base station, the method comprising:
transmitting a message including measIdleConfig;
transmitting a UEInformationRequest message for requesting a result of measurement; and
receiving a UEInformationResponse message including the result of the measurement,
wherein the includes a radio resource control (RRC) Release message or system information,
wherein the measIdleConfig includes measIdleCarrierListEUTRA and measIdleCarrierListNR including information on at least one measIdleCarrier,
wherein the information includes reportQuantities associated with the at least one measIdleCarrier,
wherein the measIdleConfig includes an indicator (includeBeamMeasurements) indicating whether to include a beam measurement result.

8. The method of claim 7, wherein the measIdleConfig at least one of an indicator (reportQuantityRsIndexes) indicating whether the UE reports a measurement result for each reference signal (RS) index with a reference signal received power (RSRP) or reference signal received quality (RSRQ), an indicator (maxNrofRS-IndexesToReport) indicating how many measurement results at maximum from among the measurement results for the RS indexes the UE reports.

9. The method of claim 7, wherein the measIdleConfig includes at least one of information (nrofSS-BlocksToAverage) about a number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

10. A user equipment (UE) in a wireless communication system, the UE comprising:
a transceiver; and
a processor coupled to the transceiver and configured to:
receive a message including measIdleConfig,
perform measurement in an idle mode or an inactive mode, based on the measIdleConfig,
receive a UEInformationRequest message for requesting a result of the measurement, and
transmit a UEInformationResponse message including the result of the measurement,
wherein the message includes a radio resource control (RRC) release message or system information,
wherein the measIdleConfig includes measIdleCarrierListEUTRA and measIdleCarrierListNR including information on at least one measIdleCarrier,
wherein the information includes reportQuantities associated with the at least one measIdleCarrier,
wherein the measIdleConfig includes an indicator (includeBeamMeasurements) indicating whether to include a beam measurement result.

11. The UE of claim 10, wherein the result of the measurement includes a measurement result of a serving cell and a result of measurement with respect to each of one or more frequency carriers, and the result of the measurement with respect to each of one or more frequency carriers comprises a measurement result of one or more cells.

12. The UE of claim 10, wherein the measIdleConfig includes at least one of an indicator (reportQuantityRsIndexes) indicating whether the UE reports a measurement result for each reference signal (RS) index with RSRP, or an indicator (maxNrofRS-IndexesToReport) indicating how many measurement results at maximum from among the measurement results for the RS indexes the UE reports.

13. The UE of claim 10, wherein the measIdleConfig includes at least one of information (nrofSS-BlocksToAverage) about a number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

14. The UE of claim 10, wherein the measIdleConfig includes at least one of information (measIdleDuration) about a duration while the UE performs measurement, cell list information (measCellList) of a list of cells that are to be measured by the UE, or information (quantityThreshold) about a threshold based on which the UE determines whether to report the result of the measurement.

15. The UE of claim 14, wherein the processor is further configured to transmit an RRCResumeRequest message and receive an RRCConnectionReject message, and, when the RRCConnectionReject message includes waitTime, the UE continuously performs measurement in the idle mode or the inactive mode until a timer operating according to the information (measIdleDuration) expires.

16. A base station for supporting idle mode measurement, the base station comprising:
a transceiver; and
a processor coupled to the transceiver and configured to:
transmit a message including measIdleConfig,
transmit a UEInformationRequest message for requesting a result of measurement, and
receive a UEInformationResponse message including the result of the measurement,
wherein the measurement is performed in an idle mode or an inactive mode,
wherein the message includes a radio resource control (RRC) Release message or system information
wherein the measIdleConfig includes measIdleCarrierListEUTRA and measIdleCarrierListNR including information on at least one measIdleCarrier,
wherein the information includes reportQuantities associated with the at least one measIdleCarrier,
wherein the measIdleConfig includes an indicator (includeBeamMeasurements) indicating whether to include a beam measurement result.

17. The base station of claim 16, wherein the measIdleConfig includes at least one of an indicator (reportQuantityRsIndexes) indicating whether the UE reports a measurement result for each reference signal (RS) index with a reference signal received power (RSRP) or a reference signal received quality £RSRQ), an indicator (maxNrofRS-IndexesToReport) indicating how many measurement results at maximum from among the measurement results for the RS indexes the UE reports.

18. The base station of claim 16, wherein the measIdleConfig includes at least one of information (nrofSS-BlocksToAverage) about a number of synchronization signal blocks that are used to derive a cell measurement value, a threshold (absThreshSS-BlocsConsolidation) that is used to consolidate measurement values of the synchronization signal blocks, measurement timing configuration information (smtc), a sub-carrier spacing between the synchronization signal blocks (ssbSubcarrierSpacing), or timing information (deriveSSB-IndexFromCell) that is used to determine indexes of the synchronization signal blocks.

* * * * *